United States Patent
Jeon et al.

(10) Patent No.: US 12,052,760 B2
(45) Date of Patent: Jul. 30, 2024

(54) ACCESS PROCEDURES IN WIRELESS COMMUNICATIONS

(71) Applicant: Comcast Cable Communications, LLC, Philadelphia, PA (US)

(72) Inventors: Hyoungsuk Jeon, Centreville, VA (US); Esmael Dinan, McLean, VA (US); Kyungmin Park, Herndon, VA (US); Ali Cirik, Herndon, VA (US); Hua Zhou, Herndon, VA (US); Alireza Babaei, Fairfax, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 686 days.

(21) Appl. No.: 16/739,576

(22) Filed: Jan. 10, 2020

(65) Prior Publication Data
US 2020/0229241 A1 Jul. 16, 2020

Related U.S. Application Data

(60) Provisional application No. 62/790,977, filed on Jan. 10, 2019.

(51) Int. Cl.
*H04W 4/00* (2018.01)
*H04W 74/0833* (2024.01)

(52) U.S. Cl.
CPC .............................. *H04W 74/0833* (2013.01)

(58) Field of Classification Search
CPC ................................................ H04W 74/0833
USPC ................ 370/329–330, 335–345, 347–348
See application file for complete search history.

(56) References Cited

U.S. PATENT DOCUMENTS

| | | | |
|---|---|---|---|
| 2014/0241285 A1 | 8/2014 | Pang et al. | |
| 2016/0270121 A1* | 9/2016 | Bergstrom | H04W 74/0833 |
| 2017/0273056 A1* | 9/2017 | Papasakellariou | H04W 52/143 |
| 2018/0176961 A1* | 6/2018 | Babaei | H04W 74/0833 |
| 2019/0028905 A1* | 1/2019 | Veeramallu | H04W 4/70 |
| 2019/0028923 A1* | 1/2019 | Futaki | H04W 74/0833 |
| 2019/0281636 A1* | 9/2019 | Liu | H04W 72/0446 |
| 2020/0107277 A1* | 4/2020 | Jeon | H04W 52/228 |
| 2020/0146054 A1* | 5/2020 | Jeon | H04L 5/0053 |
| 2020/0187258 A1* | 6/2020 | Lee | H04W 74/0833 |
| 2020/0229241 A1* | 7/2020 | Jeon | H04W 74/0833 |
| 2020/0314917 A1* | 10/2020 | Jeon | H04W 74/0833 |
| 2020/0351801 A1* | 11/2020 | Jeon | H04W 52/362 |
| 2020/0351853 A1* | 11/2020 | Xiong | H04L 5/0023 |
| 2020/0351955 A1* | 11/2020 | Jeon | H04W 76/27 |

(Continued)

FOREIGN PATENT DOCUMENTS

| | | |
|---|---|---|
| WO | 2016053179 A1 | 4/2016 |
| WO | 2018204863 A1 | 11/2018 |

OTHER PUBLICATIONS

Jun. 4, 2020—European Extended Search Report—EP 20151164.9.

(Continued)

*Primary Examiner* — Thai D Hoang
(74) *Attorney, Agent, or Firm* — Banner & Witcoff, Ltd.

(57) ABSTRACT

Wireless communications for access procedures are described. One or more control messages may indicate a report request associated with an access procedure. One or more reports associated with the access procedure may indicate one or more results associated with one or more access channels.

19 Claims, 40 Drawing Sheets

(56) References Cited

U.S. PATENT DOCUMENTS

2020/0404711 A1* 12/2020 Zhao .................. H04W 52/36
2021/0219163 A1*  7/2021 Sha ................... H04W 76/27

OTHER PUBLICATIONS

R1-1814380 3GPP TSG RAN WG1 Meeting #95 Spokane, USA, Nov. 12-16, 2018, Source: Samsung, Title: CR to 38.213 capturing the RAN 1#94bis and RAN1#/95 meeting agreements.
R1-1814400 3GPP TSG RAN WG1 Meeting #95, Spokane, USA, Nov. 12-16, 2018, Source: Huawei, Title: Combined CR of all essential corrections to 38.212 from RAN#94bis and RAN1#95.
3GPP TS 38.213 V15.3.0 (Sep. 2018) 3rd Generation Partnership Project; Technical Specification Group Radio Access Network; NR; Physical layer procedures for control (Release 15).
R1-1814395 3GPP TSG RAN1 Meeting #95, Spokane, USA, Nov. 12-16, 2018, Source: Nokia, Title: Combined CR of all essential corrections to 38.214 from RAN1#94bis and RAN1#95.
3GPP TS 38.213 V15.3.0 (Sep. 2018) 3rd Generation Partnership Project; Technical Specification Group Radio Access Network; NR; Physical layer procedures for data (Release 15).
3GPP TS 38.213 V15.3.0 (Sep. 2018) 3rd Generation Partnership Project; Technical Specification Group Radio Access Network; NR; Medium Access Control (MAC) protocol specification (Release 15).
3GPP TS 38.213 V15.3.0 (Sep. 2018) 3rd Generation Partnership Project; Technical Specification Group Radio Access Network; NR; Radio Resource Control (RRC) protocol specification (Release 15).
R1-1813221 3GPP TSG RAN WG1 Meeting#95, Spokane, USA, Nov. 12-16, 2018, Source: InterDigital Inc., Title: Discussion on Procedures for Initial Access and Mobility in NR-U.
R2-1816261 3GPP TSG RAN WG2 Meeting #104, Spokane, USA, Nov. 12-16, 2018, Source: OPPO, Title: Enhancements of 4-steps RACH in NR-U and the corresponding TP.
R2-1816263 3GPP TSGRAN WG2 Meeting #104, Spokane, USA, Nov. 12-16, 2018, Source: OPPO, Title: 2-steps RACH procedure for NR-U.
R2-1816312 3GPP TSG RAN2 Meeting #104, Spokane, USA, Nov. 12-16, 2018, Source: Samsung, Title: Random Access Response Reception in NR-U.
R2-1816435 3GPP TSG RAN WG2 Meeting #104, Spokane USA, Nov. 12-16, 2018, Source: Motorola Mobility, Lenovo, Title: Modifications to RACH procedure due to LBT.
R2-1816478 3GPP TSG RAN2 Meeting #104, Spokane USA, Nov. 12-16, 2018, Source: MediaTek Inc., Title: LBT for Random Access in NR-U.
R2-1816616 3GPP TSG RAN WG2 Meeting #104, Spokane, USA, Nov. 12-16, 2018, Source: Huawei, HiSilicon, Title: Four-step RACH procedure for NR-U.
R2-1816617 3GPP TSG RAN WG2 Meeting #104, Spokane, USA, Nov. 12-16, 2018, Source: Huawei, HiSilicon, Title: Two-step RACH procedure for NR-U.
R2-1816618 3GPP TSG RAN WG2 Meeting #104, Spokane, USA, Nov. 12-16, 2018, Source: Huawei, HiSilicon, Title: Impact of LBT on counters and windows for 4-step RACH.
R2-1816687 3GPP TSG RAN WG2 Meeting #104, Spokane, USA, Nov. 12-16, 2018, Source: MediaTek Inc., Title: 2-step RACH msgB addressing and HARQ.
R2-1816688 3GPP TSG RAN WG2 Meeting #104, Spokane, USA, Nov. 12-16, 2018, Source: MediaTek Inc., Title: Random access backoff and timers in NR-U.
R2-1816696 3GPP TSG RAN WG2 Meeting #104, Spokane, USA, Nov. 12-16, 2018, Source: Intel Corporation, Title: Random access procedure for NR-U.
R2-1816776 3GPP TSG RAN WG2 Meeting #104, Spokane, USA, Nov. 12-16, 2018, Source: InterDigital, Title: Random access in NR-Unlicensed.
R2-1816829 3GPP TSG RAN WG2 NR Meeting #104, Spokane USA, Nov. 12-16, 2018, Source: ZTE, Title: Considerations on 4-step RACH procedure for NR-U.
R2-1816831 3GPP TSG RAN WG2 NR Meeting #104, Spokane, USA, Nov. 12-16, 2018, source: ZTE, Title: LBT outcome indication.
R2-1816832 3GPP TSG RAN WG2 NR Meeting #104, Spokane, USA, Nov. 12-16, 2018, Source: ZTE, Title: Considerations on RAR window size for NR-U.
R2-1817064 3GPP TSG RAN WG2 Meeting #104, Spokane, USA, Nov. 12-16, 2018, Source: ZTE Corporation, Sanechips Title: Msg2 payload contents for 2-step RACH.
R2-1817075 3GPP TSG RAN WG2 Meeting #103, Spokane, USA, Nov. 12-16, 2018, Source: Sony, Title: Considerations on initial access procedures for NR unlicensed.
R2-1817195 3GPP TSG RAN WG2 Meeting #104, Spokane, USA, Nov. 12-16, 2018, source: Nokia, Nokia Shanghai Bell, Title: Network control of 2-step CBRA procedure.
R2-1817319 3GPP TSG RAN WG2 Meeting #104, Spokane USA, Nov. 12-16, 2018, Source: Spreadtrum Communications, Title: Random Access Procedure in NR-U.
R2-1817473 3GPP TSG RAN WG2 Meeting #104, Spokane USA, Nov. 12-16, 2018, Source: Apple Inc., Title: RACH Enhancements in NR-U.
R2-1818098 3GPP TSG RAN WG2 #103bis, Spokane, USA, Nov. 12-16, 2018, Source: LG Electronics Inc., Title: 2-Step RACH procedure for NR-U.
R2-1818100 3GPP TSG RAN WG2 Meeting #104, Spokane, USA, Nov. 12-16, 2018, Source: LG Electronics Inc., Title: Enhanced RACH procedure for NR-U.
R2-1818187 3GPP TSG RAN WG2 Meeting #104, Spokane, USA, Nov. 12-16, 2018, Source: Potevio, Title: Analysis of RA issues related with LBT.
R2-1818258 3GPP TSG RAN WG2 Meeting #104, Spokane, USA, Nov. 12-16, 2018, Source: vivo, Title: Enhance RACH with Additional Transmission Opportunities.
R2-1818259 3GPP TSG RAN WG2 Meeting #104, Spokane, USA, Nov. 12-16, 2018, Source: vivo, Title: Counter for Preamble Transmission Attempt.
R2-1818260 3GPP TSG RAN WG2 Meeting #104, Spokane, USA, Nov. 12-16, 2018, Source: vivo, Title: Ran2 impacts of 2-step RACH.
R2-1818355 3GPP TSG RAN WG2 Meeting #104, Spokane, USA, Nov. 12-16, 2018, Source: LG Electronics Inc., Title: DRX for unlicense band operation.

* cited by examiner

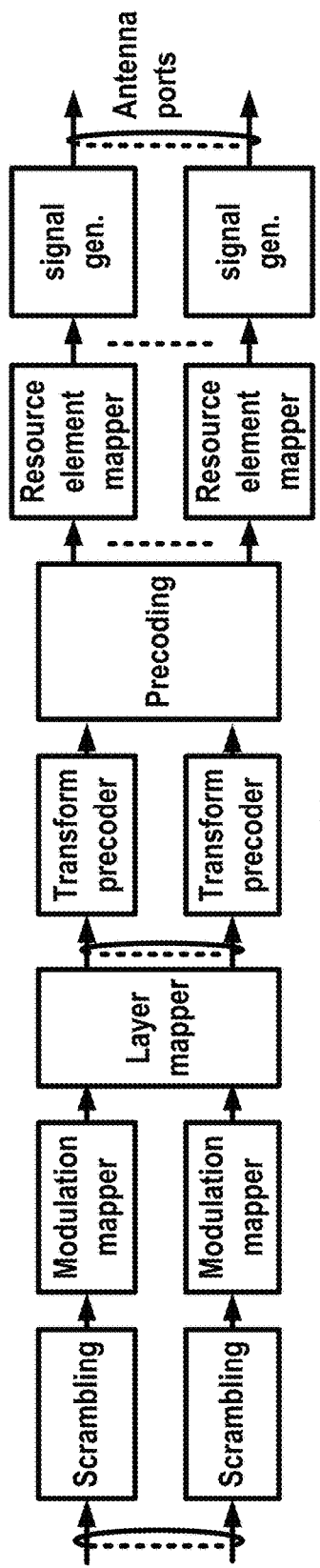
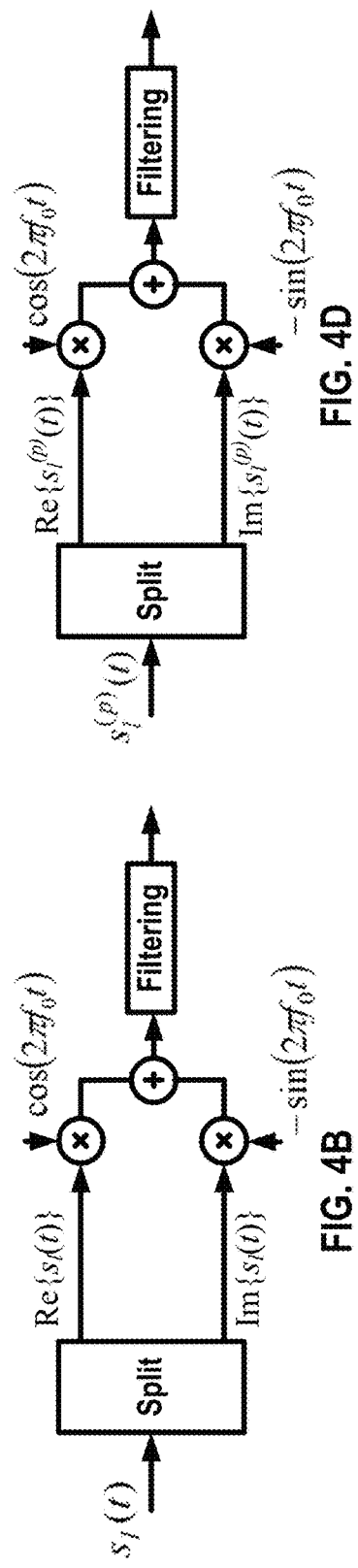
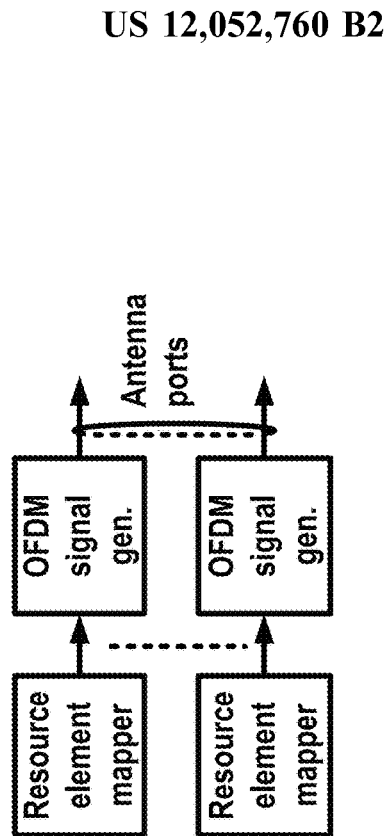
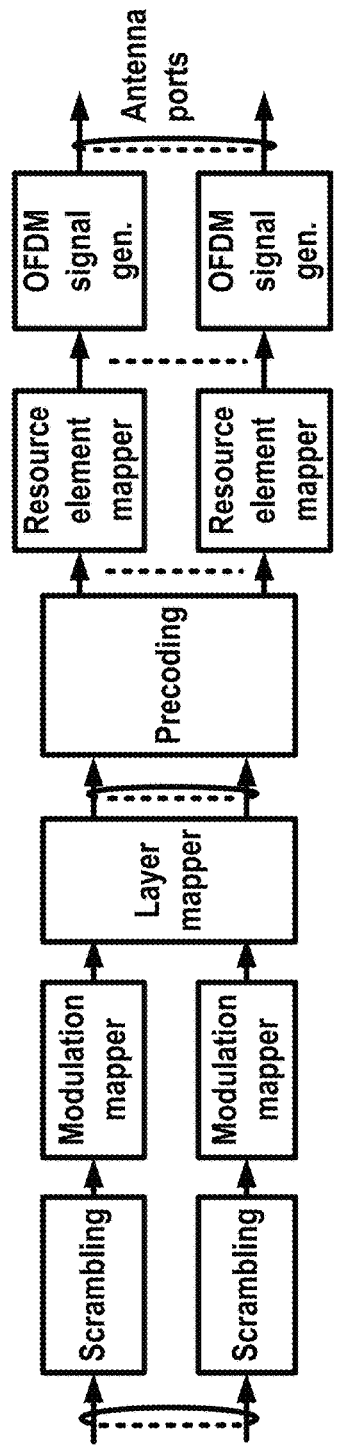
FIG. 4A
FIG. 4B
FIG. 4D
FIG. 4C

```
BWP ::=                                 SEQUENCE {
    locationAndBandwidth                    INTEGER (0..37949),
    subcarrierSpacing                       SubcarrierSpacing,
    cyclicPrefix                            ENUMERATED { extended }
        OPTIONAL -- Need R
}

BWP-Uplink ::=                          SEQUENCE {
    bwp-Id                                  BWP-Id,
    bwp-Common                              BWP-UplinkCommon
        OPTIONAL, -- Need M
    bwp-Dedicated                           BWP-UplinkDedicated
        OPTIONAL, -- Need M
    ...
}

BWP-UplinkCommon ::=                    SEQUENCE {
    genericParameters                       BWP,
    rach-ConfigCommon                       SetupRelease { RACH-ConfigCommon }
        OPTIONAL,        -- Need M
    pusch-ConfigCommon                      SetupRelease { PUSCH-ConfigCommon }
        OPTIONAL,        -- Need M
    pucch-ConfigCommon                      SetupRelease { PUCCH-ConfigCommon }
        OPTIONAL,        -- Need M
    ...
}

BWP-UplinkDedicated ::=                 SEQUENCE {
    pucch-Config                            SetupRelease { PUCCH-Config }
        OPTIONAL,        -- Need M
    pusch-Config                            SetupRelease { PUSCH-Config }
        OPTIONAL,        -- Cond SetupOnly
    configuredGrantConfig                   SetupRelease { ConfiguredGrantConfig }
        OPTIONAL,        -- Need M
    srs-Config                              SetupRelease { SRS-Config }
        OPTIONAL,        -- Need M
    beamFailureRecoveryConfig               SetupRelease { BeamFailureRecoveryConfig }
        OPTIONAL, -- Cond SpCellOnly
    ...
}

BWP-Downlink ::=                        SEQUENCE {
    bwp-Id                                  BWP-Id,
    bwp-Common                              BWP-DownlinkCommon
        OPTIONAL, -- Need M
    bwp-Dedicated                           BWP-DownlinkDedicated
        OPTIONAL, -- Need M
    ...
}

BWP-DownlinkCommon ::=                  SEQUENCE {
    genericParameters                       BWP,
    pdcch-ConfigCommon                      SetupRelease { PDCCH-ConfigCommon }
        OPTIONAL, -- Need M
    pdsch-ConfigCommon                      SetupRelease { PDSCH-ConfigCommon }
        OPTIONAL, -- Need M
    ...
}

BWP-DownlinkDedicated ::=               SEQUENCE {
    pdcch-Config                            SetupRelease { PDCCH-Config }
        OPTIONAL, -- Need M
    pdsch-Config                            SetupRelease { PDSCH-Config }
        OPTIONAL, -- Need M
    sps-Config                              SetupRelease { SPS-Config }
        OPTIONAL,        -- Need M
    radioLinkMonitoringConfig               SetupRelease { RadioLinkMonitoringConfig }
        OPTIONAL, -- Need M
    ...
}
```

FIG. 16

```
ServingCellConfig ::=           SEQUENCE {
    tdd-UL-DL-ConfigurationDedicated TDD-UL-DL-ConfigDedicated
        OPTIONAL,        -- Cond TDD initialDownlinkBWP              BWP-DownlinkDedicated
        OPTIONAL,        -- Cond ServCellAdd
    downlinkBWP-ToReleaseList       SEQUENCE (SIZE (1..maxNrofBWPs)) OF BWP-Id
        OPTIONAL,        -- Need N
    downlinkBWP-ToAddModList        SEQUENCE (SIZE (1..maxNrofBWPs)) OF BWP-Downlink
        OPTIONAL,        -- Need N
    firstActiveDownlinkBWP-Id       BWP-Id
        OPTIONAL,        -- Cond SyncAndCellAdd
    bwp-InactivityTimer             ENUMERATED { ms2, ms3, ms4, ms5, ms6, ms8, ms10, ms20, ms30,
                                                 ms40,ms50, ms60, ms80, ms100, ms200, ms300, ms500,
                                                 ms750, ms1280, ms1920, ms2560, spare10, spare9, spare8,
                                                 spare7, spare6, spare5, spare4, spare3, spare2, spare1 }
        OPTIONAL,        -- Need R
    defaultDownlinkBWP-Id           BWP-Id
        OPTIONAL,        -- Need S uplinkConfig                    UplinkConfig
        OPTIONAL,        -- Cond ServCellAdd-UL
    supplementaryUplink             UplinkConfig
        OPTIONAL,        -- Cond ServCellAdd-SUL pdcch-ServingCellConfig         SetupRelease { PDCCH-ServingCellConfig }
        OPTIONAL,        -- Need M
    pdsch-ServingCellConfig         SetupRelease { PDSCH-ServingCellConfig }
        OPTIONAL,        -- Need M
    csi-MeasConfig                  SetupRelease { CSI-MeasConfig }
        OPTIONAL,        -- Need M
    sCellDeactivationTimer          ENUMERATED { ms20, ms40, ms80, ms160, ms200, ms240,
                                                 ms320, ms400, ms480, ms520, ms640, ms720,
                                                 ms840, ms1280, spare2,spare1}
        OPTIONAL,        -- Cond ServingCellWithoutPUCCH
    crossCarrierSchedulingConfig    CrossCarrierSchedulingConfig
        OPTIONAL,        -- Need M
    tag-Id                          TAG-Id,
    ue-BeamLockFunction             ENUMERATED {enabled}
        OPTIONAL,        -- Need R
    pathlossReferenceLinking        ENUMERATED {pCell, sCell}
        OPTIONAL,        -- Cond SCellOnly
    servingCellMO                   MeasObjectId
        OPTIONAL,        -- Cond MeasObject
    ...
}

UplinkConfig ::=                SEQUENCE {
    initialUplinkBWP                BWP-UplinkDedicated
        OPTIONAL,        -- Cond ServCellAdd
    uplinkBWP-ToReleaseList         SEQUENCE (SIZE (1..maxNrofBWPs)) OF BWP-Id
        OPTIONAL,        -- Need N
    uplinkBWP-ToAddModList          SEQUENCE (SIZE (1..maxNrofBWPs)) OF BWP-Uplink
        OPTIONAL,        -- Need N
    firstActiveUplinkBWP-Id         BWP-Id
        OPTIONAL,        -- Cond SyncAndCellAdd pusch-ServingCellConfig         SetupRelease { PUSCH-ServingCellConfig }
        OPTIONAL,        -- Need M
    carrierSwitching                SetupRelease { SRS-CarrierSwitching }
        OPTIONAL,        -- Need M
    ...
}
```

FIG. 17

| | |
|---|---|
| R | Oct 1 |
| Temporary C-RNTI | Oct 2 |
| Temporary C-RNTI | Oct 3 |
| TC-RNT / UE contention resolution identity | Oct 4 |
| UE contention resolution identity | Oct 5 |
| UE contention resolution identity | Oct 6 |
| UE contention resolution identity | Oct 7 |
| UE contention resolution identity | Oct 8 |

FIG. 30A

| | |
|---|---|
| R / UE contention resolution identity | Oct 1 |
| UE contention resolution identity | Oct 2 |
| UE contention resolution identity | Oct 3 |
| UE contention resolution identity | Oct 4 |
| UE contention resolution identity | Oct 5 |
| UE contention resolution identity | Oct 6 |

FIG. 30B

ACCESS PROCEDURES IN WIRELESS COMMUNICATIONS

CROSS-REFERENCE TO RELATED APPLICATIONS

This application claims the benefit of U.S. Provisional Application No. 62/790,977, titled "Random Access Report" and filed on Jan. 10, 2019. The above-referenced application is hereby incorporated by reference in its entirety.

BACKGROUND

Wireless communications may use access procedures to establish communication between devices. In a random access procedure, a communication device may send (e.g., transmit) a random access preamble to another communication device, for example, to establish timing synchronization between the communication devices. A communication device may respond to a random access preamble by sending a random access response. The random access procedure may interfere with another access procedure that may be initiated by one or more additional communication devices which may lead to undesirable outcomes such as unsuccessful or delayed communications.

SUMMARY

The following summary presents a simplified summary of certain features. The summary is not an extensive overview and is not intended to identify key or critical elements.

Wireless communications are described. A wireless device may initiate an access procedure (e.g., a random access procedure) with a base station, for example, by sending a message (e.g., a random access preamble) to the base station. The base station may respond, for example, by sending a report request associated with the access procedure. The report request may indicate at least one channel of a plurality of channels in a cell. The wireless device may respond to the report request, for example, by sending a message comprising at least one of: an indication associated with at least one message (e.g., preamble) transmitted via at least one channel, and/or an indication associated with at least one message transmission attempt associated with the at least one channel. The indication(s) may be used to change one or more access parameters (e.g., random access parameters) of the at least one channel and/or may avoid/reduce potential collisions between multiple access procedures.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 16 shows an example bandwidth part configuration information element.

FIG. 17 shows an example serving cell configuration information element.

FIG. 30A and FIG. 30B show example RAR formats.

DETAILED DESCRIPTION

Figure 1:
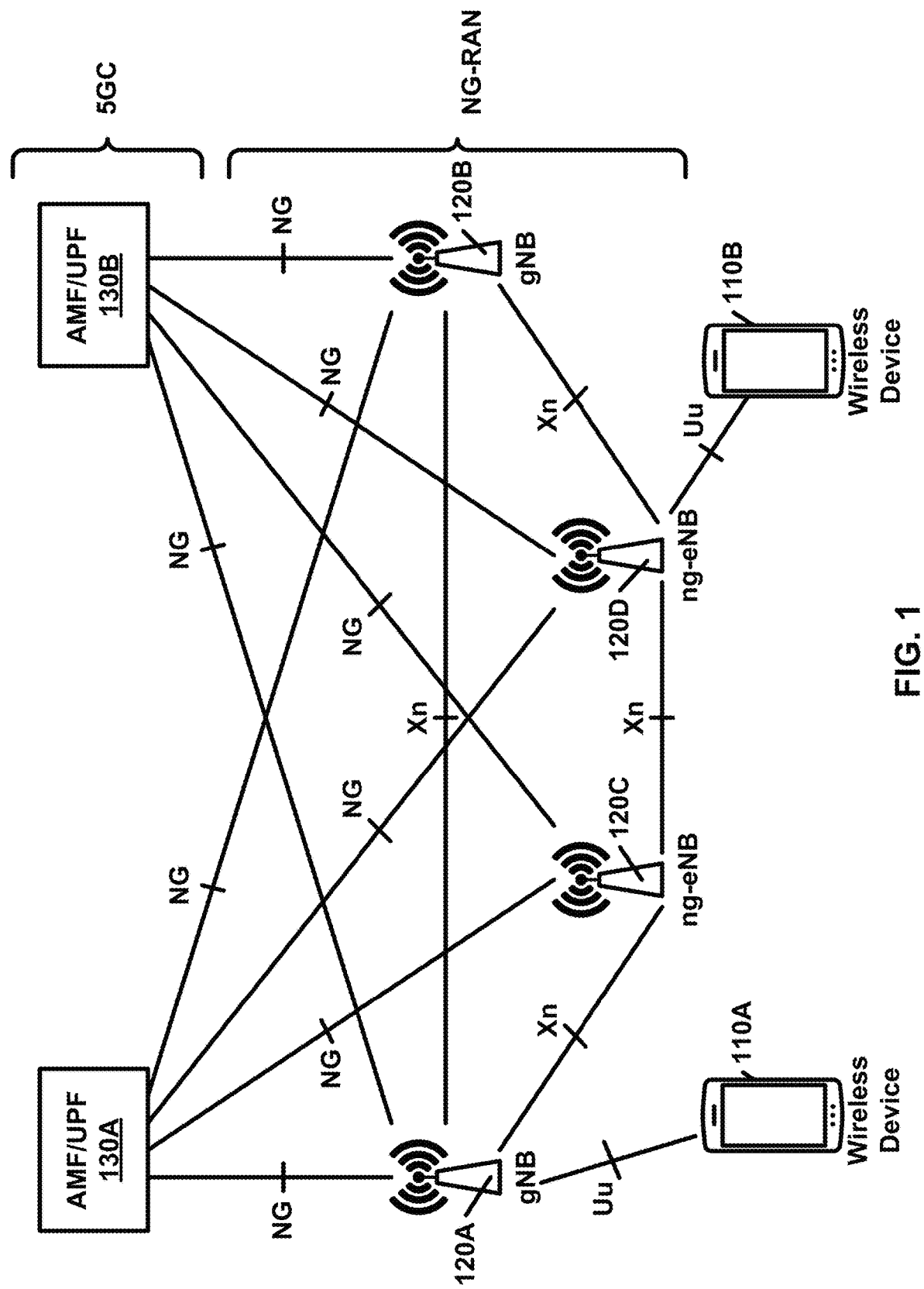
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to one or more random access procedures for wireless communications in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
NUL Normal Uplink
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAP Random Access Preamble
RAT Radio Access Technology
RA-RNTI Random Access-Radio Network Temporary Identifier
RB Resource Blocks
RBG Resource Block Groups RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
SUL Supplementary Uplink
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide, for example, NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
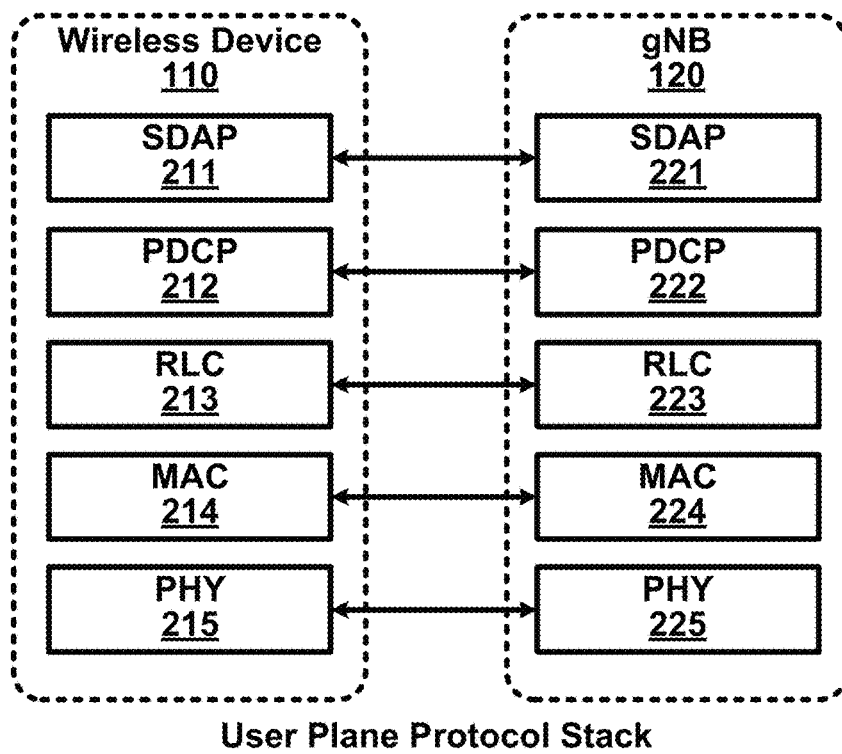
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
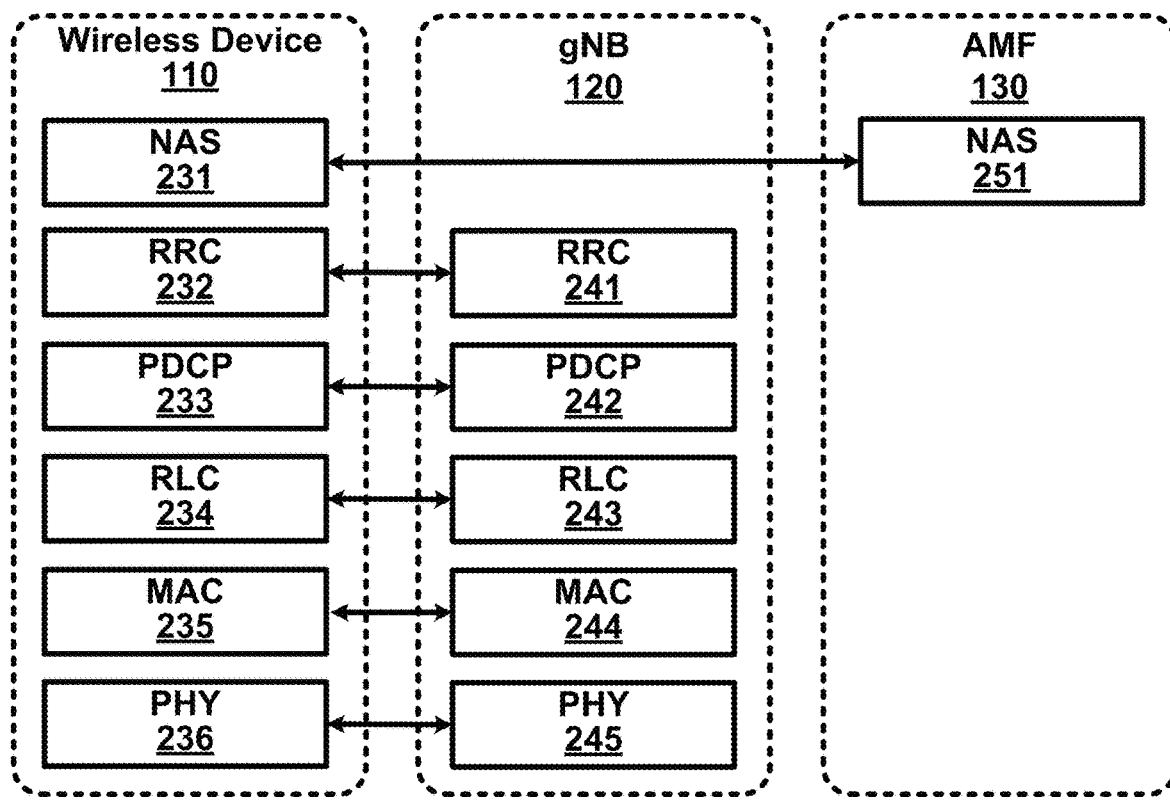
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a TB. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., TB). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
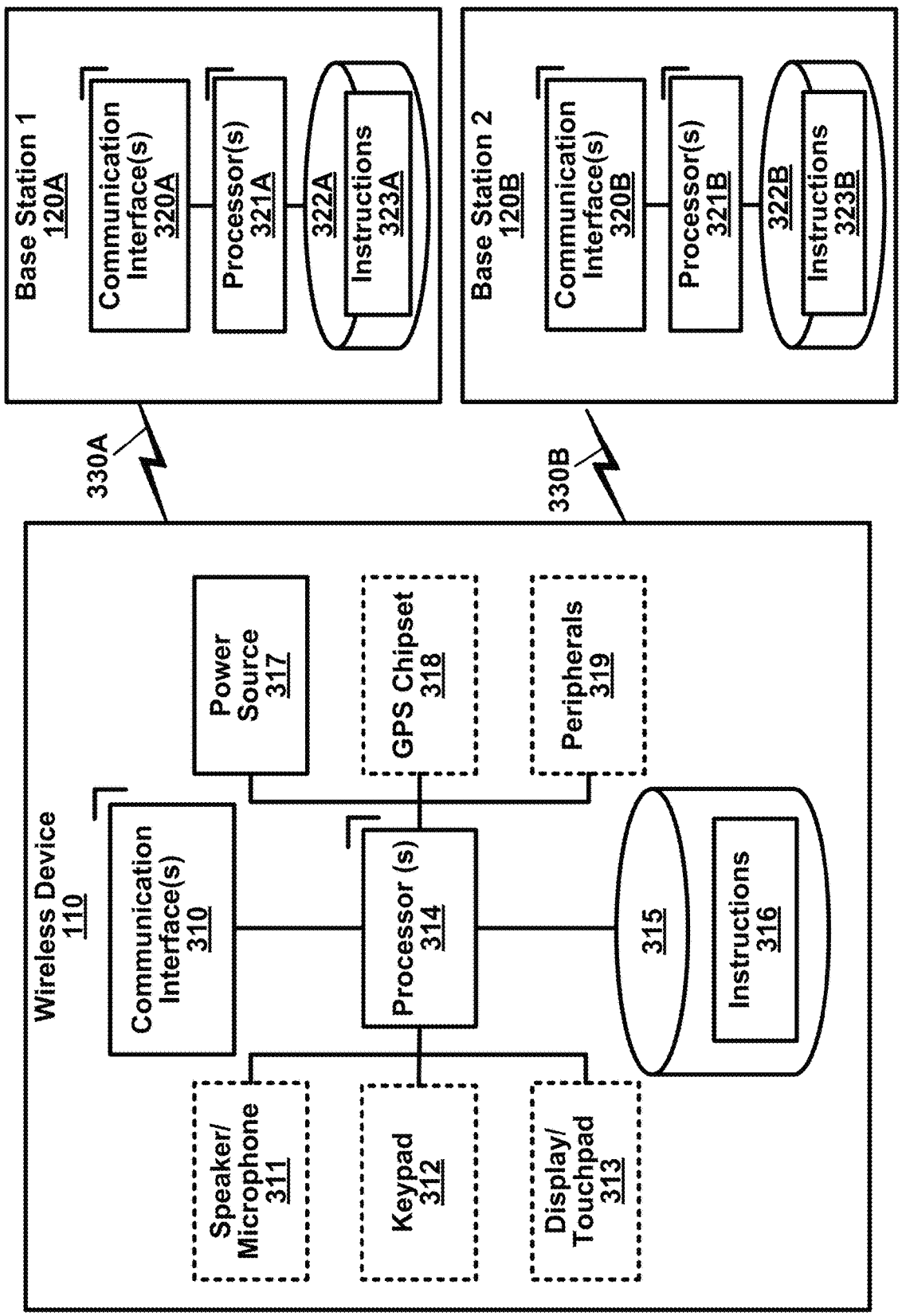
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG- RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a RA procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message comprises the sCellToReleaseList. The wireless device may perform SCell additions or modification, for example, if the received RRC Connection Reconfiguration message comprises the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive TBs, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may comprise processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
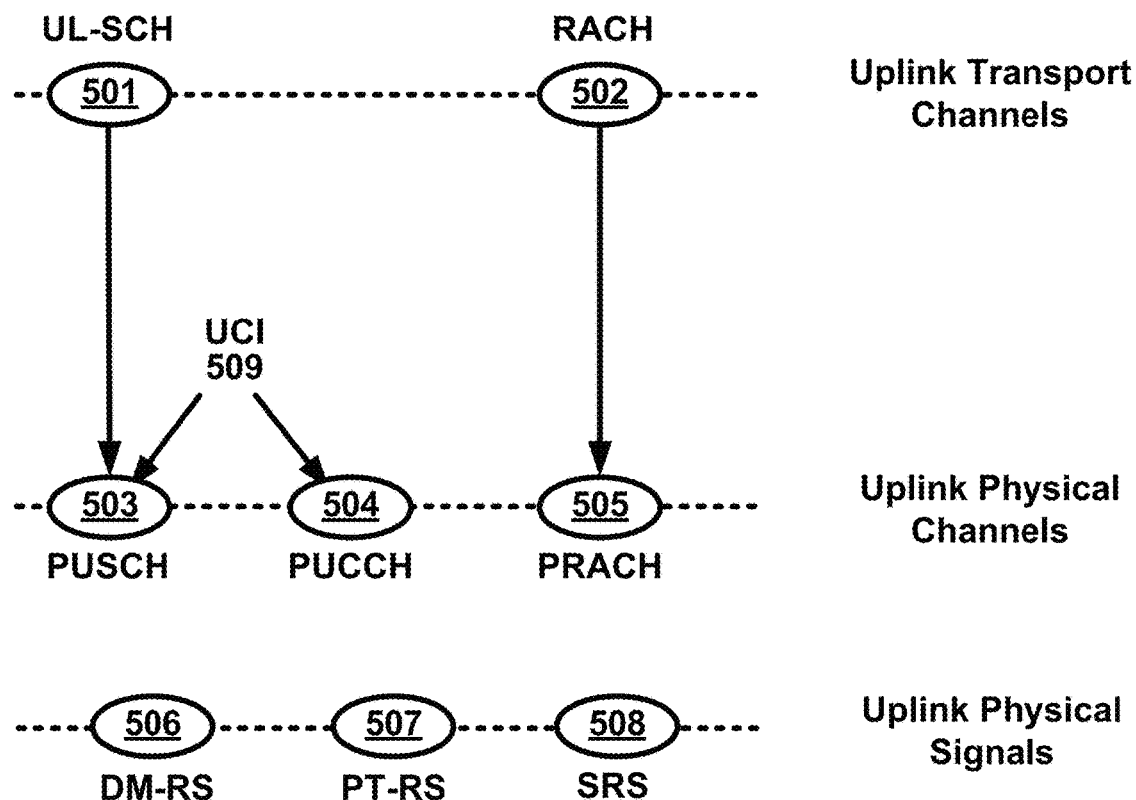
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
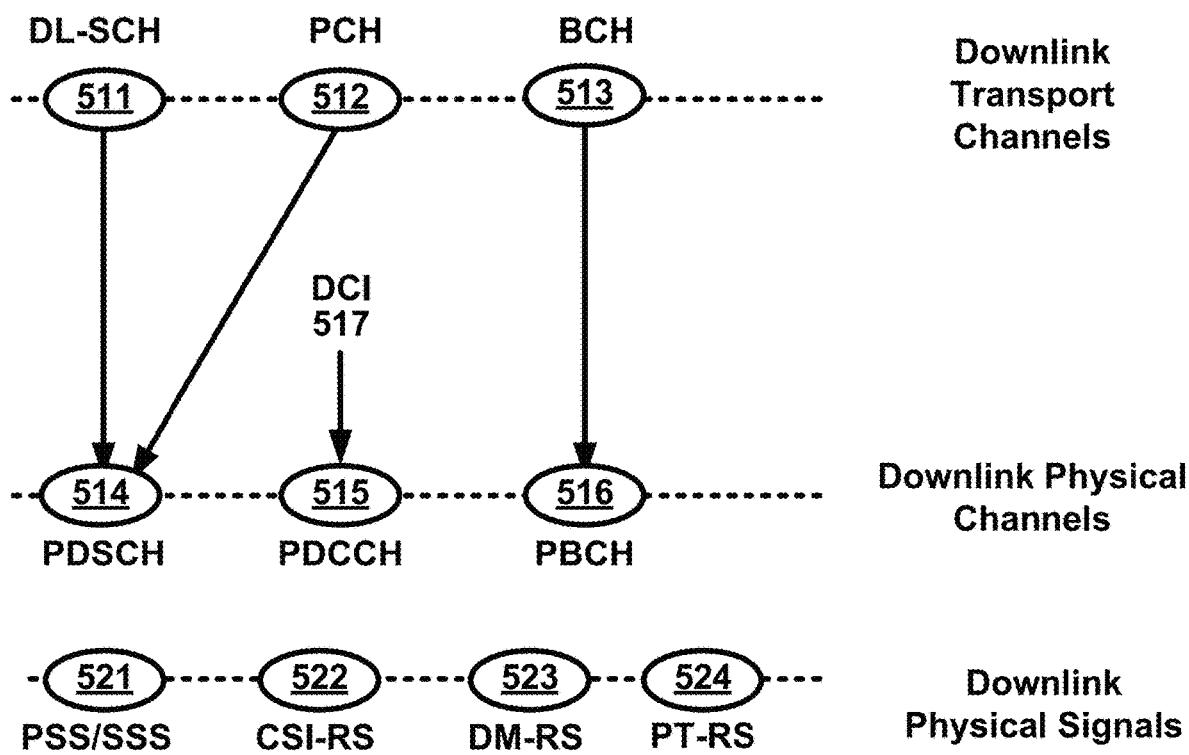
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block (SSB) may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
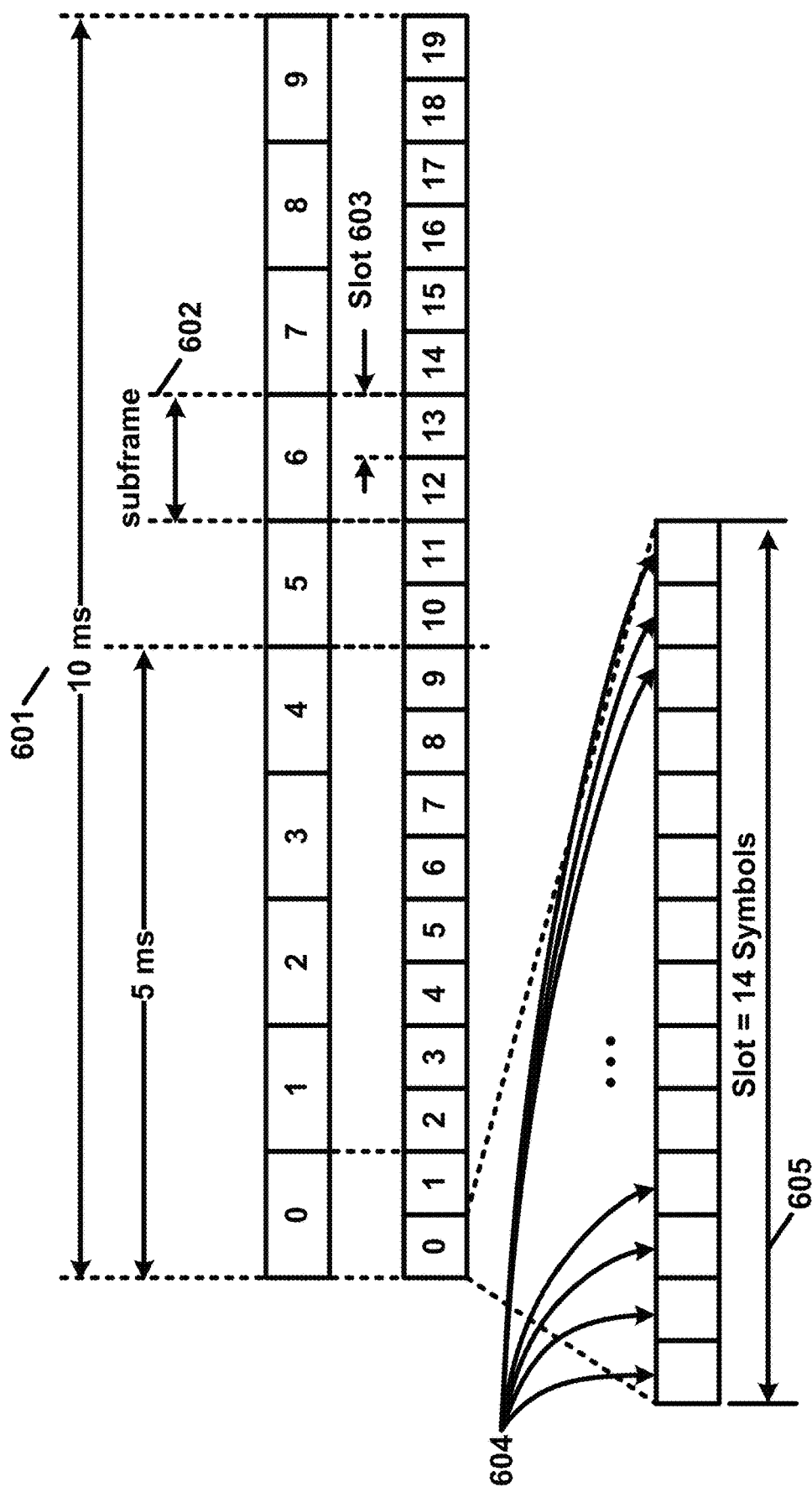
FIG. 6 shows an example transmission time and/or reception time for a carrier.

FIG. 6 shows an example transmission and/or reception time of a carrier, as well as an example frame structure, for a carrier. A multicarrier OFDM communication system may comprise one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame structure. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may comprise a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
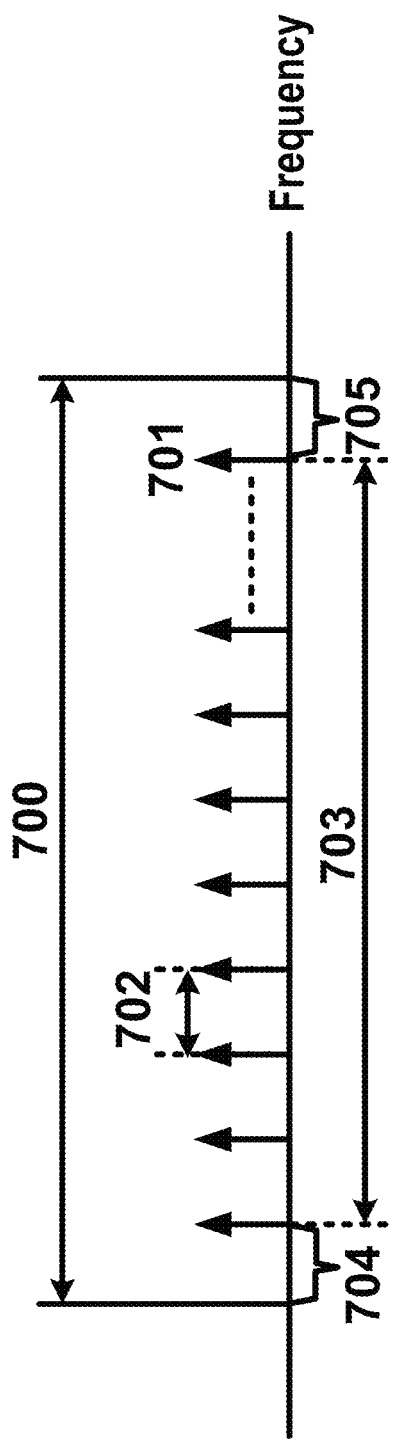
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
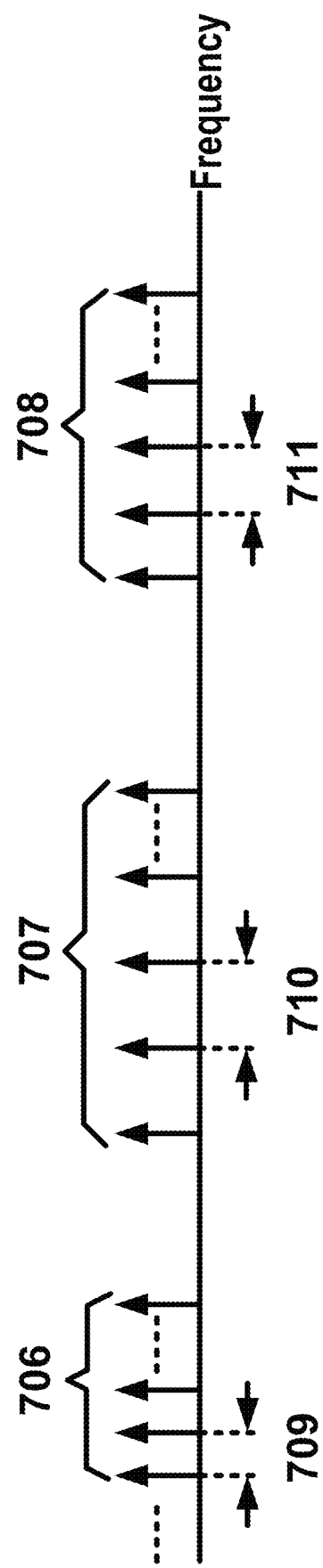

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
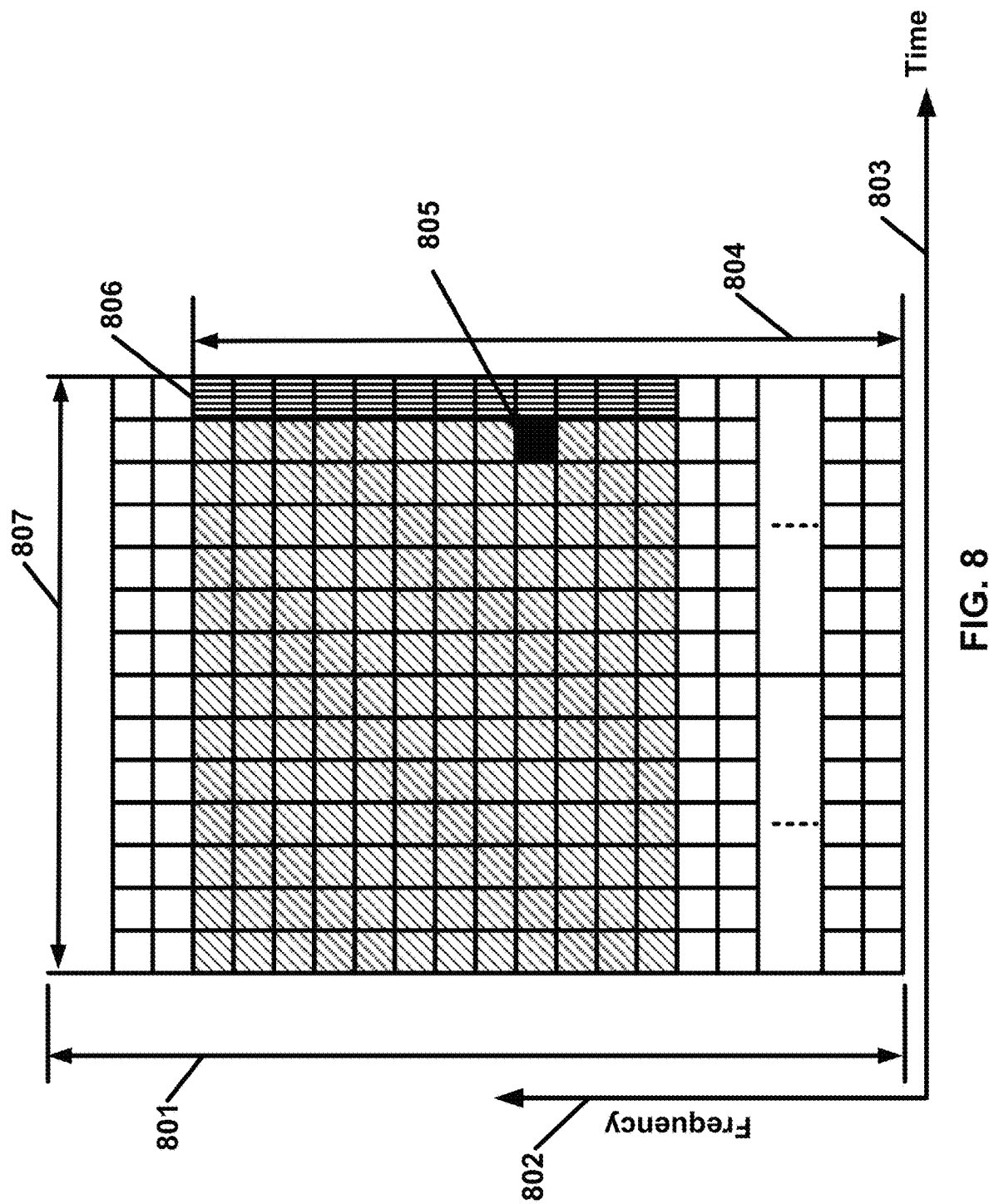
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a BWP of a carrier. A carrier may comprise multiple BWPs. A first BWP of a carrier may have a different frequency location and/or a different bandwidth from a second BWP of the carrier.

A base station may send (e.g., transmit), to a wireless device, a downlink control information comprising a downlink or uplink resource block assignment. A base station may send (e.g., transmit) to and/or receive from, a wireless device, data packets (e.g., TBs). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more TBs. The DCI may indicate a downlink assignment indicating parameters for receiving one or more TBs. The DCI may be used by the base station to initiate a contention-free RA at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
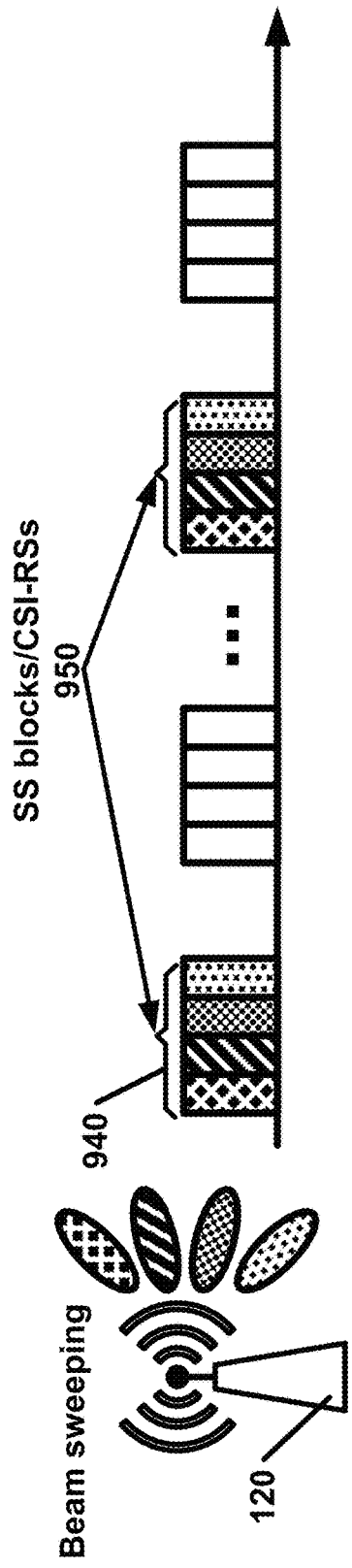
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
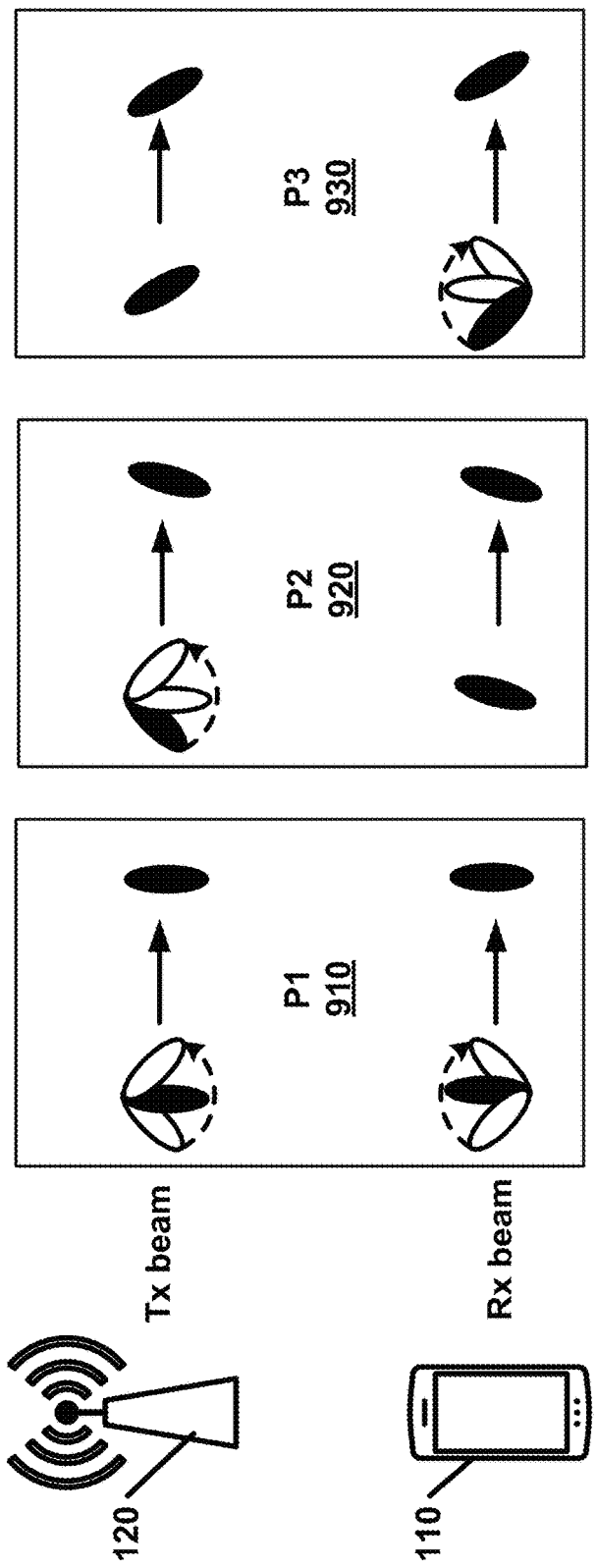
FIG. 9B shows an example downlink beam management procedure.

FIG. 9B shows an example of a beam management procedure, such as a new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
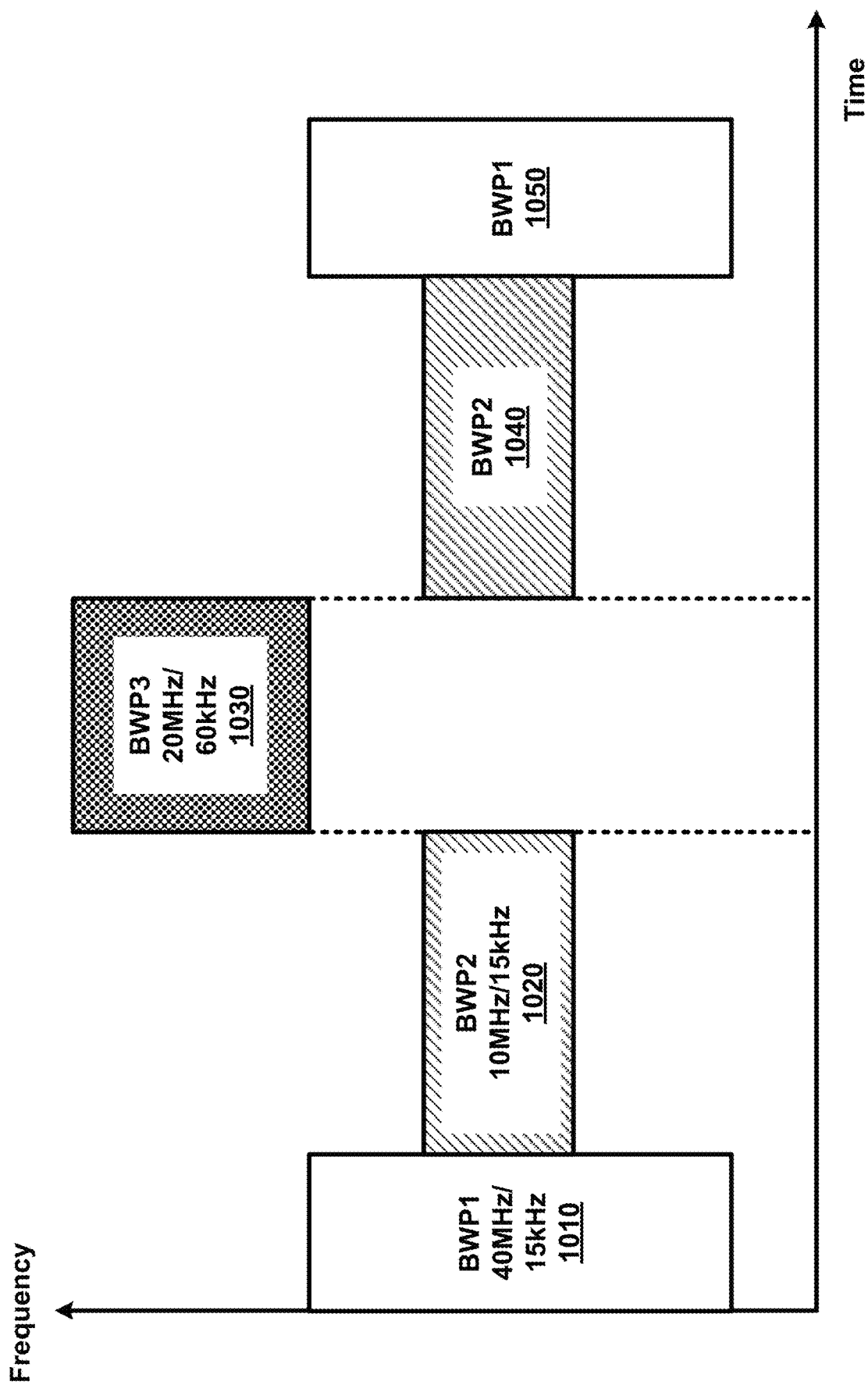
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a RA procedure. If a wireless device is configured with a secondary carrier on a primary cell, the wireless device may be configured with an initial BWP for RA procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
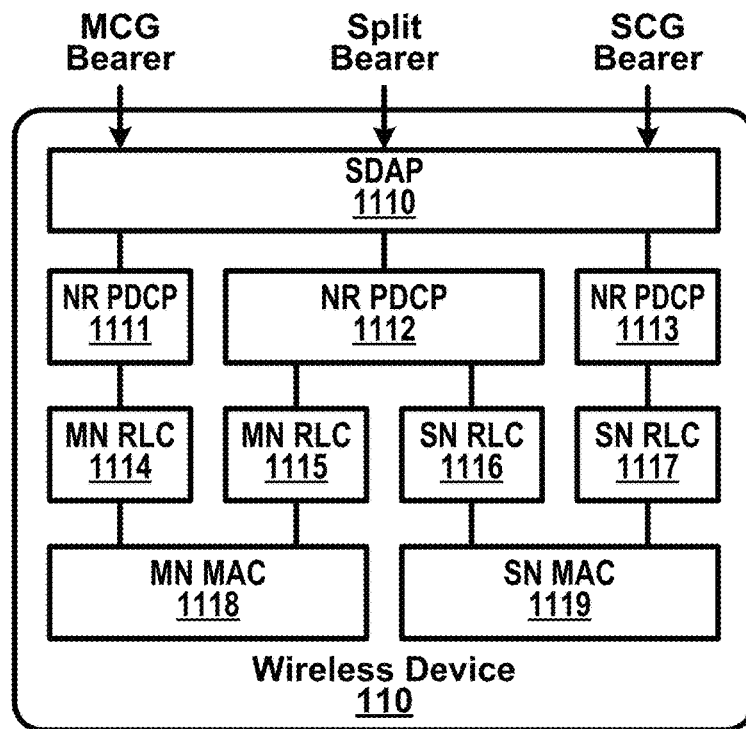
FIG. 11A and FIG. 11B show examples of multi connectivity.
Figure 11B:
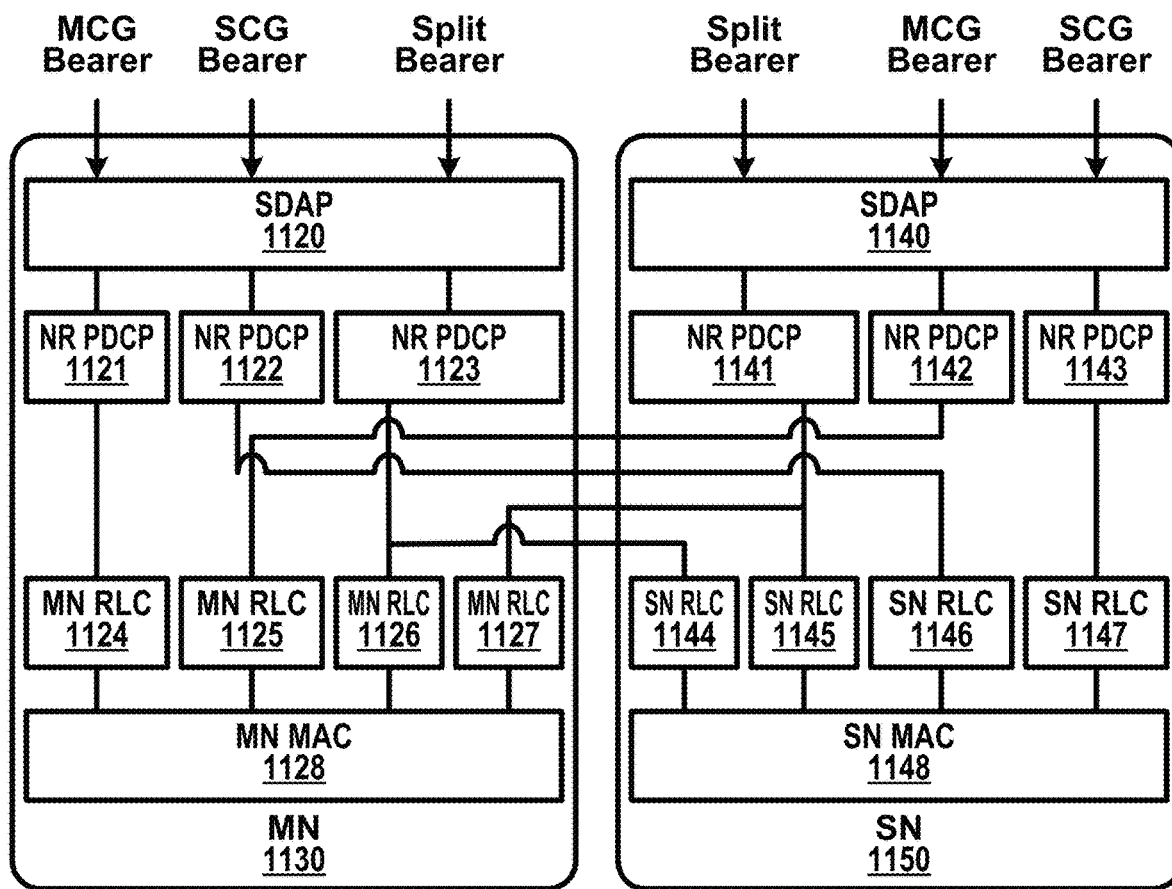

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a RA problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
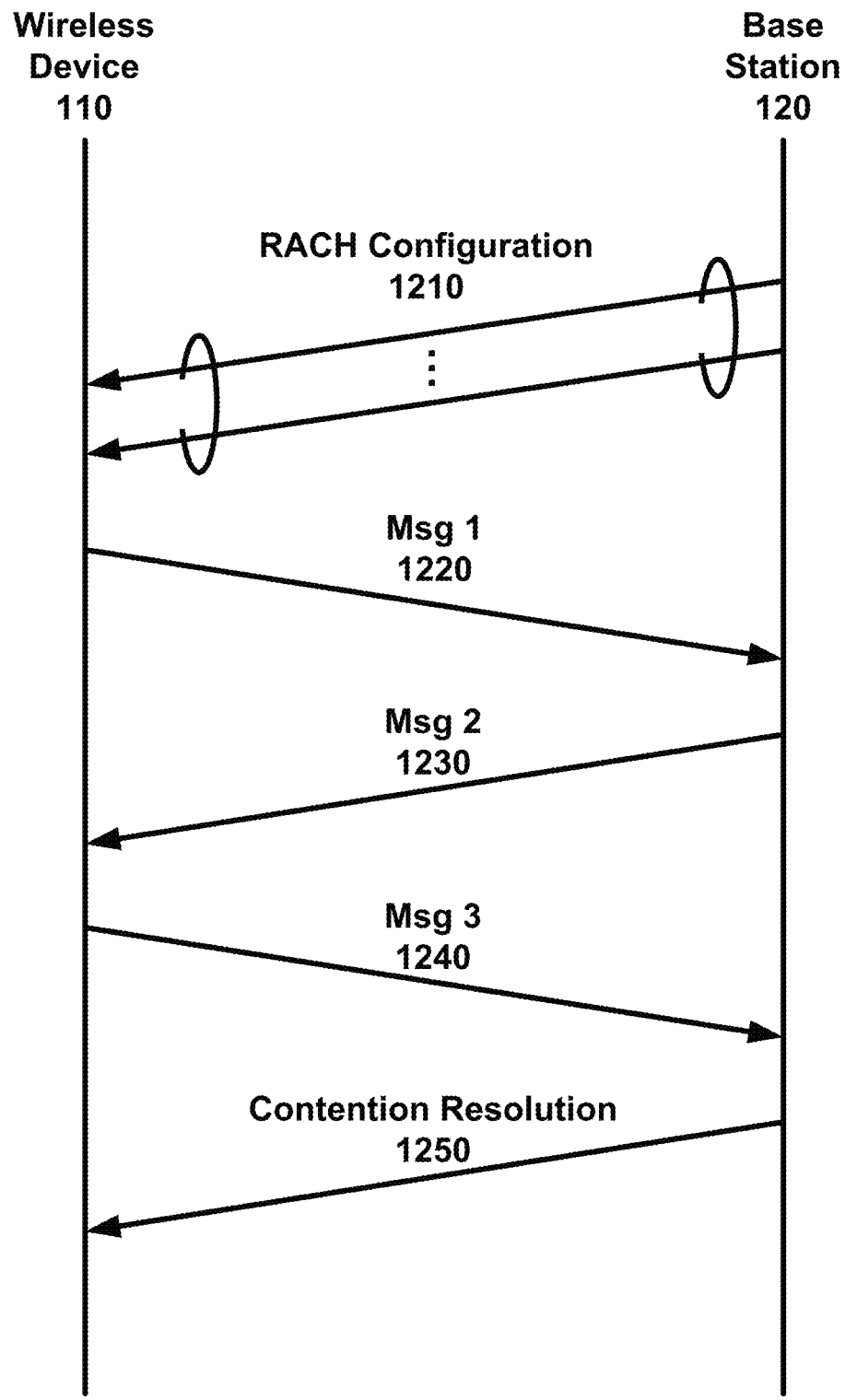
FIG. 12 shows an example of a random access procedure.

FIG. 12 shows an example of a RA procedure. One or more events may trigger a RA procedure. For example, one or more events may be at least one of following: initial access from RRC_IDLE, RRC connection re-establishment procedure, handover, DL or UL data arrival in (e.g., during)

a state of RRC_CONNECTED (e.g., if UL synchronization status is non-synchronized), transition from RRC_Inactive, and/or request for other system information. A PDCCH order, a MAC entity, and/or a beam failure indication may initiate a RA procedure.

A RA procedure may comprise or be one of at least a contention based RA procedure and/or a contention free RA procedure. A contention based RA procedure may comprise one or more Msg 1 1220 transmissions, one or more Msg2 1230 transmissions, one or more Msg3 1240 transmissions, and contention resolution 1250. A contention free RA procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step RA procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step RA procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step RA procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble (RAP), initial preamble power (e.g., RAP initial received target power), an RSRP threshold for a selection of a SS block and corresponding PRACH resource, a power-ramping factor (e.g., RAP power ramping step), a RAP index, a maximum number of preamble transmissions, preamble group A and group B, a threshold (e.g., message size) to determine the groups of RAPs, a set of one or more RAPs for a system information request and corresponding PRACH resource(s) (e.g., if any), a set of one or more RAPs for a beam failure recovery request and corresponding PRACH resource(s) (e.g., if any), a time window to monitor RAR(s), a time window to monitor response(s) on a beam failure recovery request, and/or a contention resolution timer.

The Msg1 1220 may comprise one or more transmissions of a RAP. For a contention based RA procedure, a wireless device may select an SS block with an RSRP above the RSRP threshold. If RAPs group B exists, a wireless device may select one or more RAPs from a group A or a group B, for example, depending on a potential Msg3 1240 size. If a RAPs group B does not exist, a wireless device may select the one or more RAPs from a group A. A wireless device may select a RAP index randomly (e.g., with equal probability or a normal distribution) from one or more RAPs associated with a selected group. If a base station semi-statically configures a wireless device with an association between RAPs and SS blocks, the wireless device may select a RAP index randomly with equal probability from one or more RAPs associated with a selected SS block and a selected group.

A wireless device may initiate a contention free RA procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a RAP index corresponding to a selected SS block or a CSI-RS from a set of one or more RAPs for a beam failure recovery request, for example, if at least one of the SS blocks with an RSRP above a first RSRP threshold among associated SS blocks is available, and/or if at least one of CSI-RSs with a RSRP above a second RSRP threshold among associated CSI-RSs is available.

A wireless device may receive, from a base station, a RAP index via PDCCH or RRC for a contention free RA procedure. The wireless device may select a RAP index, for example, if a base station does not configure a wireless device with at least one contention free PRACH resource associated with SS blocks or CSI-RS. The wireless device may select the at least one SS block and/or select a RAP corresponding to the at least one SS block, for example, if a base station configures the wireless device with one or more contention free PRACH resources associated with SS blocks and/or if at least one SS block with a RSRP above a first RSRP threshold among associated SS blocks is available. The wireless device may select the at least one CSI-RS and/or select a RAP corresponding to the at least one CSI-RS, for example, if a base station configures a wireless device with one or more contention free PRACH resources associated with CSI-RSs and/or if at least one CSI-RS with a RSRP above a second RSPR threshold among the associated CSI-RSs is available.

A wireless device may perform one or more Msg1 1220 transmissions, for example, by sending (e.g., transmitting) the selected RAP. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected RAP via a selected PRACH occasions. The wireless device may determine a transmit power for a transmission of a selected RAP at least based on an initial preamble power and a power-ramping factor. The wireless device may determine an RA-RNTI associated with a selected PRACH occasion in which a selected RAP is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a RAR, Msg 2 1230. The wireless device may start a time window (e.g., ra-ResponseWindow) to monitor a RAR. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-Response-Window) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one RAR identified by a RA-RNTI, or for at least one response to a beam failure recovery request identified by a C-RNTI, at a time that a timer for a time window is running.

A wireless device may determine that a reception of RAR is successful, for example, if at least one RAR comprises a random access preamble identifier (RAPID) corresponding to a RAP sent (e.g., transmitted) by the wireless device. The wireless device may determine that the contention free RA procedure is successfully completed, for example, if a reception of a RAR is successful. The wireless device may determine that a contention free RA procedure is successfully complete, for example, if a contention free RA procedure is triggered for a beam failure recovery request and if a PDCCH transmission is addressed to a C-RNTI. The wireless device may determine that the RA procedure is successfully completed, and may indicate a reception of an acknowledgement for a system information request to upper layers, for example, if at least one RAR comprises a RAPID. The wireless device may stop sending (e.g., transmitting) remaining preambles (if any) after or in response to a successful reception of a corresponding RAR, for example, if the wireless device has signaled multiple preamble transmissions.

The wireless device may perform one or more Msg 3 1240 transmissions, for example, after or in response to a successful reception of RAR (e.g., for a contention based RA procedure). The wireless device may adjust an uplink transmission timing, for example, based on a timing advanced command indicated by a RAR. The wireless device may send (e.g., transmit) one or more TBs, for example, based on an uplink grant indicated by a RAR. Subcarrier spacing for PUSCH transmission for Msg3 1240 may be provided by at least one higher layer (e.g., RRC) parameter. The wireless device may send (e.g., transmit) a RAP via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same RAR comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a RA procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the RA procedure is successfully completed.

RA procedures may be used to establish communications between a wireless device and a base station associated with a cell. A four-step RA procedure (e.g., such as shown in FIG. 12 and described above) may have an associated latency. The associated latency for the four-step RA procedure may be a minimum of a quantity (e.g., fourteen or any other quantity) of transmission time intervals (TTIs). A TTI may be any transmission time interval or other time duration. A minimum latency of fourteen TTIs may comprise, for example, three TTIs after a message from step 1 1220 of a four-step RA procedure, one TTI for a message from step 2 1230 of a four-step RA procedure, five TTIs after the message from step 2, one TTI for a message from step 3 1240 of a four-step RA procedure, three TTIs after the message from step 3, and one TTI for a message from step 4 1250 of a four-step procedure (e.g., 3+1+5+1+3+1=14). The minimum latency may comprise any quantity of TTIs. Any of the above-references messages may comprise any quantity of TTIs. Reducing the number of steps in an RA procedure may reduce latency. A four-step RA procedure may be reduced to a two-step RA procedure, for example, by using parallel transmissions. A two-step RA procedure may have an associated latency. The associated latency for a two-step RA procedure may be a minimum of four TTIs and which may be less than an associated latency for a four-step RA procedure. A minimum latency of four TTIs may be a minimum of a quantity (e.g., four or any other quantity) of TTIs. A minimum latency of four TTIs may comprise, for example, three TTIs after a message from step 1 of a two-step RA procedure, and one TTI for a message from step 2 of a two-step RA procedure.

Figure 13:
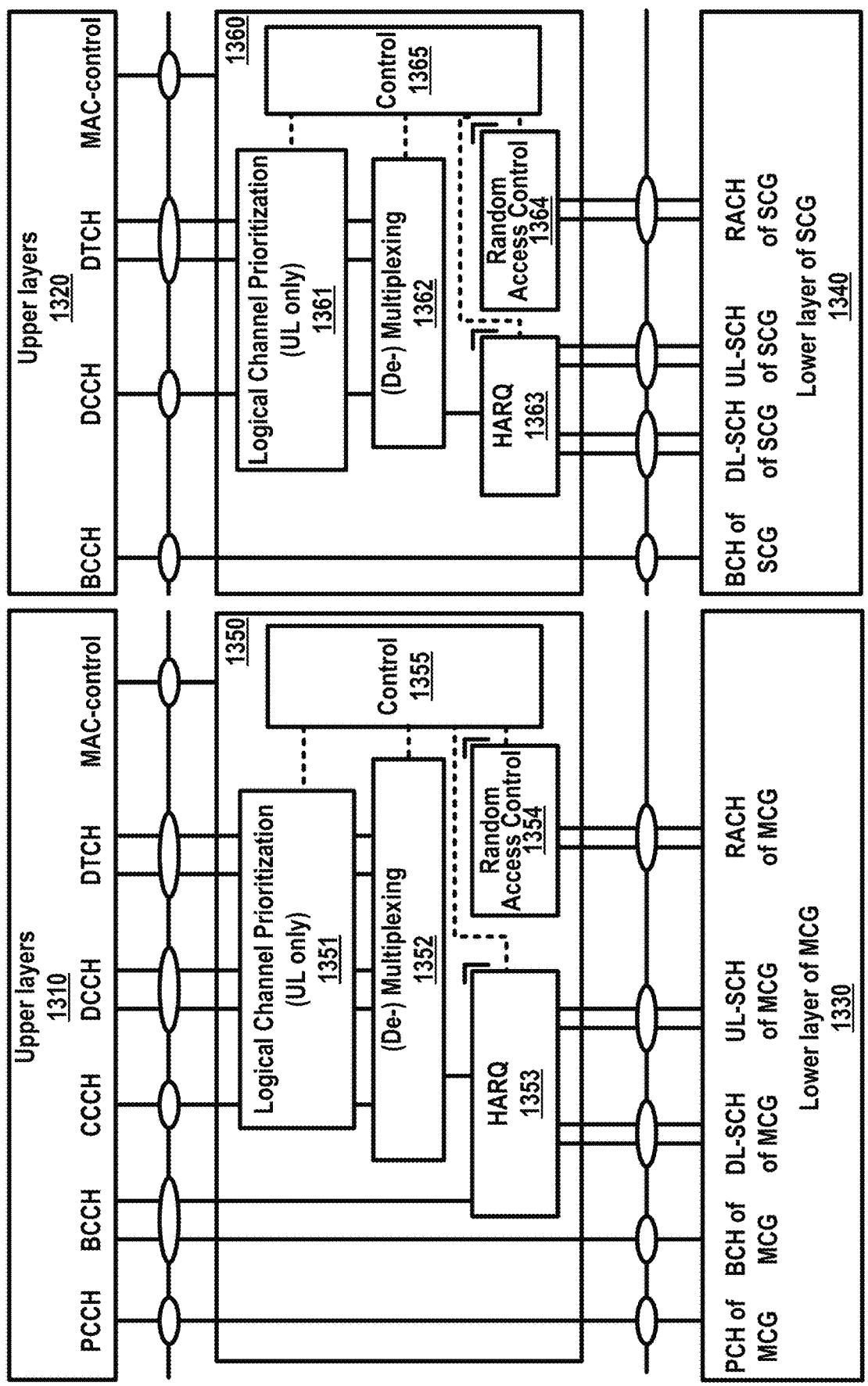
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a RA problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto TBs to be delivered to the physical layer on transport channels (e.g., in uplink), demultiplexing (e.g., (De-) Multiplexing 1352 and/or (De-) Multiplexing 1362) of MAC SDUs to one or different logical channels from TBs delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a RA process (e.g., Random Access Control 1354 and/or Random Access Control 1364).

Figure 14:
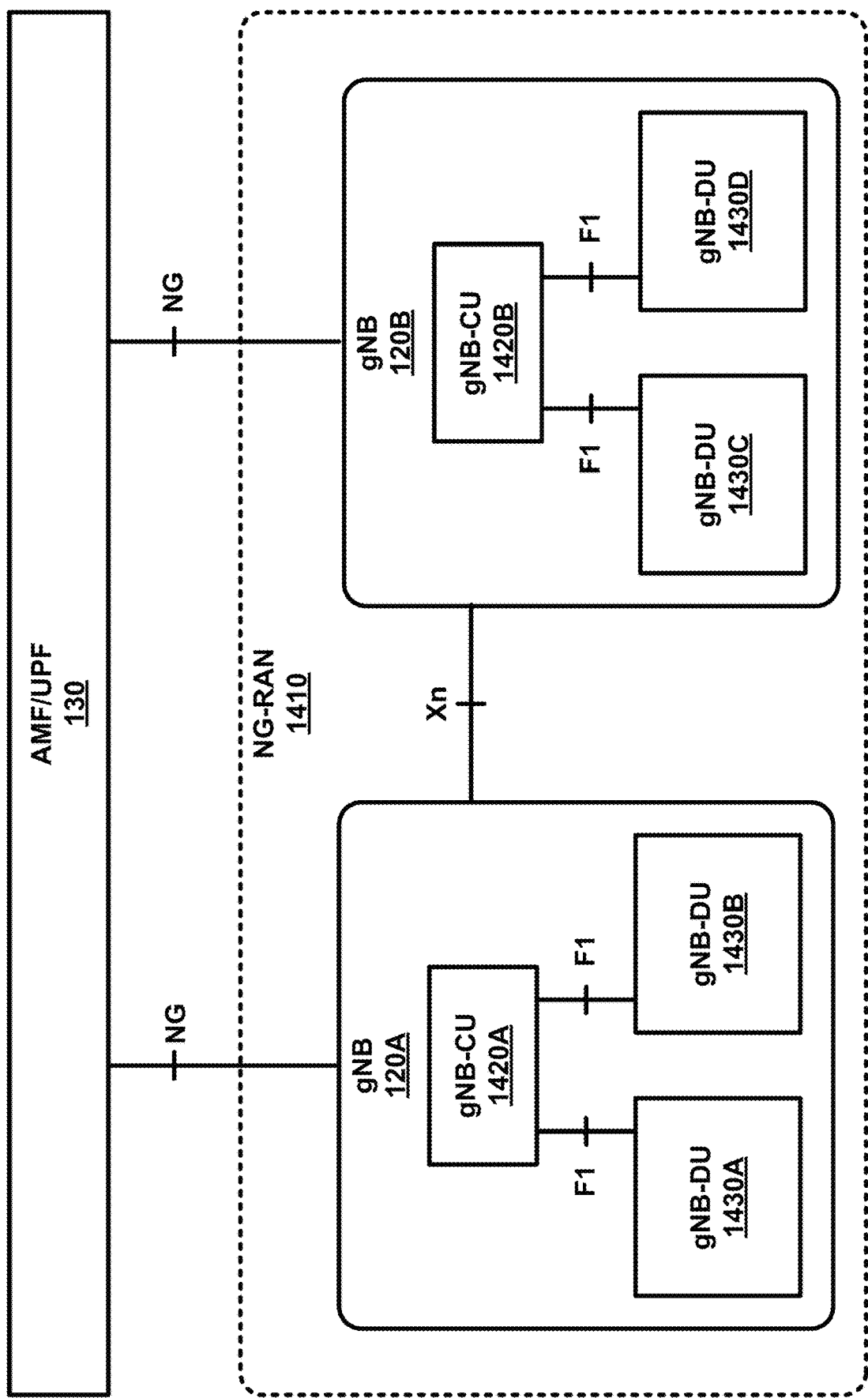
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
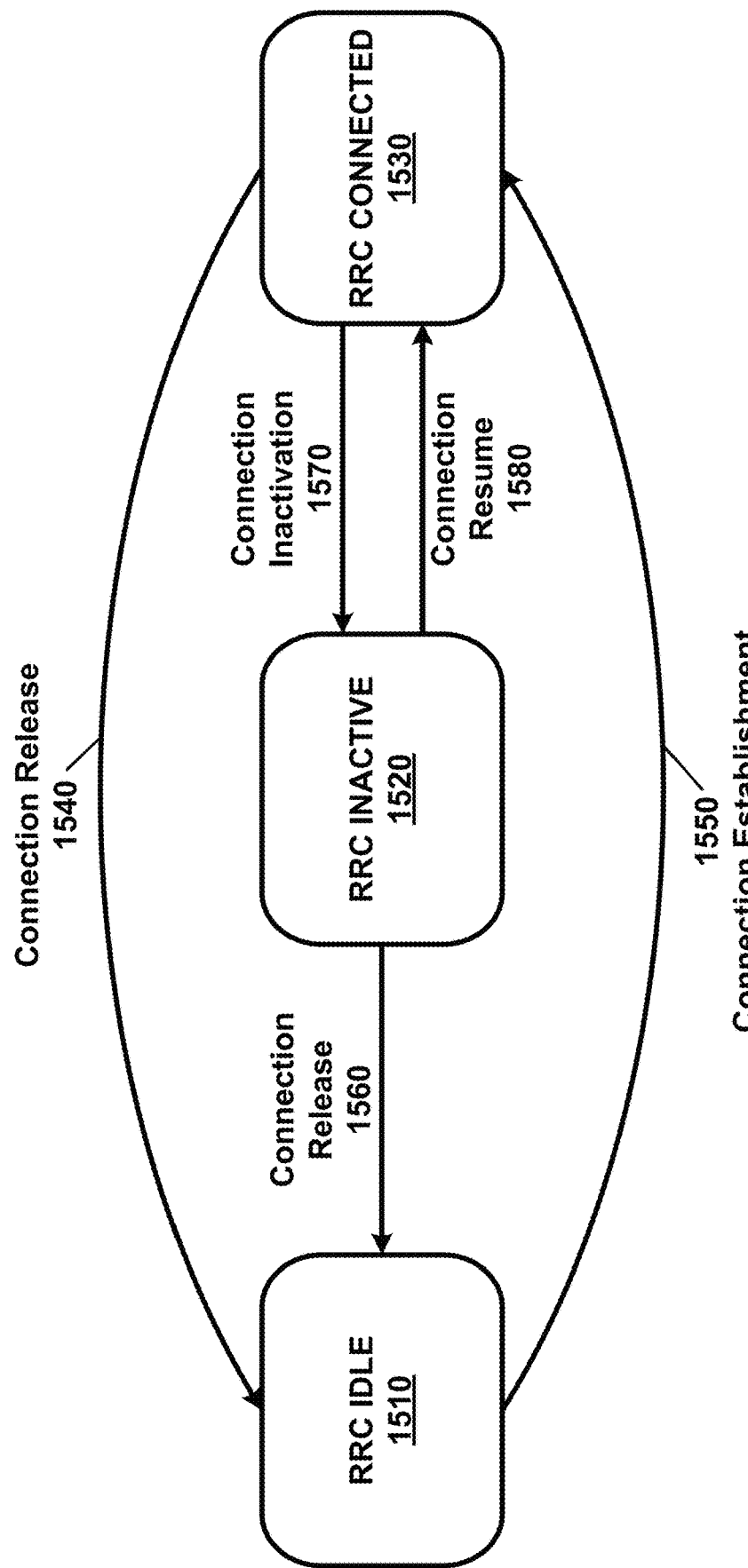
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a RA procedure by the wireless device and/or a context retrieve procedure (e.g., UE context retrieve). A context retrieve procedure may comprise: receiving, by a base station from a wireless device, a RAP; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a RA procedure to resume an RRC connection and/or to send (e.g., transmit) one or more packets to a base station (e.g., to a network). The wireless device may initiate a RA procedure to perform an RNA update procedure, for example, if a cell selected belongs to a different RNA from an RNA for the wireless device in an RRC inactive state. The wireless device may initiate a RA procedure to send (e.g., transmit) one or more packets to a base station of a cell that the wireless device selects, for example, if the wireless device is in an RRC inactive state and has one or more packets (e.g., in a buffer) to send (e.g., transmit) to a network. A RA procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

Wireless communications may comprise search procedures. A wireless device may perform a search procedure, for example, to determine a cell for communicating with a base station. A wireless device may perform a cell search. The wireless device may acquire time and frequency synchronization with a cell. The wireless device may detect a first physical layer cell ID of the cell, for example, during the cell search procedure. The wireless device may perform the cell search, for example, if the wireless device has received one or more synchronization signals (SS) (e.g., comprising the PSS and the SSS). The wireless device may assume/determine that reception occasions of one or more of a PBCH, a PSS, and/or an SSS are in consecutive symbols. The wireless device may assume/determine that reception occasions of one or more of PBCH, PSS, and/or SSS correspond to an SSB, for example, based on being in consecutive symbols. A wireless device may assume/determine that an SSS, a PBCH demodulation reference signal (DM-RS), and/or PBCH data have the same (or similar) energy per resource element (EPRE). A wireless device may assume/determine that the ratio of PSS EPRE to SSS EPRE in an SS/PBCH block is a particular value (e.g., either 0 dB, 3 dB, or any other value). A wireless device may assume/determine that the ratio of PDCCH DM-RS EPRE to SSS EPRE is within a particular range (e.g., from −8 dB to 8 dB, or any other range), for example, if the wireless device has not received dedicated higher layer parameters.

A wireless device may determine a first symbol index for one or more candidate SS/PBCH blocks (SSBs). The first symbol index for one or more candidate SSBs may be determined according to a subcarrier spacing of the SSBs, for example, for a half frame with SSBs. Index 0 may correspond to the first symbol of the first slot in a half frame. The first symbol of the one or more candidate SSBs may have indexes $\{2, 8\}+14 \cdot n$ for 15 kHz subcarrier spacing, where, for example, n=0, 1 for carrier frequencies smaller than or equal to 3 GHz (or any other frequency), and for example, n=0, 1, 2, 3 for carrier frequencies larger than 3 GHz and smaller than or equal to 6 GHz (or any other frequency). For example, n may be an index indicating a numerology configured at the carrier frequencies. The one or more candidate SSBs in a half frame may be indexed in an ascending order in time, for example, from 0 to L−1. The wireless device may determine some bits (for example, two least significant bits (LSB) for L=4, three LSB bits for L>4, or any other quantity of bits) of an SSB index per half frame from, for example, a one-to-one mapping with one or more indexes of a DM-RS sequence transmitted in the PBCH.

Access procedures (e.g., random access (RA) procedures) may be used to establish communications between a wireless device and a base station in a cell. Prior to initiation of a random access procedure, a base station may send (e.g., transmit) one or more RRC messages to configure the wireless device with one or more parameters of a RACH configuration. The one or more RRC messages may be broadcasted and/or multicasted to one or more wireless devices. The one or more RRC messages may be wireless device-specific messages (e.g., a dedicated RRC messages transmitted to a wireless device with RRC INACTIVE 1520 or RRC CONNECTED 1530). The one or more RRC messages may comprise one or more parameters for transmitting at least one preamble via one or more random access resources. The one or more parameters may indicate at least one of the following: a PRACH resource allocation, a preamble format, SSB information (e.g., total number/quantity of SSBs, downlink resource allocation of SSB transmission, a transmission power of SSB transmission, and/or other information), and/or uplink radio resources for one or more transport block transmissions.

A base station may send/transmit one or more downlink reference signals. The one or more downlink reference signals may comprise one or more discovery reference signals. A wireless device may determine/select a first downlink reference signal among the one or more downlink reference signals. The first downlink reference signal may comprise one or more SSBs. A wireless device may determine/adjust/change a downlink synchronization based on the one or more synchronization signals. The one or more downlink reference signals may comprise one or more CSI-RSs.

The one or more RRC messages may comprise one or more parameters indicating one or more downlink control channels (e.g., PDDCH). Each of the one or more downlink control channels may be associated with at least one of the one or more downlink reference signals. The first downlink reference signal may comprise system information (e.g., master information block (MIB) and/or system information block (SIB)). A base station may send/transmit the system information, for example, via the PBCH, PDCCH, and/or PDSCH.

A wireless device (e.g., MAC entity of a wireless device) may determine/select one or more random access resources for a random access procedure. The wireless device (e.g., MAC entity of the wireless device) may determine/select a first downlink reference signal. The wireless device (e.g., MAC entity of the wireless device) may determine/select the first downlink reference signal (e.g., a first SSB or a first CSI-RS) with the first reference signal received power (RSRP) above a first RSRP threshold. The first RSRP threshold may be determined/defined based on a type of reference signal (e.g., rsrp-ThresholdSSB may be for an SSB, and rsrp-ThresholdCSI-RS for a CSI-RS). The first RSRP threshold may be broadcasted, semi-statically configured, and/or predefined. The wireless device (e.g., a MAC entity of the wireless device) may determine/select the first downlink reference signal for a contention-free random access procedure, for example, for beam failure recovery or a system information request. The wireless device (e. g., a MAC entity of the wireless device) may determine/select the first downlink reference signal for a contention-based random access procedure.

A wireless device may select one or more random access resources. The one or more random access resources may comprise one or more random access preambles, one or more time resources, and/or one or more frequency resources for PRACH transmission. The one or more random access resources may be predefined. The one or more random access resources may be configured/indicated/provided by one or more RRC messages. The one or more random access resources may be configured/indicated/provided by one or more downlink control orders (e.g., a PDCCH order). The one or more random access resources may be determined based on the first downlink reference signal. A wireless device may set a first preamble index to a parameter (e.g., ra-PreambleIndex) corresponding to the first downlink reference signal.

A wireless device may send/transmit at least one random access preamble via the one or more random access resources. A wireless device may send/transmit a first preamble with the first preamble index. The first preamble may be sent/transmitted using a first PRACH format with a first transmission power via one or more PRACH resources. The one or more PRACH resources may comprise one or more PRACH occasions.

A base station may configure a wireless device with a serving cell comprising one or more channels (e.g., BWPs, sub-bands, etc.). A maximum quantity/number (e.g., 3, 4, etc.) of BWP (or other wireless resources) per a serving cell may be predefined. A base station may send/transmit a message (or a control signal) indicating BWP switching between two BWPs.

A serving cell may be configured with one or multiple BWPs, a maximum number of BWP per serving cell may be a first number. BWP switching for a serving cell may be used to activate an inactive BWP and deactivate an active BWP at a determined time. BWP switching may be controlled by a PDCCH message (e.g., signal) indicating a downlink assignment or an uplink grant (e.g., by the bwp-InactivityTimer, by RRC signalling, or by the wireless device (e.g., MAC entity of the wireless device) itself upon initiation of RA procedure). The DL BWP and UL BWP indicated by a first active downlink BWP identifier (e.g., firstActiveDownlinkBWP-Id) and a first active uplink BWP identifier (e.g., firstActiveUplinkBWP-Id) respectively may be active without receiving a message (e.g., signal) via PDCCH indicating a downlink assignment or an uplink grant, for example, based on or in response to addition of an SpCell or activation of an SCell. The active BWP for a serving cell may be indicated by either an RRC message or PDCCH message (e.g., signal). A DL BWP may be paired with a UL BWP, and BWP switching may be common for both UL and DL, for example, based on an unpaired spectrum.

The wireless device (e.g., MAC entity of the wireless device) may switch the active UL BWP to BWP indicated by an initial uplink BWP parameter (e.g., initialUplinkBWP), for example, based on or in response to initiation of the RA procedure on a serving cell and/or, PRACH occasions not being configured for the active UL BWP. The wireless device (e.g., MAC entity of the wireless device) may switch the active DL BWP to BWP indicated by an initial downlink BWP parameter (e.g., initialDownlinkBWP), for example, based on the serving cell being a SpCell. The wireless device (e.g., MAC entity of the wireless device) may perform the RA procedure on the active DL BWP of SpCell and active UL BWP of this serving cell.

The wireless device (e.g., MAC entity of the wireless device) may switch the active DL BWP to the DL BWP with the same BWP index (e.g., bwp-Id) as the active UL BWP, for example, based on or in response to initiation of the RA procedure on a serving cell, the PRACH occasions being configured for the active UL BWP, the serving cell is a SpCell, and/or if the active DL BWP does not have the same BWP index (e.g., bwp-Id) as the active UL BWP. The wireless device (e.g., MAC entity of the wireless device) may perform the RA procedure on the active DL BWP of SpCell and active UL BWP of this serving cell.

A wireless device may determine whether to switch BWP or ignore the PDCCH message for BWP switching, for example, based on the wireless device (e.g., MAC entity of the wireless device) receiving a PDCCH message for BWP switching for a serving cell while a RA procedure associated with that serving cell is ongoing in the wireless device (e.g., MAC entity of the wireless device). The wireless device may perform BWP switching to a BWP indicated by the PDCCH message, for example, based on the PDCCH reception for BWP switching addressed to the C-RNTI for successful RA procedure completion. The wireless device (e.g., MAC entity of the wireless device) may stop the ongoing RA procedure and may initiate a RA procedure on the new activated BWP, for example, based on or in response to reception of the PDCCH message for BWP switching other than successful contention resolution, and/or the wireless device (e.g., MAC entity of the wireless device) deciding to perform BWP switching. The wireless device (e.g., MAC entity of the wireless device) may continue with the ongoing RA procedure on the active BWP, for example, based on the wireless device deciding to ignore the PDCCH message for BWP switching.

A wireless device, configured for operation in BWPs of a serving cell, may be configured by higher layers for the serving cell a set of at most a first threshold value (e.g., 4, 8, 16, 32 or any other quantity) of BWPs for reception by the wireless device in a DL bandwidth (e.g., a DL BWP set) by a BWP downlink parameter (e.g., BWP-Downlink) and a set of at most a second threshold value (e.g., 4, 8, 16, 32 or any other quantity) BWPs for transmissions by the wireless device in an UL bandwidth (e.g., a UL BWP set) by a BWP uplink parameter (e.g., BWP-Uplink) for the serving cell.

An initial active DL BWP may be defined by a location and number of contiguous PRBs, a subcarrier spacing, and a cyclic prefix, for the control resource set for a downlink common search space (e.g., Type0-PDCCH common search space). A wireless device may be provided (e.g., configured with, indicated by, etc.) an initial active UL BWP by a higher layer initial uplink BWP parameter (e.g., initialuplinkBWP) for example, for operation on the primary cell or on a secondary cell. The wireless device may be provided (e.g., configured with, indicated by, etc.) an initial UL BWP on the supplementary carrier by a higher layer initial uplink BWP parameter (e.g., initialUplinkBWP) in a supplementary uplink, for example, based on the wireless device being configured with a supplementary carrier (SUL).

The wireless device may be configured with the following parameters for the serving cell for each DL BWP or UL BWP in a set of DL BWPs or UL BWPs, respectively: a subcarrier spacing provided by (e.g., configured by, stored in, indicated by, etc.) a parameter (e.g., a higher layer parameter such as, for example, subcarrierSpacing); a cyclic prefix provided by (e.g., configured by, stored in, indicated by, etc.) a parameter (e.g., a higher layer parameter such as, for example, cyclicPrefix); a first PRB and a number of contiguous PRBs indicated by a parameter (e.g., a higher layer parameter such as, for example, locationAndBandwidth) that may be interpreted as RIV, setting $N_{BWP}^{size}=275$, and the first PRB being a PRB offset relative to the PRB indicated by parameters (e.g., a higher layer parameter such as, for example, offsetToCarrier and subcarrierSpacing); an index in the set of DL BWPs or UL BWPs via a parameter (e.g., a higher layer parameter such as, for example, bwp-Id); and/or a set of BWP-common and a set of BWP-dedicated parameters via parameters (e.g., a higher layer parameter such as, for example, bwp-Common and bwp-Dedicated).

A DL BWP from the set of configured DL BWPs with index provided by (e.g., configured by, indicated by, etc.) higher layer BWP index parameter (e.g., bwp-Id) for the DL BWP is linked with an UL BWP from the set of configured UL BWPs with index provided (e.g., configured by, indicated by, etc.) by higher layer BWP index parameter (e.g., bwp-Id) for the UL BWP if the DL BWP index and the UL BWP index are equal, for example, based on unpaired spectrum operation A wireless device may not expect to receive a configuration where the center frequency for a DL BWP is different than the center frequency for an UL BWP if the BWP index parameter (bwp-Id) of the DL BWP is equal to the bwp-Id of the UL BWP, for example, based on unpaired spectrum operation.

FIG. 16 shows an example BWP configuration information element (e.g., a BWP IE). A BWP IE may be used to configure a BWP. The network may configure at least an initial BWP comprising at least a downlink BWP and one (e.g., if the serving cell is configured with an uplink) or two (e.g., if using supplementary uplink (SUL)) uplink BWPs, for example, for each serving cell. The network may configure additional uplink and downlink BWPs for a serving cell.

The BWP configuration may be split into uplink and downlink parameters and/or into common and dedicated parameters. Common parameters (e.g., BWP-UplinkCommon and BWP-DownlinkCommon) may be cell specific and/or the network may ensure the necessary alignment with corresponding parameters of other wireless devices. Common parameters of the initial BWP of the PCell may be provided via system information. The network may provide the common parameters via dedicated signaling.

A field, IE, or prefix (e.g., cyclic prefix) may indicate whether to use the extended cyclic prefix for this BWP. The wireless device may use the normal cyclic prefix (CP), for example, if the CP is not set. Normal CP may be supported for all numerologies and slot formats. Extended CP may be supported only for 60 kHz subcarrier spacing (or some other frequency subcarrier spacing). A parameter (e.g., locatio-nAndBanddwidth) may indicate a frequency domain location and/or a bandwidth of this BWP. The value of the field may be interpreted as a RIV. A first PRB may be a PRB determined by a subcarrier spacing parameter (e.g., subcarrierSpacing) of this BWP and/or an offset parameter (e.g., offsetToCarrier (configured in SCS-SpecificCarrier contained within FrequencyInfoDL)) corresponding to this subcarrier spacing. A BWP-pair (e.g., UL BWP and DL BWP with the same index) may have the same center frequency, for example, based on use of TDD. The subcarrier spacing parameter may indicate subcarrier spacing to be used in this BWP for channels and reference signals unless explicitly configured elsewhere. The value kHz15 may correspond to $\mu=0$, kHz30 to $\mu=1$, and so on. The values 15, 30, or 60 kHz may be used. A BWP index (e.g., bwp-Id) may indicate an identifier for a BWP.

Other parts of the RRC configuration may use the BWP index (e.g., BWP-Id) to associate with a particular BWP. A particular BWP ID (e.g., BWP ID=0) may be associated with an initial BWP and/or may not be used with other BWPs. The network (NW) (e.g., the base station) may trigger the wireless device to switch UL or DL BWP using a DCI field. The four code points in the DCI field may map to the RRC-configured BWP index (e.g., BWP-Id). The DCI code point may be equivalent to the BWP ID (initial=0, first dedicated=1, . . . ), for example, for up to three configured BWPs (in addition to the initial BWP). The BWPs may be identified by DCI code points 0 to 3, for example, if the NW configures 4 dedicated BWPs. It may not be possible to switch to the initial BWP using the DCI field, for example, with this configuration. The BWP index (e.g., bwp-Id) may indicate an identifier for a BWP. Other parts of the RRC configuration may use the BWP index (e.g., BWP-Id) to associate themselves with a particular BWP. A BWP ID=0 may be associated with the initial BWP and may not be used in other BWPs.

The NW may trigger the wireless device to switch an UL BWP and/or a DL BWP using a DCI field. The four code points in that DCI field may map to the RRC-configured BWP index (e.g., BWP-ID). The DCI code point may be equivalent to the BWP index (e.g., BWP ID where initial=0, first dedicated=1, . . . ), for example, for up to three configured BWPs (in addition to the initial BWP). The BWPs may be identified by DCI code points 0 to 3, for example, if the NW configures four dedicated BWPs. It may not be possible to switch to the initial BWP using the DCI field, for example, with this configuration. A common random access configuration (e.g., rach-ConfigCommon) may indicate configuration of cell specific RA parameters that the wireless device may use for contention based random access, contention free random access, and/or contention based beam failure recovery. The NW may configure SSB-based RA (including RACH-ConfigCommon) for UL BWPs, for example, based on the linked DL BWPs allowing the wireless device to acquire the SSB associated to the serving cell. An uplink control channel configuration (e.g., PUCCH-config) may indicate an uplink control channel configuration (e.g., PUCCH configuration) for one BWP of the regular UL or SUL of a serving cell. The network may configure PUCCH on the BWPs of one of the uplinks (UL or SUL), for example, if the wireless device is configured with SUL.

The network may configure PUCCH-Config for each SpCell. The network may configure one additional SCell of a cell group with an uplink control channel configuration (e.g., PUCCH-Config for a PUCCH SCell), for example, if supported by the wireless device. The IE BWP-Id may be used to refer to BWP. The initial BWP may be referred to by a zero index (e.g., BWP-Id 0). The other BWPs may be referred to by a non-zero index (e.g., BWP-Id 1 to a maximum number/quantity of BWPs (e.g., maxNrofBWPs)).

FIG. 17 shows an example serving cell configuration information element. A serving cell configuration (e.g., ServingCellConfig IE) may be used to configure (e.g., add or modify) the wireless device with a serving cell. The serving cell may be the SpCell or an SCell of an MCG or SCG. The parameters of the serving cell configuration may comprise wireless device specific parameters and/or cell specific parameters (e.g. additionally configured BWPs).

A default downlink BWP index (e.g., defaultDownlinkBWP-Id) may correspond to a default L1 downlink BWP parameter (e.g., 'default-DL-BWP'). The initial BWP may be referred to by a BWP index (e.g., BWP-Id=0). The ID of the downlink BWP may be used after timer expiry. This ID field may be wireless device specific. The wireless device may use the initial BWP as default BWP, for example, if the field is absent.

An initial downlink BWP (e.g., InitialDownlinkBWP) may indicate a dedicated (e.g., wireless device-specific) configuration for the initial downlink BWP. A first active uplink BWP identifier (e.g., FirstActiveUplinkBWP-Id), if configured for an SpCell, may comprise the ID of the DL BWP to be activated upon performing the reconfiguration in which it is received. The RRC reconfiguration may not impose a BWP switching (e.g., corresponding to L1 parameter 'active-BWP-UL-Pcell'), for example, if the field is absent. This field may comprise the ID of the uplink BWP to be used upon MAC-activation of an SCell, for example, if configured for an SCell. The initial BWP may be referred to as BandwidthPartId=0. An initial uplink BWP (e.g., InitialUplinkBWP) may indicate a dedicated (e.g., wireless device-specific) configuration for the initial uplink BWP.

A wireless device may be configured (e.g., by a base station) with one or more UL carriers associated with a DL carrier of a cell. One of one or more UL carriers configured with a DL carrier may be referred to as a supplementary uplink (SUL) carrier or a normal UL (NUL or may be referred to as a non-SUL) carrier. A base station may enhance UL coverage and/or capacity by configuring an SUL carrier. A base station may configure a BWP configuration per an uplink (e.g., per uplink carrier) associated with a cell. One or more BWPs on an SUL may be configured (e.g., by a base station) separately from one or more BWPs on a NUL. A base station may control an active BWP of an SUL independently of an active BWP of a NUL. A base station may control two or more uplink transmissions on two or more UL carriers (e.g., NUL and SUL) to avoid overlapping PUSCH transmissions in time. SUL and/or NUL may be configured in an unlicensed band. A wireless device may be configured (e.g., by a base station) with one or more following: an SUL in a licensed band and a NUL in a licensed band; an SUL in a licensed band and a NUL in an unlicensed band; an SUL in an unlicensed band and a NUL in a licensed band; and/or an SUL in an unlicensed band and a NUL in an unlicensed band.

An SUL carrier and a NUL carrier may be configured (e.g., by a base station) to support a RA procedure (e.g., initial access). Support for a RA to a cell configured with SUL is shown in FIG. 12, described above. A RACH configuration 1210 of an SUL may be configured (e.g., by a base station) independent of a RACH configuration 1210 of an NUL. One or more parameters associated with Msg1 1220, Msg 2 1230, Msg 3 1240, and/or contention resolution 1250 via an SUL may be configured independent of one or more parameters associated with Msg1 1220, Msg 2 1230, Msg 3 1240, and/or contention resolution 1250 via an NUL. One or more parameters associated with PRACH transmissions in Msg 1 1220 via an SUL may be independent of one or more parameters associated with PRACH transmission via an NUL.

A wireless device may determine which carrier (e.g., between NUL and SUL) to use, for example, based on an RA procedure in an unlicensed band and/or in a licensed bands and/or based on a measurement (e.g., RSRP) of one or more DL pathloss references. A wireless device may select a first carrier (e.g., SUL or NUL carrier) if a measured quality (e.g., RSRP) of DL pathloss references is less than a broadcast threshold (e.g., an RRC parameter, rsrp-ThresholdSSB-SUL in RACH-ConfigCommon). One or more uplink transmissions associated with the RA procedure may remain on the selected carrier, for example, based on a wireless device selecting a carrier between SUL carrier and NUL carrier for an RA procedure.

Figure 18:
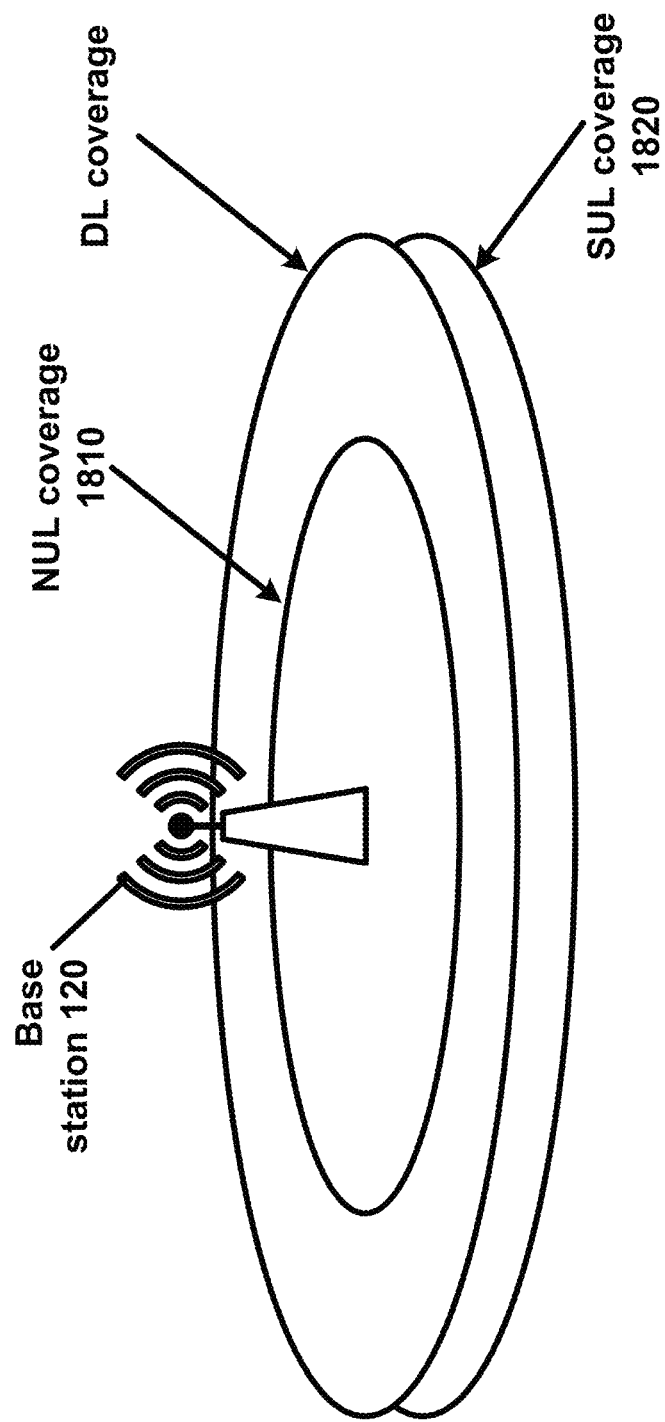
FIG. 18 shows an example of a coverage of a cell configured with a downlink and two uplinks.

FIG. 18 shows an example of a coverage of a cell configured with a DL and two UL carriers. A base station 120 may configure a NUL and DL over a first frequency (e.g., high frequency). An SUL may be configured over a second frequency (e.g., low frequency) to support uplink transmission (e.g., in terms of coverage and/or capacity) of a cell. A broadcast threshold (e.g., an RRC parameter, rsrp-ThresholdSSB-SUL) for a wireless device to select a carrier may be determined such that a wireless device located outside a NUL coverage 1810 but inside an SUL coverage 1820 may start a RA procedure via an SUL. A wireless device located inside a NUL coverage 1810 may start a RA procedure via a NUL. A wireless device may use a RACH configuration associated with a selected carrier for a RA procedure.

A wireless device may perform a contention based RA procedure and/or a contention free RA procedure. A wireless device may perform a RA procedure on an UL selected based on a broadcast threshold (e.g., rsrp-ThresholdSSB-SUL). A base station may not indicate (e.g., explicitly) to the wireless device which carrier to start a RA procedure. A base station may indicate which carrier a wireless device performs a RA procedure by sending a RACH configuration with an SUL indicator (e.g., 0 may indicates a NUL carrier, 1 may indicate an SUL carrier or vice versa). A base station may indicate (e.g., explicitly) to a wireless device which UL carrier is to be used for a contention free or contention based RA procedure. A base station may indicate a contention free RA procedure by sending a RACH configuration with a dedicated preamble index. A base station may indicate a contention based RA procedure by sending a RACH configuration without a dedicated preamble index.

A base station may select a carrier between NUL carrier(s) and/or SUL carrier(s), for example, based on the quality of the one or more measurements and/or if a wireless device sends quality information of one or more measurements on one or more DL reference signals associated with NUL carrier(s) and/or SUL carrier(s). A base station may indicate, to a wireless device, a selected carrier via RRC signaling (e.g., handover) and/or PDCCH order (e.g., SCell addition) for initiating a (contention free or contention based) RA procedure. For load balancing between NUL carrier(s) and/or SUL carrier(s), a base station may select one of NUL and SUL carrier by taking into consideration congestion in NUL carrier(s) and/or SUL carrier(s). A base station may better select a carrier (e.g., NUL or SUL) of a target cell for a (contention free or contention based) RA procedure for a handover, for example, based on one or more measurement reports associated with NUL carrier(s) and/or SUL carrier(s). A base station may better select a carrier (e.g., NUL or SUL) of an SCell (e.g., if the SCell is configured with at least a NUL carrier and an SUL carrier) for a (contention free or contention based) RA procedure for an SCell addition, for example, based on one or more measurement reports associated with NUL carrier(s) and/or SUL carrier(s).

A base station may determine whether SUL carrier(s) is (are) configured in an SCell, and/or which carrier is allowed to be used for an SCell addition. A base station may configure DL measurements on NUL carrier(s) and/or SUL carrier(s). A base station may configure a wireless device with one or more RACH configurations for an SCell, e.g., a first RACH configuration for an SUL carrier, a second RACH configuration for a NUL carrier, and so on. A base station may send (e.g., transmit), to a wireless device via a PDCCH order comprising a parameter indicating in which carrier the wireless device starts a (contention free or contention based) RA procedure. A PDCCH order triggering a (contention free or contention based) RA procedure may comprise one or more parameters indicating at least one of at least one preamble (e.g., preamble index), one or more PRACH resources (e.g., PRACH mask index), an SUL indicator, and/or a BWP indicator. A wireless device receiving a PDCCH order may send (e.g., transmit) at least one preamble via one or more PRACH resources of a BWP indicated by a BWP indicator of a carrier indicated by an SUL indicator, for example, for a RA procedure.

Figure 19:
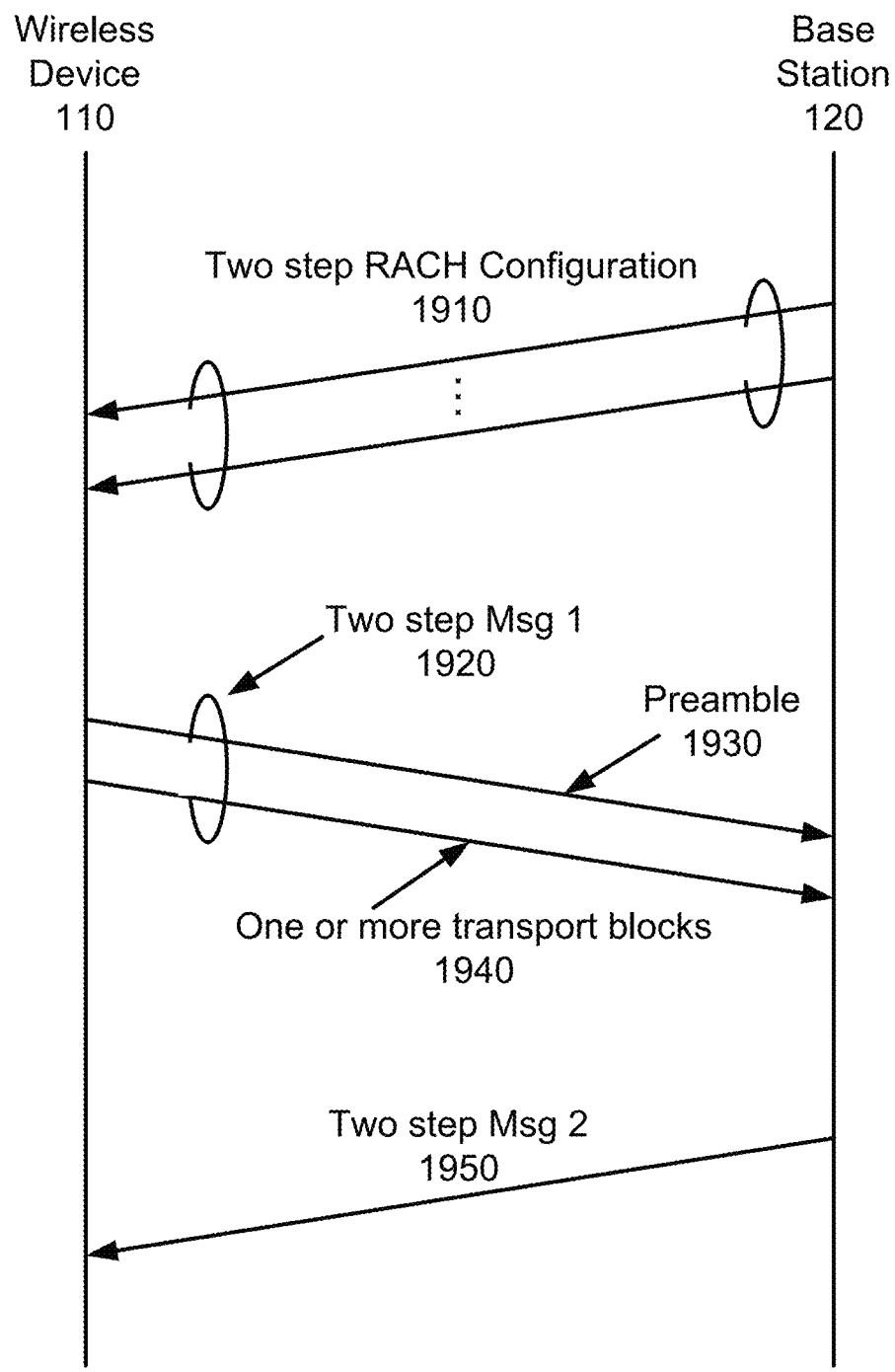
FIG. 19 shows an example of a two-step RA procedure.

FIG. 19 shows an example of a two-step RA procedure. The two-step RA procedure may comprise an uplink (UL) transmission of a two-step Msg1 1920 that may comprise a random access preamble (RAP) transmission 1930 and one or more transport blocks transmission 1940, followed by a downlink (DL) transmission of a two-step Msg2 1950 that may comprise a response (e.g., random access response (RAR)) corresponding to the uplink transmission. The response may comprise contention resolution information. The two-step Msg1 1920 may be referred to as a message A (MsgA). The two-step Msg2 1950 may be referred to as a message B (MsgB).

A base station may send/transmit one or more RRC messages to configure a wireless device with one or more parameters of two step RACH configuration 1910. The one or more RRC messages may be broadcasted, multicasted, and/or unicasted to one or more wireless devices. The one or more RRC messages may be wireless device-specific messages (e.g., a dedicated RRC message transmitted to a wireless device with RRC INACTIVE 1520 or RRC CONNECTED 1530). The one or more RRC messages may comprise parameters for sending/transmitting a two-step Msg1 1920. The parameter may indicate at least one of the following: a PRACH resource allocation, a preamble format, SSB information (e.g., a total number/quantity of SSBs, downlink resource allocation of SSB transmission, a transmission power of SSB transmission, and/or other information), and/or uplink radio resources for one or more transport block transmissions.

A wireless device may send/transmit, via a cell and to a base station, an RAP for UL time alignment and/or one or more transport blocks (e.g., delay-sensitive data, wireless device ID, security information, device information, such as IMSI, and/or other information) in a UL transmission of a two-step RA procedure. A base station may send/transmit a two-step Msg2 1950 (e.g., an RAR), for example, in a DL transmission of the two-step RA procedure. The two-step Msg2 1950 may comprise at least one of the following: a timing advance command indicating the TA value, a power control command, a UL grant (e.g., radio resource assignment, and/or MCS), a wireless device ID for contention resolution, an RNTI (e.g., C-RNTI or TC-RNTI), and/or other information. The two-step Msg2 1950 (e.g., an RAR) may comprise a preamble indicator/identifier corresponding to the preamble 1930, a positive or negative acknowledgement of a reception of the one or more transport blocks 1940, and/or an indication of a successful decoding of the one or more transport blocks 1940. A two-step RA procedure may reduce RA latency in comparison with a four-step RA procedure, for example, by integrating a random access preamble transmission (e.g., a process to obtain a timing advance value) with one or more transport block transmissions.

A wireless device may send/transmit, via a cell and to a base station, an RAP in parallel with one or more TBs at least during a portion of time, for example, in a UL transmission of a two-step RA procedure. The wireless device may acquire one or more configuration parameters for the UL transmission, for example, before the wireless device starts a two-step RA procedure (e.g., at step 1910 in FIG. 19). The one or more configuration parameters may indicate at least one of the following: a PRACH resource allocation, a preamble format, SSB information (e.g., a number/quantity of transmitting SSBs, downlink resource allocation of SSB transmissions, a transmission power of SSB transmission, and/or other information), uplink radio resources (in terms of time, frequency, code/sequence/signature) for one or more transport block transmissions, and/or power control parameters of one or more TB transmissions (e.g., cell and/or UE specific power adjustments used for calculating received target power, inter-cell interference control parameter that may be used as a scaling factor of pathloss measurement, reference signal power to calculate for pathloss measurement, and/or one or more margins).

A wireless device may generate a RAP. A two-step RACH configuration may comprise an RAP generating parameters (e.g., a root sequence) that may be used by the wireless device to generate an RAP. The wireless device may use the RAP generating parameters to generate one or more candidate preambles and/or the wireless device may randomly select one of the candidate preambles as the RAP. The RAP generating parameters may be SSB specific and/or cell-specific. RAP generating parameters for a first SSB may be different from, or the same as, an RAP generating parameters for a second SSB. A base station may send/transmit a control message (e.g., an RRC message for a handover, and/or a PDCCH order for a secondary cell addition) that comprises a preamble index of an RAP dedicated to a wireless device, for example, to initiate a two-step RA procedure. The one or more candidate preambles may be classified or organized into groups that may indicate an amount of data for transmission. The amount of data may indicate one or more transport blocks that remain in the buffer. Each of the groups may be associated with a range of a data size. A first group of the groups may comprise RAPs associated with (e.g., indicated for) small data transmissions. A second group may comprise RAPs associated with (e.g., indicated for) large/larger data transmissions. A base station may send/transmit an RRC message comprising one or more thresholds with which a wireless device may determine a group of RAPs (e.g., by comparing the one or more thresholds and the amount of data). The wireless device may be able to indicate a size of data for transmission, for example, by sending/transmitting an RAP determined/selected from a specific group of RAPs.

A wireless device may send/transmit the RAP via a RACH resource indicated by a two-step RACH configuration, for example, in a two-step RA procedure. The wireless device may send/transmit one or more TBs via a UL radio resource indicated by a two-step RACH configuration. The transmission of the RAP may be overlapped in time (e.g., partially or entirely) with the transmission of the one or more TBs. The two-step RACH configuration may indicate an overlapped portion of radio resources between the RAP and one or more TB transmissions. The two-step RACH configuration may indicate one or more UL radio resources associated with one or more RAPs (or RAP groups) and/or the RACH resource. A wireless device may determine at least one UL radio resource via which the wireless device may send/transmit one or more TBs as a part of a two-step RACH procedure, for example, based on a determination/selection of an RAP, an RAP group, and/or a RACH resource. The one or more UL radio resources may be indicated based on a frame structure (e.g., shown in FIG. 6), and/or an OFDM radio structure (e.g., shown in FIG. 8), for example, with respect to an SFN (SNR=0), a slot number, and/or an OFDM symbol number for a time domain radio resource, and/or with respect to a subcarrier number, a number of resource elements, a number of resource blocks, an RBG number, and/or a frequency index for a frequency domain radio resource. The one or more UL radio resources may be indicated based on a time offset and/or a frequency offset with respect to one or more RACH resources of a selected RAP. The UL transmissions may occur, for example, in the same subframe (or slot/mini-slot), in consecutive subframes (or slot/mini-slot), or in the same burst.

A listen-before-talk (LBT) procedure may be implemented for transmission in an unlicensed cell (or an unlicensed band, an unlicensed sub-band, etc.). A cell operating in an unlicensed band may be referred to as an unlicensed cell, an LAA cell, and/or an NR-U cell. The unlicensed cell may be operated as non-standalone with an anchor cell in a licensed band or standalone without an anchor cell in a licensed band. An LBT procedure may comprise a clear channel assessment (CCA). In an LBT procedure, a wireless device (e.g., equipment) may apply a CCA before using the unlicensed cell or channel. The CCA may comprise an energy detection that may determine the presence of other signals on a channel (e.g., channel is occupied) or absence of other signals on a channel (e.g., channel is clear/unoccupied). A regulation of a country may impact the LBT procedure. For example, European and Japanese (or other country/region/area) regulations may mandate the usage of an LBT procedure in the unlicensed bands, such as the 5 GHz unlicensed band. Apart from regulatory requirements, carrier sensing via an LBT procedure may be used to allow different devices and/or networks attempting to utilize the unlicensed band to share the resources of the unlicensed band.

A channel reservation may be enabled by a transmission of signals, by a cell (e.g., an NR-U cell), after or in response to gaining channel access based on a successful LBT operation/procedure. Other nodes (e.g., one or more device (e.g., Wi-Fi node(s), LAA cell, and/or NR-U cell) operating in an unlicensed band) may receive the signals (e.g., sent/transmitted for the channel reservation) with an energy level above a certain threshold. The other nodes may determine that the channel is occupied. Functions that may need to be supported by one or more signals for operation in an unlicensed band with discontinuous downlink transmission may comprise one or more of the following: detection of the downlink transmission in an unlicensed band (e.g., including cell identification) by wireless devices; and/or time and/or frequency synchronization of wireless devices.

Downlink transmission and frame structure design for operation in an unlicensed band may use subframe, (mini-)slot, and/or symbol boundary alignment according to timing relationships across serving cells aggregated by a carrier aggregation. This use may not imply that base station transmissions start at the subframe, (mini-)slot, and/or symbol boundary. Unlicensed cell operation (e.g., LAA and/or NR-U) may support transmitting PDSCH transmissions, for example, if not all OFDM symbols are available for transmission in a subframe according to an LBT procedure. Delivery of control information for the PDSCH transmission(s) may be supported.

An LBT procedure (and/or a channel access procedure) may be used for coexistence of a radio access technology (e.g., LTE, NR, or any other access technology) with other operators and technologies operating in an unlicensed band. A node attempting to send/transmit a signal via a carrier in an unlicensed band may perform a CCA as a part of an LBT procedure to determine if the channel is free for use. The LBT procedure may involve energy detection to determine if the channel is being used. Regulatory requirements in some regions/countries/areas (e.g., in Europe) may specify an energy detection threshold such that if a node receives energy greater than the threshold, the node may assume/determine that the channel is being used and/or is not available. While nodes may follow such regulatory requirements, a node may optionally use a lower threshold for energy detection than that may be specified by regulatory requirements. A radio access technology (e.g., LTE, NR, and/or any other access technology) may use a mechanism to adaptively change the energy detection threshold. The radio access technology (e.g., NR-U) may use a mechanism to adaptively lower the energy detection threshold from an upper bound. An adaptation mechanism may not preclude static or semi-static setting of the threshold. A category 4 LBT (CAT4 LBT) mechanism and/or other type of LBT mechanism may be implemented.

Various example LBT mechanisms may be implemented. At least one configuration may be such that no LBT procedure may be performed by a sending/transmitting entity (e.g., a wireless device and/or a base station), for example, for some signals, in some implementation scenarios, in some situations, and/or in some frequencies. A category 1 (CAT1, e.g., no LBT) may be implemented in one or more cases. If a channel in an unlicensed band may be occupied by a first device (e.g., a base station for DL transmission), a second device (e.g., a wireless device) may take over the channel for a transmission without performing the CAT1 LBT. A category 2 (CAT2, e.g. LBT without random back-off and/or one-shot LBT) may be implemented. The duration of time determining that the channel is idle may be deterministic (e.g., by a regulation). A base station may send/transmit an uplink grant indicating a type of LBT procedure (e.g., CAT2 LBT) to a wireless device. CAT1 LBT and CAT2 LBT may be used for COT sharing. A base station may send/transmit an uplink grant comprising a type of LBT procedure. A wireless device may send/transmit uplink control information comprising a type of LBT procedure. CAT1 LBT and/or CAT2 LBT in the uplink grant (or uplink control information) may indicate, to a receiving device (e.g., a base station and/or a wireless device) to trigger COT sharing. Category 3 (CAT3, e.g., LBT with a random back-off with a contention window of a fixed size) may be implemented. The LBT procedure may have the following procedure as one of its components. The sending/transmitting entity (e.g., a wireless device and/or a base station) may draw a random quantity/number N within a contention window. The size of the contention window may be specified by the minimum and maximum value of N. The size of the contention window may be fixed. The random quantity/number N may be used in the LBT procedure to determine the duration of time that the channel is determined (e.g., sensed) to be idle before the sending/transmitting entity sends/transmits a signal via the channel Category 4 (CAT4, e.g., LBT with a random back-off with a contention window of a variable size) may be implemented. The sending/transmitting entity (e.g., a wireless device and/or a base station) may draw/determine a random quantity/number N within a contention window. The size of contention window may be specified by the minimum and maximum value of N. The sending/transmitting entity may vary the size of the contention window, for example, if drawing/determining the random quantity/number N. The random quantity/number N may be used in the LBT procedure to determine the duration of time that the channel may be determined (e.g., sensed) to be idle before the sending/transmitting entity sends/transmits a signal via the channel.

A wireless device may use an UL LBT. The UL LBT may be different from a DL LBT (e.g., by using different LBT mechanisms or parameters), for example, a radio access technology UL (e.g., NR-U UL) may be based on scheduled access which may affect channel contention opportunities of a wireless device. Other considerations motivating a different UL LBT may comprise, but are not limited to, multiplexing of multiple wireless devices in a subframe (slot, and/or mini-slot).

DL transmission burst(s) may be a continuous (unicast, multicast, broadcast, and/or combination thereof) transmission by a base station (e.g., to one or more wireless devices) via (e.g., on) a carrier component (CC). UL transmission burst(s) may be a continuous transmission from one or more wireless devices to a base station via (e.g., on) a CC. DL transmission burst(s) and UL transmission burst(s) on a CC in an unlicensed band may be scheduled in a TDM manner over the same unlicensed carrier. Switching between DL transmission burst(s) and UL transmission burst(s) may require an LBT procedure (e.g., CAT1 LBT, CAT2 LBT, CAT3 LBT, and/or CAT4 LBT). An instant in time may be part of a DL transmission burst or a UL transmission burst.

A failure of a random access may occur due to an LBT procedure, for example, in an unlicensed band. At least one LBT procedure may be performed, for example, prior to DL and/or UL transmission in an unlicensed band. In a random access procedure (e.g., in FIG. 12), Msg 1 1220, Msg 2 1230, Msg 3 1240, and contention resolution 1250 may require at least one LBT procedure before the transmission for contention-based random access (e.g., at least 4 LBTs). For contention-free random access, Msg 1 1220 and Msg2 1230 may require at least one LBT (e.g., at least 2 LBTs).

Figure 20:
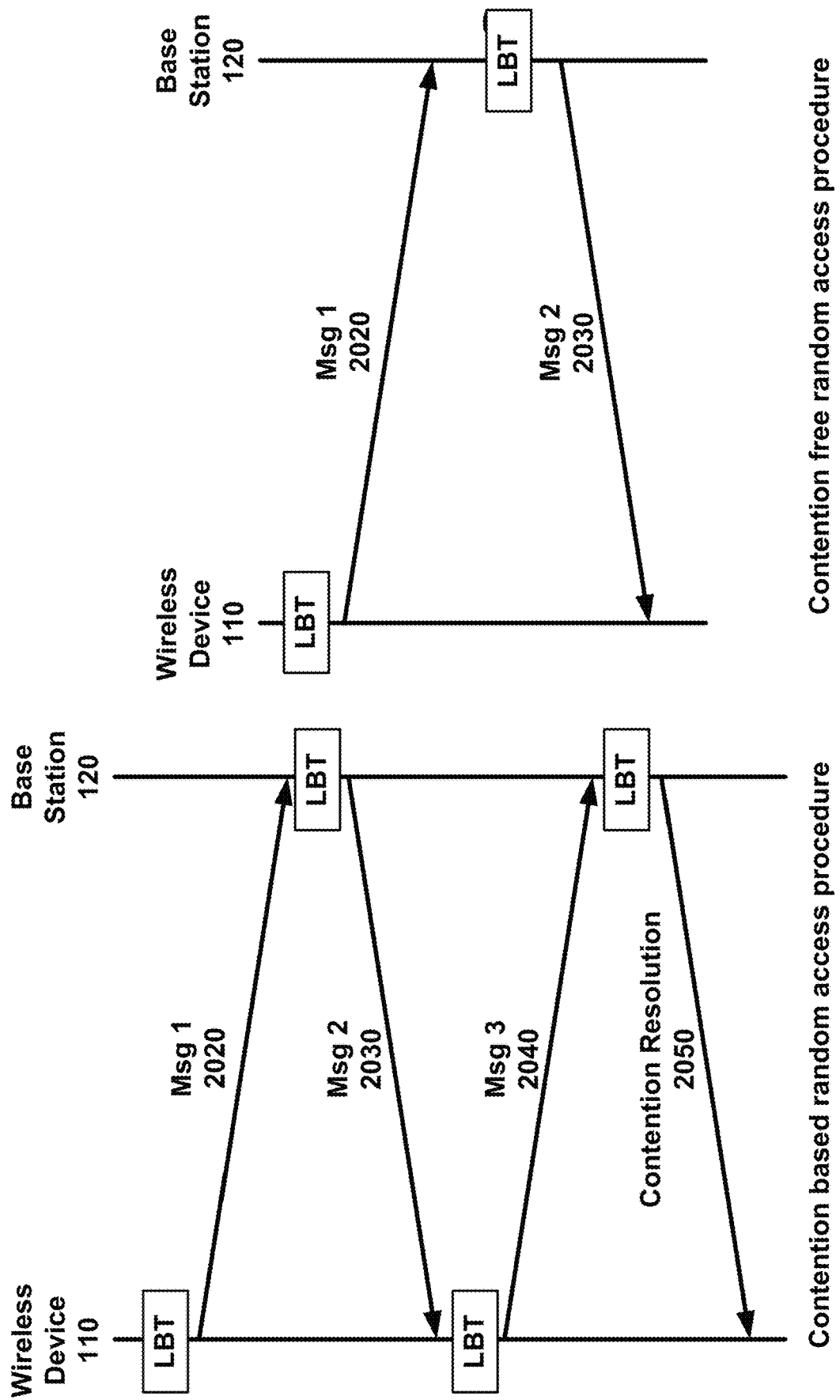
FIG. 20 shows an example of contention based and contention-free random access (RA) procedures with LBT.

FIG. 20 shows contention based and contention-free random access procedures with LBT. A successful contention based random access procedure may use Msg 1 2020, Msg 2 2030, Msg 3 2040, and contention resolution 2050 to perform the RA procedure with the wireless device 110 and base station 120. The wireless device may perform a first LBT, determine that the medium is clear, and send Msg 1 2020 to a base station 120. The base station 120 may perform a second LBT, determine that the medium is clear, and send Msg 2 2030 to the wireless device 110. The wireless device 110 may perform a third LBT, determine the medium is clear, and send Msg 1 2040 to the base station 120. The base station 1120 may perform a fourth LBT, determine that the medium is clear, and sends contention resolution 2050 to the wireless device 110.

A successful contention-free based RA procedure may use Msg 1 2020 and Msg 2 2030 to perform the RA procedure with the wireless device 110 and the base station 120. The wireless device 110 may perform a first LBT, determine that the medium is clear, and send Msg 1 2020 to the base station 120. The base station 120 may perform a second LBT, determine that the medium is clear, and send Msg 2 2030 to the wireless device 110.

A failure of a RA may occur due to LBT, for example, in an unlicensed band. At least one LBT may be performed prior to DL and/or UL transmission. Msg 1 1220, Msg 2 1230, Msg 3 1240, and/or contention resolution 1250 may require at least one LBT before the transmission (e.g., at least 4 LBTs), for example, in a contention based random access procedure. Msg 1 1220 and Msg2 1230 may require at least one LBT each (e.g., at least 2 LBTs), for example, for a contention-free random access procedure. A base station and/or a wireless device may not send (e.g., transmit) a message (e.g., Msg 1 2020, Msg 2 2030, Msg 3 2040, and/or contention resolution 2050) for a RA procedure, for example, if the LBT procedure has failed prior to sending the message (e.g., CCA in LBT determines that a channel in an unlicensed band is busy (e.g., occupied by another device)).

A failure of an LBT procedure may result in degrading a user experience (e.g., in terms of QoS, capacity (e.g., throughput), and/or coverage). A base station and/or a wireless device may wait until the channel becomes idle. This waiting may result in a latency problem to make a radio link connection between a base station and a wireless device. A failure of an LBT during a RA procedure may lead a long delay for a wireless device to receive an UL grant and/or TA value from a base station. This delay may result in a call drop and/or traffic congestion. A failure of an LBT procedure in a RA procedure for an SCell addition may lead a cell congestion (e.g., load imbalancing) on one or more existing cells (e.g., if an SCell may not take over traffic from the one or more existing cells in time).

An efficiency of RA procedure operating in an unlicensed band may degrade with LBT failure, which may cause a latency/delay, and/or performance degradation. A wireless device and/or a base station may have one or more transmission opportunities in a time and/or frequency domain during an RA procedure. Selecting one or more SSBs and performing one or more LBT procedures via one or more PRACH occasions associated with the one or more SSBs may increase a success rate of LBT procedures. A wireless device may measure a plurality of downlink reference signals (e.g., SSBs or CSI-RSs, if CSI-RS is configured by RRC). The wireless device may select two or more SSBs by comparing RSRPs of the plurality of downlink reference signals and a threshold. The threshold may comprise a RSRP threshold SSB parameter (e.g., rsrp-ThresholdSSB) if the plurality of downlink reference signals are SSBs. The threshold may comprise a RSRP threshold CSI-RS parameter (e.g., rsrp-ThresholdCSI-RS) if the plurality of downlink reference signals are CSI-RSs. The wireless device may select two or more downlink referencing signals (SSBs or CSI-RSs) having RSRPs that are higher than the threshold. The wireless device may determine one or more PRACH occasions associated with the selected two or more downlink reference signals (e.g., SSBs), for example, based on SSBs being configured with the wireless device. The wireless device may determine the one or more PRACH transmissions based on an association between PRACH occasions and SSBs that may be indicated by one or more RRC parameters (e.g., ra-ssb-OccasionMaskIndex). The wireless device may determine one or more PRACH occasions associated with the selected two or more downlink reference signals (e.g., CSI-RSs), for example, based on CSI-RSs being configured with the wireless device. The wireless device may determine the one or more PRACH transmissions based on an association between PRACH occasions and CSI-RSs that may be indicated by one or more RRC parameters (e.g., ra-OccasionList).

Figure 21:
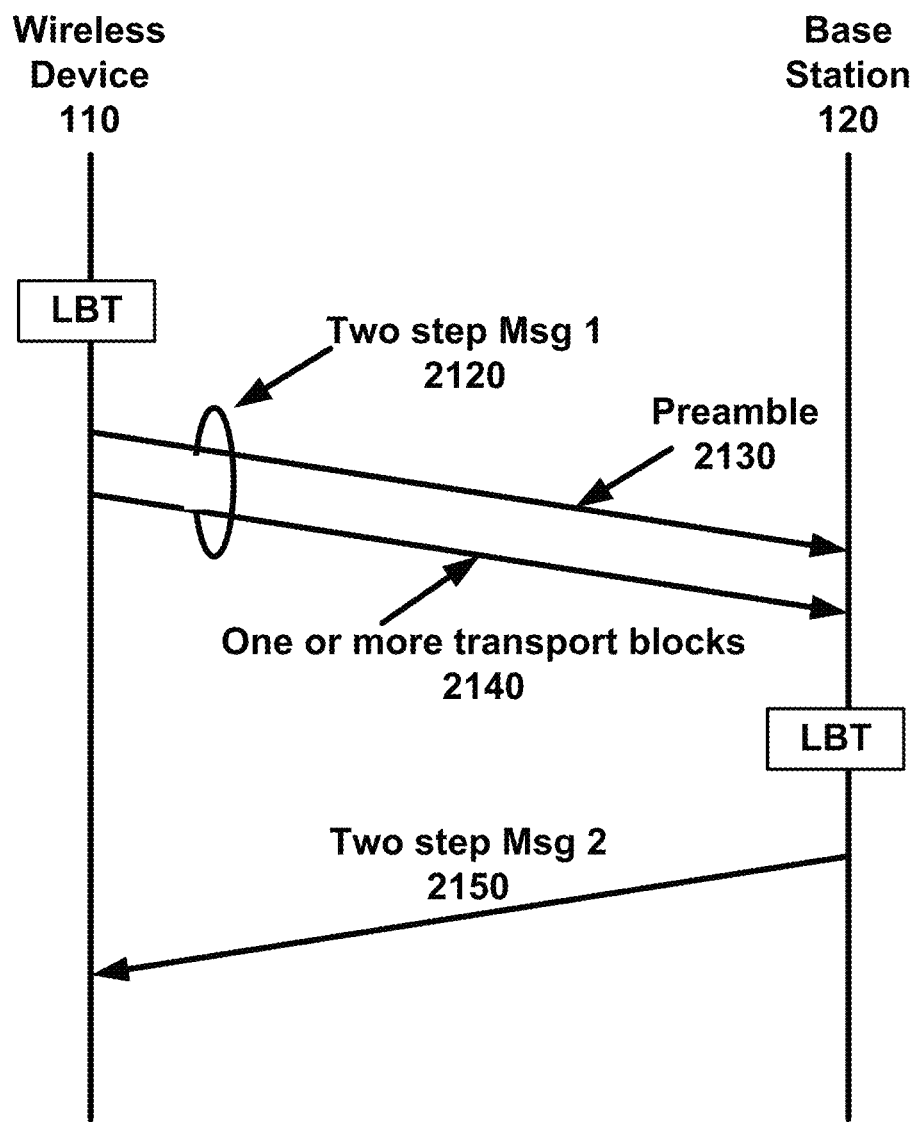
FIG. 21 shows an example of a two-step RA procedure with LBT.

FIG. 21 shows an example diagram of a two-step RA procedure with LBT. A two-step RA procedure may employ LBT in an unlicensed band. A base station and/or a wireless device may not send (e.g., transmit) a message (e.g., two-step Msg 1 2120 (e.g., Msg A), preamble 2130, one or more TBs 2140, and/or two-step Msg 2 2150 (e.g., Msg B)) for a RA procedure if LBT is failed prior to sending (e.g., transmitting) the message (e.g., CCA in LBT determines that a channel in an unlicensed band is busy, e.g., occupied by other device). The transmissions of the preamble 2130 and for one or more TBs 2140 may have a same LBT procedure and/or different LBT procedures.

Radio resources for transmissions of a preamble 2130 and/or one or more TBs 2140 may be configured in a same channel (or a same subband or a same BWP or a same UL carrier), where a wireless device performs an LBT procedure for the transmissions (e.g., based on a regulation). An LBT result on the same channel (or the same subband or the same BWP or the same UL carrier) may be applied for transmissions of the preamble 2130 and for one or more TBs 2140.

Figure 22:
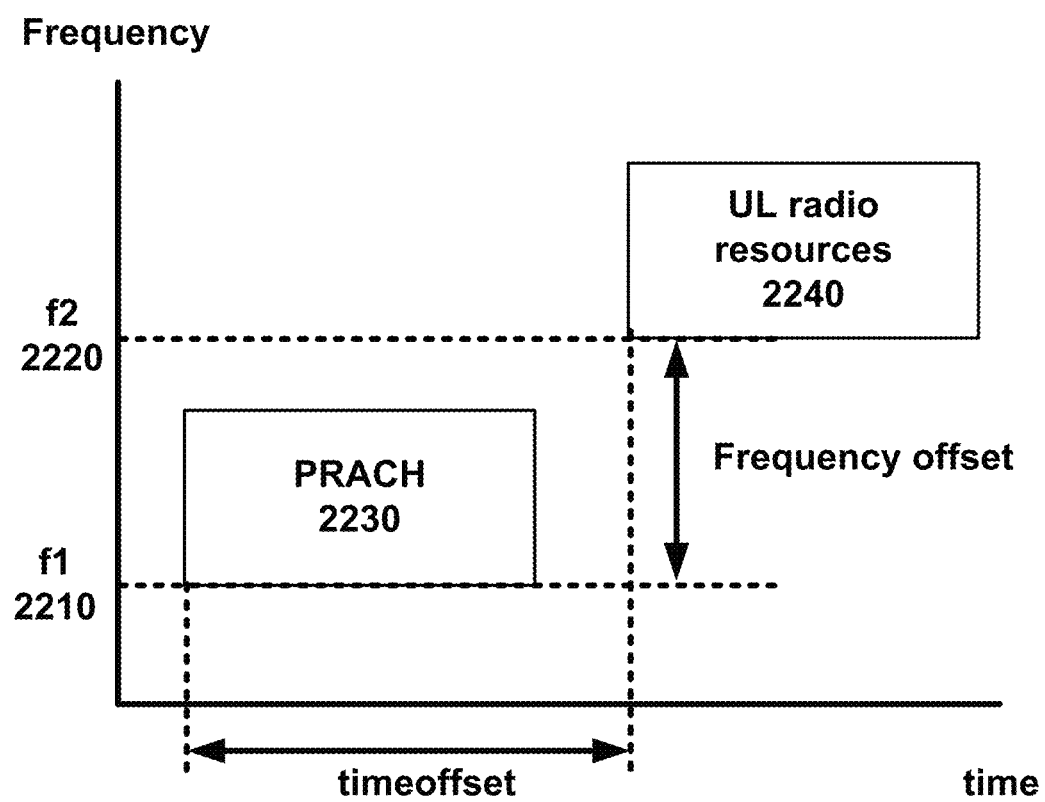
FIG. 22 shows an example of radio resource allocation for a two-step RA procedure.

FIG. 22 shows an example of radio resource allocation for a two-step RA procedure. PRACH resource 2230 and UL radio resources 2240 may be time-multiplexed, for example, based on a frequency offset in FIG. 22 being zero. PRACH 2230 resource and UL radio resources 2240 may be frequency-multiplexed, for example, based on a timeoffset in FIG. 22 being zero. The frequency offset in FIG. 22 may be an absolute number in terms of Hz, MHz, and/or GHz, and/or a relative number (e.g., one of index from a set of frequency indices that are predefined/preconfigured). The timeoffset in FIG. 22 may be an absolute number in terms of micro-second, milli-second, and/or second and/or a relative number (e.g., in terms of subframe, slot, mini-slot, OFDM symbol). PRACH resource 2230 for transmission of the preamble 2130 and UL radio resources for transmission of one or more TBs 2140 may be subject to one LBT procedure if f1 2210 and f2 2220 are configured in the same channel (or a same subband or a same BWP or a same UL carrier). One LBT procedure before a PRACH resource 2230 may be performed by a wireless device (e.g., based on a regulation of unlicensed band). A quantity of LBT procedures may be determined based on a value of the timeoffset. One LBT procedure before a PRACH resource 2230 may be performed by a wireless device, for example, if the value of a time offset is equal to and/or less than a threshold (e.g., that may be configured and/or defined by a regulation). The one LBT procedure may determine idle and a wireless device may perform a transmission of the preamble 2130 via PRACH resource 2230 followed by a second transmission of one or more TBs 2140 via the UL radio resources 2240 with no LBT procedure (the transmission order may be switched if the UL radio resources 2240 is allocated before PRACH resource 2230 in time domain). PRACH and UL radio resources may be allocated closely enough in time domain. A wireless device may perform a first LBT procedure before a PRACH resource 2230 and perform a second LBT procedure before UI radio resources 2240, for example, based on the value of timeoffset being larger than the threshold.

A wireless device may perform an LBT procedure and apply a result (e.g., idle or busy) of the LBT procedure to the transmission of the preamble 2130 and UL radio resources for transmission of one or more TBs 2140. A bandwidth of BWP and/or UL carrier (e.g., where f1 2210 and f2 2220 are configured), may be larger than a particular value (e.g., 20 MHz). The bandwidth may be less than the particular value (e.g., 20 MHz). A wireless device may perform the transmissions of the preamble 2130 and for one or more TBs 2140, for example, if the channel is idle. A transmission of the preamble 2130 may be followed by a transmission of one or more TBs 2140 (or vice versa).

A wireless device may perform a first transmission of the preamble 2130 that may be partially overlapped in time with a second transmission of one or more TBs 2140. A wireless device may not perform the transmissions of the preamble 2130 and for one or more TB s 2140, for example, based on the channel being busy. A wireless device may perform a particular LBT procedure (e.g., CAT2 LBT) for the first transmission, for example, after or in response to the first transmission (and/or after or in response to an LBT procedure performed for the first transmission).

Radio resources for transmissions of the preamble 2130 and one or more TBs 2140 may be configured in different channels, different subbands, different BWPs, and/or different UL carriers (e.g., one in NUL and the other one in SUL) that may require separate LBT procedures. A wireless device may perform a LBT procedure per one or more channels, per one or more subbands, per one or more BWPs, and/or per one or more UL carriers.

Figure 23:
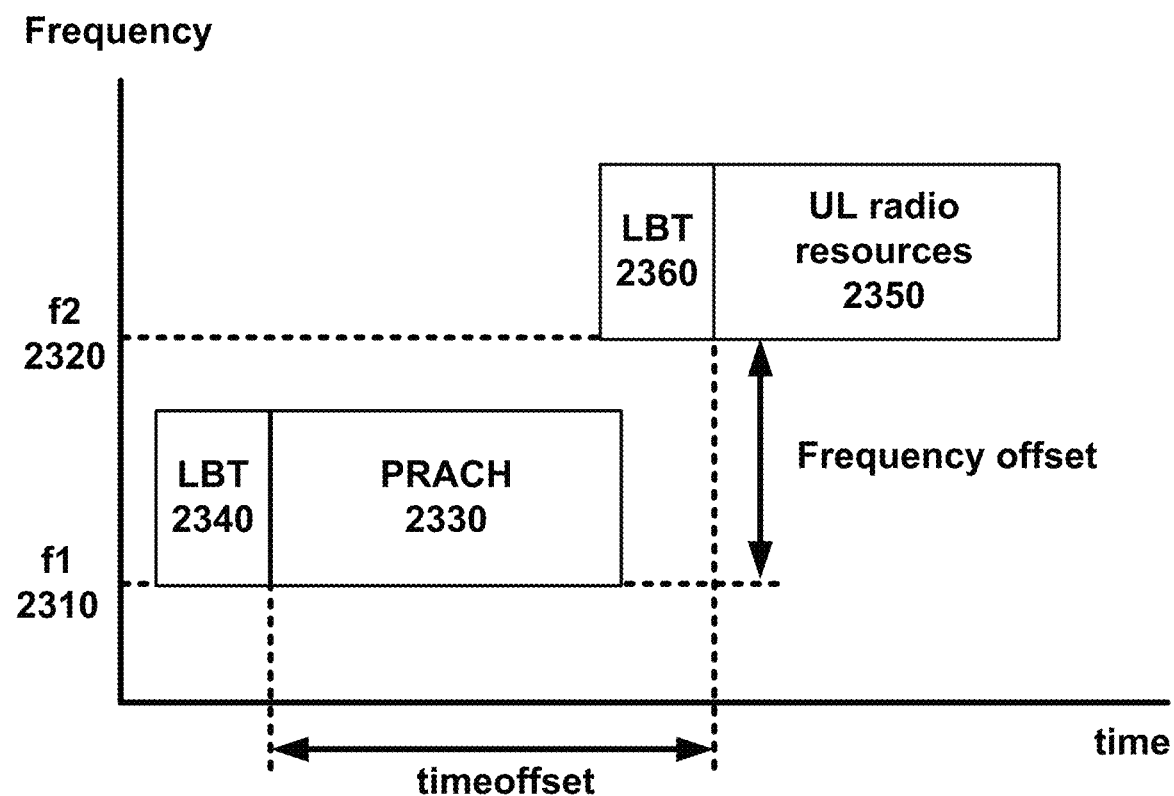
FIG. 23 shows an example of one or more LBT procedures for a two-step RA procedure.

FIG. 23 shows an example of one or more LBT procedures performed for a two-step RA procedure UL radio resources 2350 may be allocated before or aligned with PRACH resources 2330 in time. A wireless device may perform a first LBT procedure (e.g., LBT 2340 in FIG. 23) before a first transmission of preamble 2130 (e.g., via PRACH resources 2330) and perform a second LBT procedure (e.g., LBT 2360 in FIG. 23) before a second transmission of one or more TBs 2140 (e.g., via UL radio resources 2350). A wireless device may perform none of, one of, or both of the first transmission and the second transmission, depending on results of the first LBT procedure and second LBT procedure. Separate LBTs before a PRACH message and/or data may provide benefits, such as: earlier transmission of the first transmission and/or second transmission by a wireless device, earlier transmission of a preamble than if a larger LBT were used, and increased probability that a transmission will be successful.

The first transmission may be performed if a first result of the first LBT procedure is idle. The second transmission may be independent of the first result. The second transmission may be performed if a second result of the second LBT procedure is idle. A wireless device may send (e.g., transmit) the preamble 3330, for example, in response to the first LBT procedure being idle. The wireless device may not be able to send (e.g., transmit) one or more TBs 3340 in response to the second LBT procedure being busy. A wireless device may not send (e.g., transmit) the preamble 3330 in response to the first LBT procedure being busy. The wireless device may send (e.g., transmit) one or more TBs 3340 in response to the second LBT procedure being idle. In a two-step RA procedure, one or more TBs may comprise an identifier of the wireless device, for example, so that a base station may identify and/or indicate which wireless device sent (e.g., transmitted) the one or more TBs. The identity may be configured by the base station and/or may be at least a portion of wireless device-specific information (e.g., resume ID, DMRS sequence/index, IMSI, etc.). A base station may identify and/or indicate the wireless device based on the identity in the one or more TBs, for example, based on a wireless device sending (e.g., transmitting) one or more TBs with no preamble 3330 (e.g., if a channel, e.g. PRACH 2330 is busy).

Separate LBT procedures for transmissions of a preamble and one or more TBs may be performed, for example, based on a two-step RA procedure configured in an unlicensed band. A wireless device may be configured (e.g., by a base station) with separate LBT procedures for a wideband operation (e.g., based on a bandwidth greater than 20 MHz). A wireless device may be configured (e.g., by a base station) with a wideband comprising one or more subbands and/or one or more BWPs, for example, based on wideband operation. Some of the one or more subbands may overlap in the frequency domain. Some of the one or more subbands may not overlap in the frequency domain. Some of the one or more BWPs overlap in the frequency domain. Some of the one or more BWPs may not overlap in the frequency domain. Separate LBT procedures may be used for transmissions via the two radio resources, for example, based on a wideband operation and/or two radio resources being allocated with a space larger than a threshold (e.g., 20 MHz). A wideband may comprise one or more subbands, and two radio resources may be allocated in different subbands. A first transmission scheduled in a first subband may use a first LBT procedure, and a second transmission scheduled in a second subband may use a second LBT procedure. The first LBT procedure and the second LBT procedure may be independent of each other.

UL radio resources for transmission of one or more TBs 2140 may be subject to a first LBT procedure (e.g., LBT 2360) and be independent of a second LBT procedure (e.g., LBT 2340) for transmission of the preamble 2130. PRACH resources 2330 for transmission of the preamble 2130 may be subject to a second LBT procedure (e.g., LBT 2360) and be independent of a first LBT procedure (e.g., LBT 2360) for transmission of one or more TBs 2140. A wireless device may perform separate LBT procedures for a first transmissions of the preamble 2130 and a second transmission of one or more TBs 2140, for example, based on f1 2310 and f2 2320 being configured in different channels, different subbands, different BWPs, and/or different UL carriers.

Figure 24A:
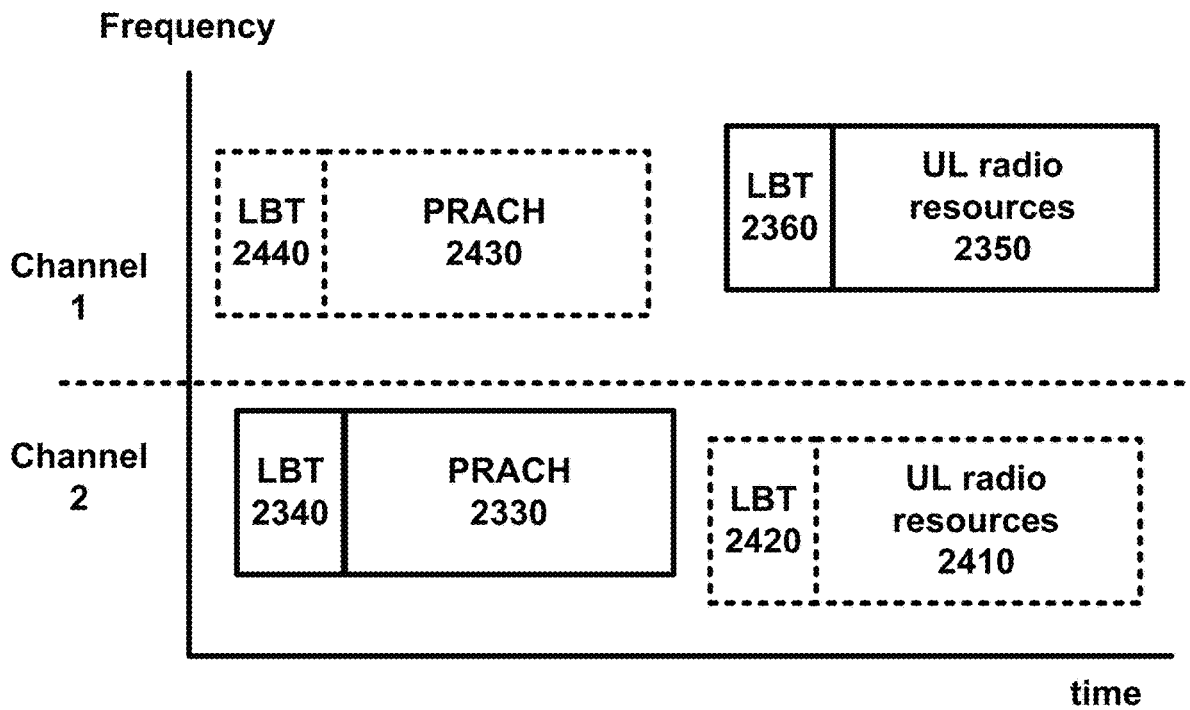
FIG. 24A and FIG. 24B show examples of one or more LBT procedures for a two-step RA procedure in an unlicensed band.
Figure 24B:
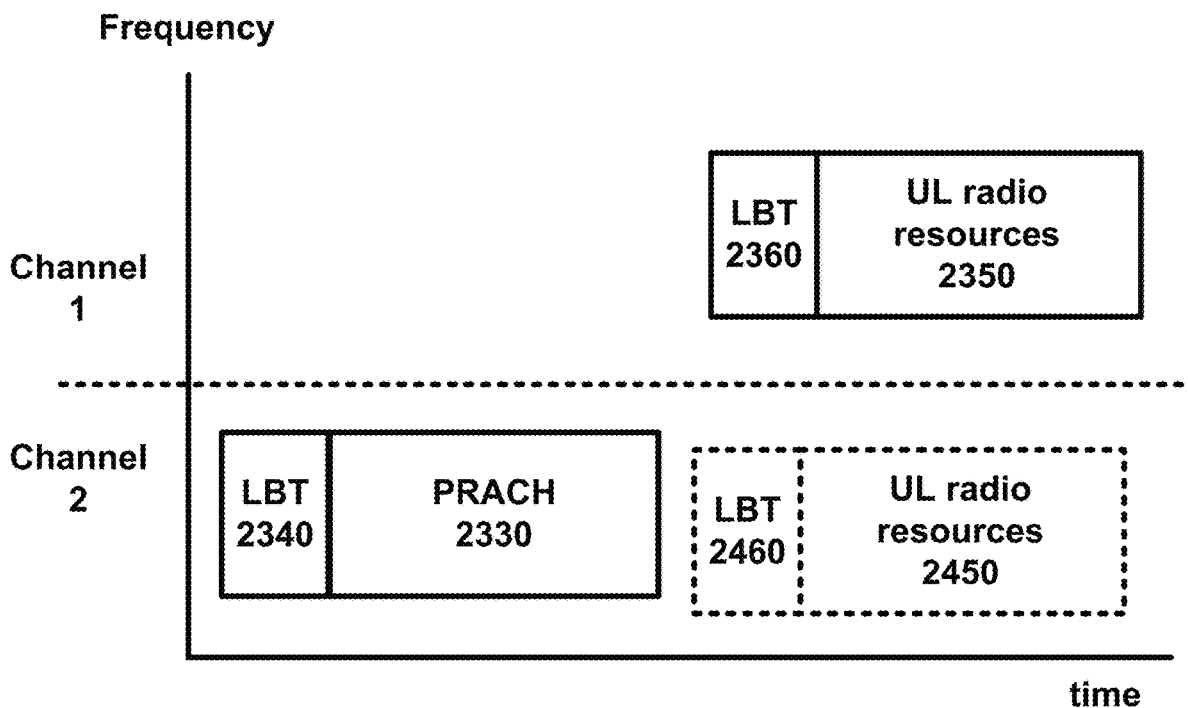

FIG. 24A and FIG. 24B are examples of one or more LBT procedures performed for a two-step RA procedure in an unlicensed band. The resource allocation and the separate LBT procedures in FIG. 23 may be resulted from FIG. 24A and/or FIG. 24B. A wireless device may be configured (e.g., by a base station) with one or more PRACH resources and one or more UL radio resources in different channels (BWPs and/or UL carriers). The wireless device may one or more first opportunities to send (e.g., transmit) preambles and one or more second opportunities to send (e.g., transmit) one or more TBs. A wireless device may have two opportunities via random access resources (e.g., PRACH resource 2430 and PRACH resource 2330) for preamble transmission, for example, as shown in FIG. 24A. A wireless device may select one of two opportunities, for example, based on LBT results. A wireless device may perform a first LBT procedure (e.g., LBT 2440) and a second LBT procedure (e.g., LBT 2340 as shown in FIG. 24A). A wireless device may select one of PRACH resources associated either a first LBT procedure or a second LBT procedure (e.g., based on random selection), for example, based on the results of the first and second LBT procedures being idle. A wireless device may select a PRACH resource associated with the LBT result being idle for preamble transmission, for example, based on one of LBT result being idle and the other of LBT result being busy. A wireless device may not send (e.g., transmit) a preamble and may perform one or more LBT procedures for one or more TB transmissions, for example, based on the first and second LBT procedure results being busy.

A wireless device may have one or more opportunities for transmission of one or more TBs via UL radio resources (e.g., in a similar way that a wireless device has for preamble transmission above). The one or more opportunities for transmission of one or more TBs may be independent of one or more opportunities for transmission of preamble. The wireless device may perform one or more LBT procedures to gain access to a channel to send (e.g., transmit) one or more TBs, for example, based on a wireless device not sending (e.g., transmitting) a preamble due to a result (e.g., busy) of LBT procedure. A wireless device may perform a first LBT procedure (e.g., LBT 2420) followed by a first transmission opportunity of one or more TBs via first UL radio resources 2410 and a second LBT procedure (e.g., LBT 2360 in FIG. 24A) followed by a second transmission opportunity of one or more TBs via second UL radio resources 2350, as shown in FIG. 24A. A wireless device may select one of the opportunities, for example, depending on LBT results. A wireless device may send (e.g., transmit) one or more TBs via UL radio resources 2350, for example, based on LBT 2420 being busy and/or LTB 2360 being idle as shown in FIG. 24A. A wireless device may not send (e.g., transmit) any preamble, for example, based on one or more LBT procedures (e.g., LBT 2340 and LBT 2440 in FIG. 24A) to gain access for sending (e.g., transmitting) a preamble result in busy. A wireless device may perform one or more second LBT procedures (e.g., LBT 2420 and LBT 2360 in FIG. 24A) for transmission of one or more TBs.

The wireless device may receive, from a base station, one or more control message (e.g., RRC messages and/or PDCCH messages) indicating one or more associations between PRACH resources and UL radio resources, for example, before a wireless device initiates a two-step RA procedure. The associations may be one-to-one, multi-to-one, one-to-multi, and/or multi-to-multi between one or more PRACHs resources and one or more UL radio resources. A wireless device may determine which UL radio resources and/or which PRACH resources to select, for example, based on the associations. The associations may indicate one-to-multi association from PRACH resource 2330 to UL radio resources 2350 and UL radio resources 2410, for example, as shown in FIG. 24A. The associations may indicate one-to-one association from PRACH resources 2430 to UL radio resources 2350. A wireless device may perform one or more LBT procedures (depending on a regulation and/or resource allocation whether the resources are in the same channel) for transmission of one or more TBs depending on a selection of PRACH resources. A wireless device may perform two LBT procedures (LBT 2340 and LBT 2440), for example, as shown in FIG. 24A. A wireless device may send (e.g., transmit) a preamble via PRACH resources 2330, for example, based on LBT 2340 being idle but LBT 2440 being busy. The wireless device may determine (e.g., select) one or more candidate UL radio resources based on a configured association of PRACH resources 2330, which may be one-to-multi from PRACH resources 2330 to UL radio resources 2350 and UL radio resources 2410. The wireless device may perform LBT 2420 and LBT 2360 based on the configured association. A wireless device may send (e.g., transmit) one or more TBs, depending on the results of the LBT procedures. FIG. 24B is an example of a two-step RA procedure. UL radio resources are associated with one PRACH resource. An association may be configured (e.g., by a base station) from PRACH resource 2330 to UL radio resource 2350 and UL radio resources 2450.

The PRACH resource and/or UL radio resources in FIG. 22, FIG. 23, FIG. 24A, and/or FIG. 24B may be associated with at least one reference signal configuration (e.g., SSB, CSI-RS, DM-RS). A wireless device may receive (e.g., from a base station) at least one control message to indicate such an association. A configuration of each reference signal may have an association with at least one PRACH resource, that may be configured by RRC message and/or PDCCH signals, for example, based on the base station sending (e.g., transmitting) a plurality of reference signals. In one or more downlink channels, there may be a plurality of PRACH resources and a plurality of UL radio resources associated with the plurality of PRACH resources.

A failure of a LBT procedure may result in degrading a user experience (e.g., in terms of QoS, capacity (throughput), and/or coverage). A base station and/or a wireless device may wait until the channel becomes idle. This wait may result in a latency problem to make a radio link connection between a base station and a wireless device. A failure of an LBT procedure during a RA procedure may lead a long delay for a wireless device to receive an UL grant and/or TA value from a base station. This failure may result in a call drop and/or traffic congestion. A failure of an LBT in a RA procedure for an SCell addition may lead to cell congestion (e.g., load imbalancing) on one or more existing cells, for example, because an SCell may not take over traffic from the one or more existing cells in time.

Figure 25:
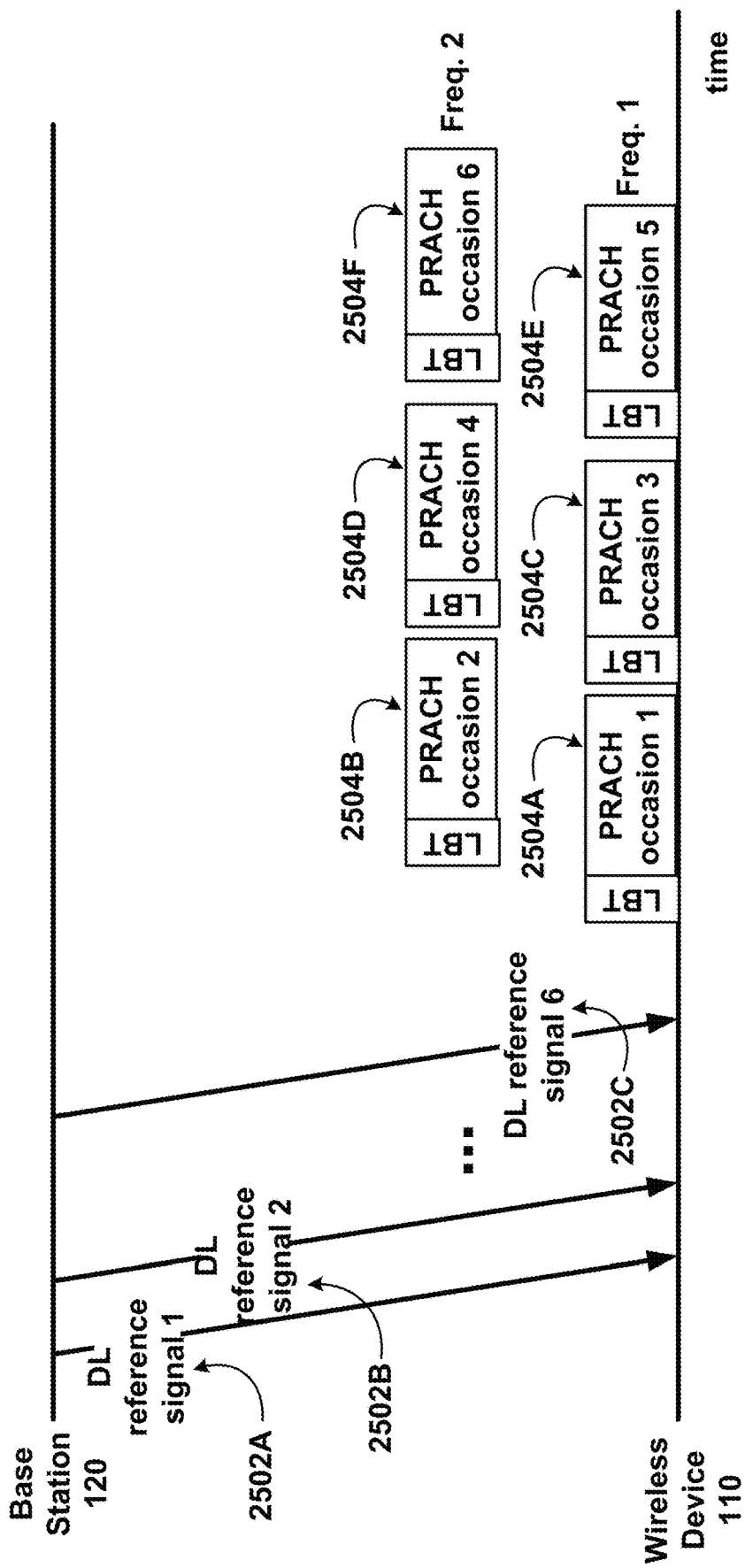
FIG. 25 shows an example of one or more PRACH occasion configurations.

FIG. 25 shows an example of an association between downlink reference signals and random access resource (e.g., PRACH) occasions. A base station 120 may send a plurality (e.g., a burst, such as up to K quantity) of DL reference signals 2502A-2502K. A wireless device 110 may select one or more random access resources (e.g., PRACH occasions 2504A-2504K that may each correspond to at least one of a K quantity of DL reference signals 2502A-2502K) to attempt a RA procedure (e.g., send a RAP). The wireless device 110 may perform the RA procedure on a first available (e.g., clear) random access resource.

An association between a DL reference signal and random access resources (e.g., PRACH occasions) may be one-to-one mapping and/or multi-to-one mapping between DL reference signals and random access resource occasions (e.g., PRACH occasions). A wireless device 110 may measure k DL reference signals. A wireless device 110 may select DL reference signal 1 2502A, DL reference signal 2 2502B, and DL reference signal 3 2502C. The wireless device 110 may perform up to a particular quantity of LBT procedures (e.g., at most 3 LBTs). Each LBT procedure may be performed prior to each of the selected random access resource occasions (e.g., PRACH occasions), for example, if random access resource occasion (e.g., PRACH occasion) 1 2504A, random access resource occasion (e.g., PRACH occasion) 2 2504B, and random access resource occasion (e.g., PRACH occasion) 3 2504C are associated with DL reference signal 1 2502A, DL reference signal 2 2502B, and DL reference signal 3 2502C, respectively.

A type of LBT may be pre-defined and/or semi-statically by a base station. A base station may indicate a type of LBT of random access resource occasions (e.g., PRACH occasions) in a RACH configuration. The type may be one of CAT 1, CAT 2, CAT 3, CAT 4 (or long LBT and/or short LBT).

A wireless device may send (e.g., transmit) one or more preambles via the first random access resource occasion (e.g., PRACH occasion). The wireless device may not perform one or more LBT procedures in other random access resource occasions (e.g., PRACH occasions) that may be available after the first random access resource occasions (e.g., PRACH occasions) in the same PRACH burst, for example, if an LBT success occurs (e.g., channel is idle) in a first random access resource occasion (e.g., PRACH occasion). The wireless device may not perform another LBT procedure on random access resource occasion (e.g., PRACH occasion) 3 2504C, for example, if the wireless device selects random access resource occasion (e.g., PRACH occasion) 1 2504A and a random access resource occasion (e.g., PRACH occasion) 3 2504C, and an LBT procedure on random access resource occasion (e.g., PRACH occasion) 1 2504A is successful. The wireless device may perform one or more LBT procedures prior to each of random access resource occasions (e.g., PRACH occasions) in a first frequency (e.g., Freq. 1) at least until an LBT procedure is successful, for example, if a wireless device selects all random access resource occasions (e.g., PRACH occasions) in the first frequency (e.g., Freq. 1 in FIG. 25). The wireless device may send (e.g., transmit) one or more preambles associated with a random access resource occasion (e.g., PRACH occasion) if the LBT procedure is successful, for example, based on or in response to the LBT procedure being successful.

A wireless device may perform an LBT procedure for the one or more random access resource occasions (e.g., PRACH occasions) FDM-ed, which may be firstly available and/or may be randomly selected, for example, if one or more random access resource occasions (e.g., PRACH occasions) are frequency domain multiplexed (FDM-ed), e.g., random access resource occasion (e.g., PRACH occasion) 1 2504A and random access resource occasion (e.g., PRACH occasion) 2 2504B. A wireless device may (e.g., based on RSRPs of DL reference signals) select random access resource occasion (e.g., PRACH occasion) 1 2504A and random access resource occasion (e.g., PRACH occasion) 2 2504B FDM-ed. The wireless device may perform LBT procedure(s) on random access resource occasion (e.g., PRACH occasion) 1 2504A and random access resource occasion (e.g., PRACH occasion) 2 2504B. The wireless device may randomly select one of these random access resource occasions, for example, if both LBT procedures are successful. The wireless device may select an available random access resource occasion first in time domain, for example, if both LBT procedures are successful. The wireless device may select a random access resource occasion corresponding to a DL reference signal having an RSRP that is greater than other DL reference signals, for example, if both LBT procedures are successful. Random access resource occasion (e.g., PRACH occasion) 1 2504A and random access resource occasion (e.g., PRACH occasion) 2 2504B may be FDM-ed within a threshold (e.g., less than a bandwidth threshold). The wireless device may perform a wideband LBT procedure that may cover a frequency range of random access resource occasion (e.g., PRACH occasion) 1 2504A and random access resource occasion (e.g., PRACH occasion) 2 2504B. The wireless device may select one of the random access resource occasions (e.g., PRACH occasions) based on: a random selection, time location of random access resource occasions (e.g., PRACH occasions), and/or RSRPs of corresponding DL reference signals, for example, if the wideband LBT procedure is successful.

A wireless device may perform a long LBT on a first random access resource occasion (e.g., PRACH occasion) firstly available. The wireless device may perform a short LBT on a second random access resource occasion (e.g., PRACH occasion) following (e.g., after) the first random access resource occasion (e.g., PRACH occasion), for example, if the LBT on the first random access resource occasion (e.g., PRACH occasion) fails (e.g., a long LBT procedure for random access resource occasion (e.g., PRACH occasion) 1 2504A fails and/or a short LBT procedure for random access resource occasion (e.g., PRACH occasion) 3 2504C fails). A type of LBT procedure on the second random access resource occasion (e.g., PRACH occasion) may be configured by a base station. A type of LBT procedure on the second random access resource occasion (e.g., PRACH occasion) may be determined by a time difference of two random access resource occasions (e.g., PRACH occasions). The first random access resource occasion (e.g., PRACH occasion) and the second random access resource occasion (e.g., PRACH occasion) may have a guard time less than a threshold (e.g., configurable or pre-defined, such as 25 μs, 16 μs, or any other duration). The wireless device may perform a short LBT procedure on the second random access resource occasion (e.g., PRACH occasion), for example, if the first random access resource occasion and the second random access resource occasion have a guard time less than a threshold. The wireless device may perform a long LBT procedure, for example, if the first random access resource occasion and the second random access resource occasion have a guard time greater than or equal to the threshold.

The wireless device 110 may perform an LBT procedure before each selected random access resource occasion, for example, at least until successful or until an LBT procedure before each of the selected random access resource occasions have failed. The wireless device 110 may perform a RA procedure on a random access resource occasion associated with a successful LBT procedure. The two or more random access resource occasions (e.g., PRACH occasions) 2504A-2504F may not be aligned.

A wireless device may select two or more random access resource occasions (e.g., PRACH occasions), for example, based on RSRPs of DL reference signals. A wireless device may select random access resource occasion (e.g., PRACH occasion) 1 2504A, random access resource occasion (e.g., PRACH occasion) 2 2504B, and/or random access resource occasion (e.g., PRACH occasion) 3 2504C. The wireless device may perform a first LBT procedure on a first random access resource occasion (e.g., PRACH occasion) available firstly in time (e.g., random access resource occasion (e.g., PRACH occasion) 1 2504A). The wireless device may determine a second LBT procedure on a second random access resource occasion (e.g., PRACH occasion), for example, based on the first LBT procedure. The wireless device may send (e.g., transmit) a preamble via the first random access resource occasion (e.g., PRACH occasion), for example, if the first LBT procedure was successful. The wireless device may determine to perform a second LBT procedure on a second random access resource occasion (e.g., PRACH occasion) available firstly after the first random access resource occasion (e.g., PRACH occasion) (e.g., random access resource occasion (e.g., PRACH occasion) 2 2504B), for example, if the first LBT procedure was not successful. The wireless device may perform a third LBT procedure on a third random access resource occasion (e.g., PRACH occasion), for example, if the second LBT procedure on the second random access resource occasion (e.g., PRACH occasion) has failed. The wireless device may perform a wideband LBT, for example, if one or more FDM-ed random access resource occasions (e.g., PRACH occasions) are configured within a guard time less than a threshold. The wireless device may perform LBT procedures on the one or more FDM-ed random access resource occasions (e.g., PRACH occasions). A wireless device may send (e.g., transmit) a plurality of preambles via a plurality of random access resource occasions (e.g., PRACH occasions).

Figure 26:
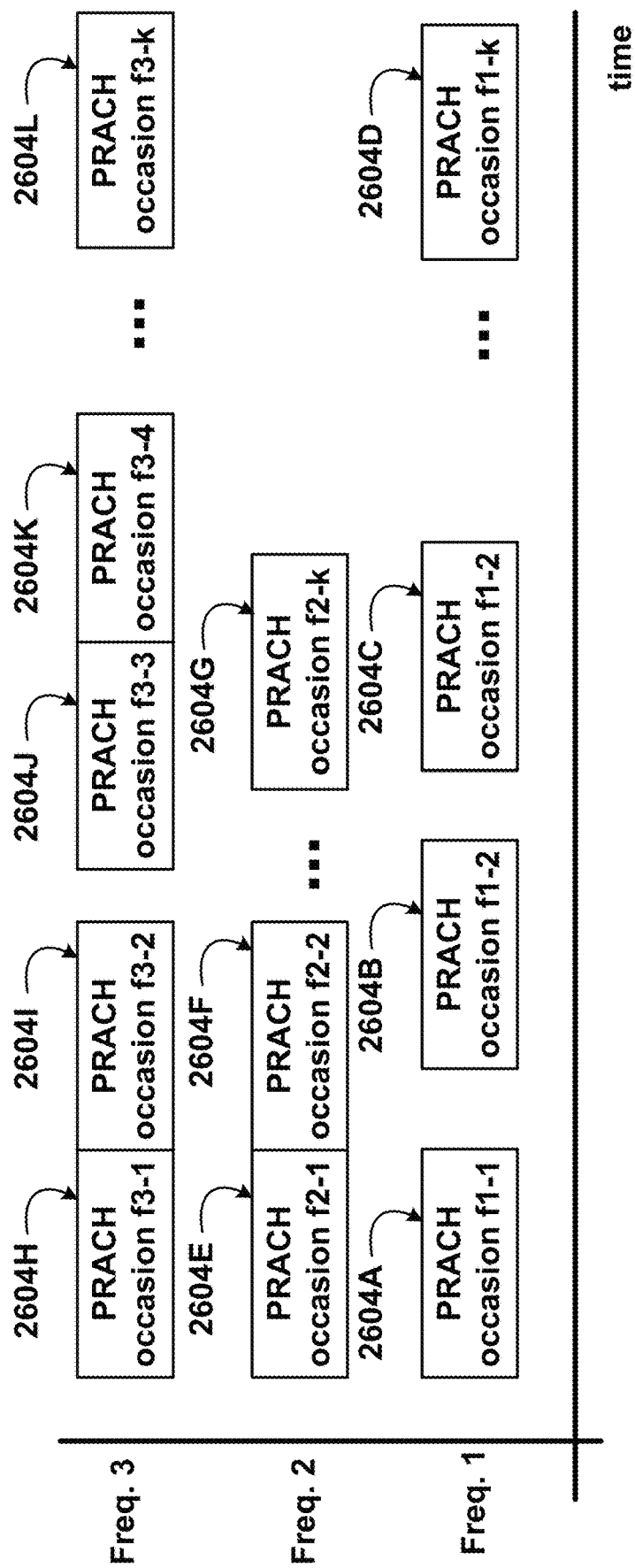
FIG. 26 shows an example of one or more PRACH occasion configurations.

FIG. 26 shows an example one or more random access resource occasion configurations (e.g., PRACH occasions). The random access resource occasions may be separated by time and/or frequencies (e.g., TDM-ed and/or FDM-ed). The random access resource occasions may be separated by gaps (e.g., PRACH occasions 2604A-2604D via freq. 1). The random access resources may not be separated by gaps (e.g., PRACH occasions 2604E-2604G via freq. 2). Groups of random access resources occasions may be separated by gaps (e.g., PRACH occasions 2604H-2604L via freq. 3). The random access resources occasions may occur in different frequencies (e.g., PRACH occasions 2604A-2604D via freq. 1, PRACH occasions 2604E-2604G via freq. 2, and/or PRACH occasions 2604H-2604L via freq. 3).

Random access resource occasions (e.g., PRACH occasions) may be time division multiplexed (TDM-ed) with a guard time (e.g., a time difference or gap), for example, via Freq 1. A wireless device may perform an LBT procedure in each random access resource occasion (e.g., PRACH occasion) in a first frequency (e.g., Freq. 1), for example, for multiple preamble transmissions. A wireless device may perform a long LBT procedure and/or short LBT procedure, for example, depending on the guard time between two random access resource occasions (e.g., PRACH occasions). A wireless device may perform a short LBT procedure (or no LBT procedure) on a random access resource occasion (e.g., PRACH occasion) available later than the other, for example, if the guard time (e.g., time difference) is less than a threshold (25 µs, 16 µs, or any other duration). The wireless device may perform a long LBT procedure, for example, if the guard time (e.g., time difference) is greater than or equal to the threshold. A type of LBT procedure in each random access resource occasion (e.g., PRACH occasion) may be configured by an RRC message. A type of LBT procedure in each random access resource occasion (e.g., PRACH occasion) may be determined by a wireless device by comparing with a guard time between random access resource occasions (e.g., PRACH occasions) and the threshold.

One or more random access resource occasions (e.g., PRACH occasions) may be TDM-ed without a guard time (or less than a threshold), for example, via a second frequency (e.g., Freq 2 in FIG. 26). A wireless device may perform an LBT procedure on the first random access resource occasion (e.g., PRACH occasion) that occurs firstly among the selected random access resource occasions (e.g., PRACH occasions) via the second frequency (e.g., Freq. 2). A wireless device may avoid performing an LBT procedure if the LBT on the first random access resource occasion (e.g., PRACH occasion) was successful, for example, for subsequent random access resource occasions (e.g., PRACH occasions) followed by the first random access resource occasion (e.g., PRACH occasion) via the second frequency (e.g., Freq 2). The LBT procedure on the first random access resource occasion (e.g., PRACH occasion) may be a long LBT procedure. An LBT procedure on subsequent random access resource occasions (e.g., PRACH occasions) may be a short LBT procedure if the LBT on the first random access resource occasion (e.g., PRACH occasion) was successful. A wireless device may perform a long LBT or a short LBT, for example, if the selected random access resource occasions (e.g., PRACH occasions) are not contiguous in time. A type of LBT may be configured by a base station and/or determined based on a time difference of the selected random access resource occasions (e.g., PRACH occasions) that may be non-contiguous. One or more random access resource occasions (e.g., PRACH occasions) may be grouped without a guard time, for example, via a third frequency (e.g., Freq 3 in FIG. 26). There may be a guard time between two groups as shown in random access resource occasion (e.g., PRACH occasion) f3-2 2604I and random access resource occasion (e.g., PRACH occasion) f3-3 2604J in FIG. 26. Similar procedures for determining an LBT procedure via a second frequency (e.g., Freq. 2) and via a first frequency (e.g., Freq. 1) may be applied to the grouped PRACH occasions via the first frequency (e.g., Freq. 3), for example, using no LBT procedure, a long LBT procedure, or a short LBT procedure, for example, based on gaps and/or timing.

Using an LBT procedure in an unlicensed spectrum may result in one or more uplink and/or downlink transmissions being blocked. A wireless device and/or a base station may not transmit any message in a four-step RA procedure and/or two-step RA procedure, for example, if a channel is busy (e.g., the channel is determined as occupied by other device(s) based on an LBT procedure).

A wireless device may send (e.g., transmit) at least one preamble (e.g., RAPs) to a base station on an unlicensed spectrum. A wireless device may perform one or more LBT procedures (e.g., for preamble transmissions, for example, as described with reference to FIGS. 20-26). The wireless device may transmit at least one preamble to a base station, for example, if a UL RA channel is idle on an unlicensed spectrum. A base station may receive at least one preamble that may be transmitted by a wireless device. The base station may perform one or more LBT procedures to transmit at least one downlink control message (e.g., a downlink medium access control packet comprising an RAR, a downlink control signal) corresponding to the at least one preamble. The base station may perform a second LBT procedure, for example, if a channel is determined as busy based on a first LBT procedure. The second LBT procedure may be performed, for example, after a certain period of time (e.g., backoff time) following the first LBT procedure.

Figure 27A:
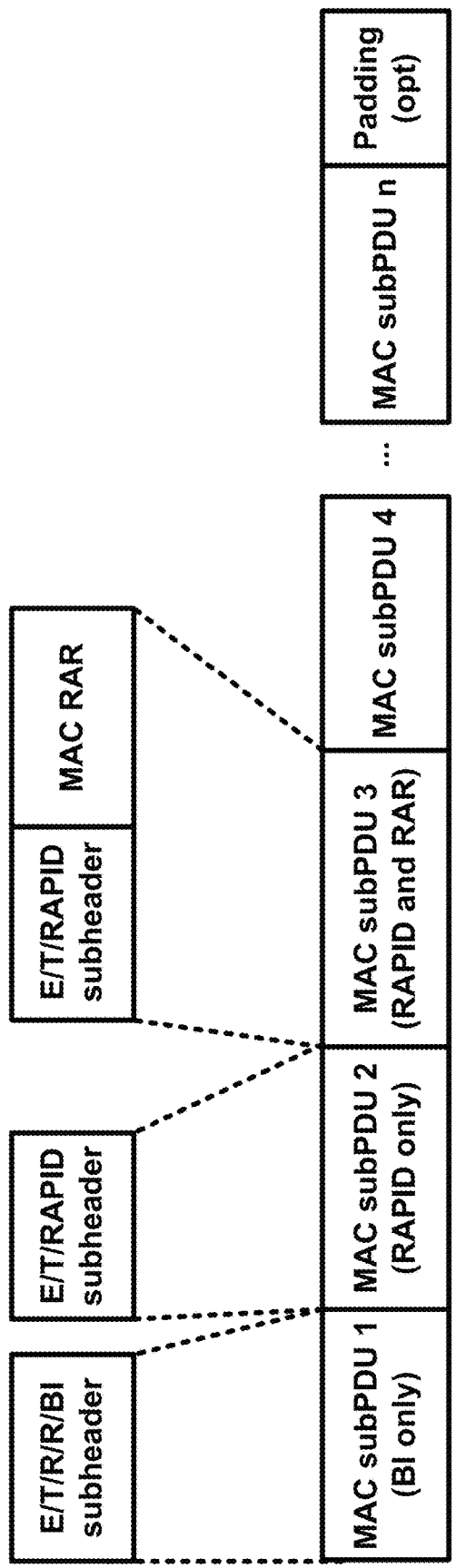
FIG. 27A, FIG. 27B, and FIG. 27C show examples of RA response (RAR), a MAC subheader with backoff indicator (BI), and a MAC subheader with a random access preamble identifier (RAPID), respectively.
Figure 27B:
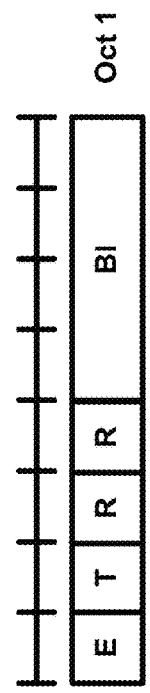
Figure 27C:
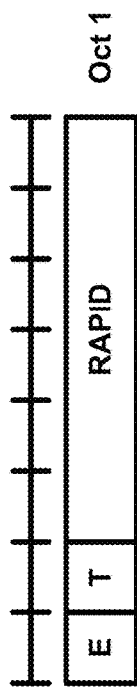

FIG. 27A, FIG. 27B, and FIG. 27C show respectively examples of RAR, MAC subheader with backoff indicator (BI), and a MAC subheader with a RAPID. A wireless device may receive from a base station at least one RAR as a response of Msg1 1220 (as shown in FIG. 12) or two-step Msg1 1620 (shown in FIG. 16) using an RA procedure. An RAR may be in a form of MAC PDU comprising one or more MAC subPDUs and/or (optionally) padding. FIG. 27A is an example of an RAR. A MAC subheader may be octet-aligned. Each MAC subPDU may comprise one or more of the following: a MAC subheader with BI only; a MAC subheader with RAPID only (e.g., acknowledgment for SI request); a MAC subheader with RAPID and MAC RAR. FIG. 27B shows an example of a MAC subheader with BI. A MAC subheader with BI may comprise one or more header fields (e.g., E/T/R/R/BI) as shown in FIG. 27B and described below. A MAC subPDU with BI may be placed at the beginning of the MAC PDU, if included. MAC subPDU(s) with RAPID only, and/or MAC subPDU(s) with RAPID and MAC RAR, may be placed anywhere after a MAC subPDU with BI and, before padding as shown in FIG.

27A. A MAC subheader with RAPID may comprise one or more header fields (e.g., E/T/RAPID) as shown in FIG. 27C. Padding may be placed at the end of the MAC PDU, if present. Presence and length of padding may be implicit, for example, based on TB size, and/or a size of MAC subPDU(s).

A field (e.g., an E field) in a MAC subheader may indicate an extension field that may be a flag indicating if the MAC subPDU (including the MAC subheader) is the last MAC subPDU or not in the MAC PDU. The E field may be set to "1" to indicate at least one more MAC subPDU follows. The E field may be set to "0" to indicate that the MAC subPDU including this MAC subheader is a last MAC subPDU in the MAC PDU. A field (e.g., a T field) may be a flag indicating whether the MAC subheader contains a RAPID or a BI (e.g., one or more backoff values may predefined and BI may indicate one of backoff value). The T field may be set to "0" to indicate the presence of a field (e.g., a BI field) in the subheader. The T field may be set to "1" to indicate the presence of a RAPID field in the subheader. A field (e.g., an R field) may indicate a reserved bit that may be set to "0." A field (e.g., a BI field) may indicate an overload condition in the cell. A size of the BI field may be 4 bits. A field (e.g., a RAPID field) may be a RAPID field that may identify and/or indicate the transmitted RAP. A MAC RAR may not be included in the MAC subPDU, for example, based on the RAPID in the MAC subheader of a MAC subPDU corresponding to one of the RAPs configured for an SI request.

There may be one or more MAC RAR formats. At least one MAC RAR format may be employed in a four-step or a two-step RA procedure.

Figure 28:
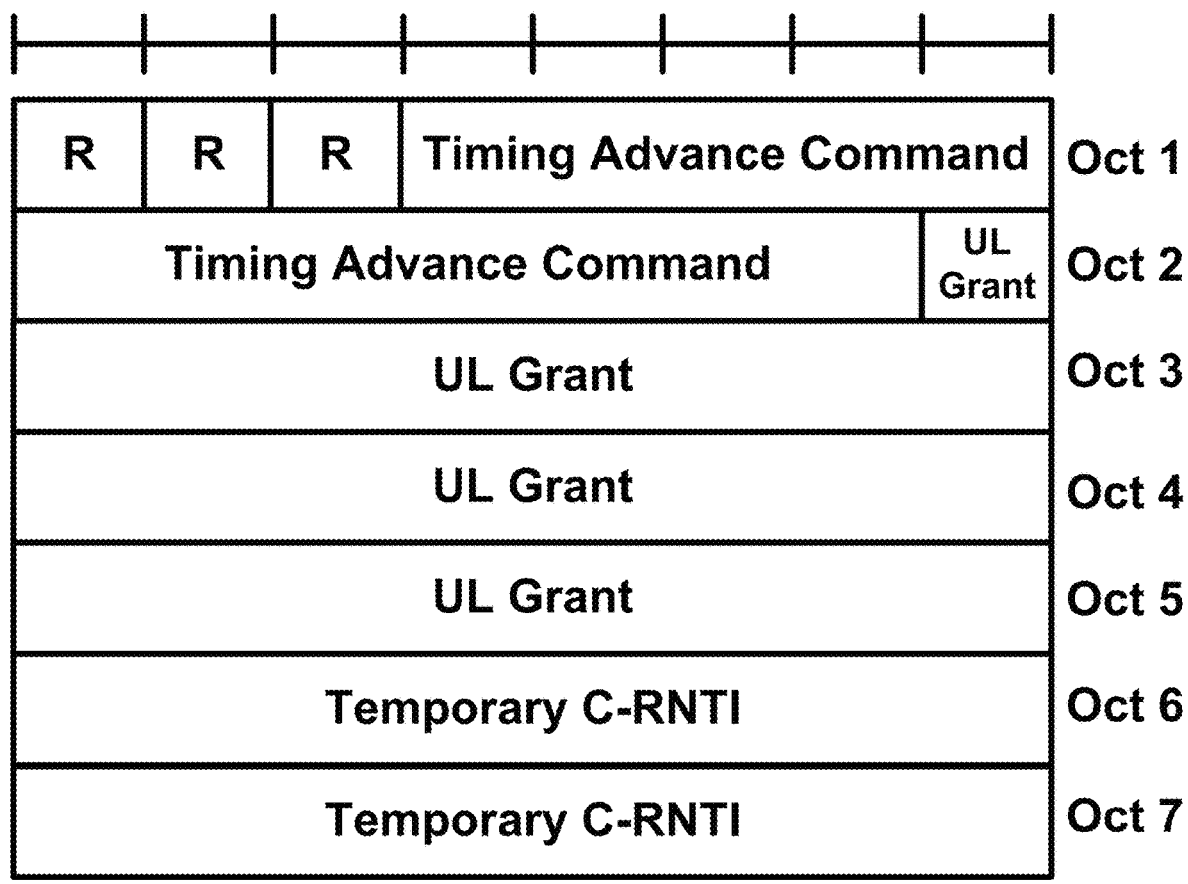
FIG. 28 shows an example MAC RAR format.

FIG. 28 shows an example MAC RAR format. The MAC RAR may be fixed size as shown in FIG. 28. The MAC RAR may comprise one or more of the following fields: an R field that may indicate a reserved bit, which may be set to "0"; a timing advance (TA) command field that may indicate the index value for TA employed to control the amount of timing adjustment; a UL grant field that indicates the resources to be employed on an uplink; and an RNTI field (e.g., temporary C-RNTI and/or C-RNTI) that may indicate an identity that is employed during RA. An RAR may comprise one or more of following for a two-step RA procedure: a UE contention resolution identity, an RV ID for retransmission of one or more TBs, decoding success or failure indicator of one or more TB transmissions, and one or more fields from the MAC RAR formats.

A base station may multiplex, in a MAC PDU, RARs for two-step and/or four-step RA procedures. A wireless device may not use an RAR length indicator field. The wireless device may determine the boundary of each RAR in the MAC PDU based on pre-determined RAR size information, for example, based on RARs for two-step and four-step RA procedures having the same size.

Figure 29:
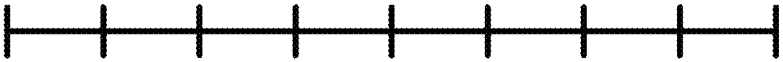
FIG. 29 shows an example RAR format.

FIG. 29 shows an example RAR format. The RAR format may be employed in a MAC PDU, for example, that may multiplex RARs for two-step and four-step RA procedures. The RAR shown in FIG. 29 may use a fixed size, for example, using the same format for two-step and four-step RA procedures.

FIG. 30A, and FIG. 30B show example RAR formats. The RAR formats may be employed for a two-step RA procedure. An RAR for a two-step RA procedure may have a different format, size, and/or fields, from an RAR for a four-step RA procedure. An RAR may have a field to indicate a type of RAR (e.g., a reserved "R" field as shown in FIG. 28, for example, based on RARs for two-step and four-step RA procedures being multiplexed into a MAC PDU, and/or the RARs having different formats between two-step and four-step RA procedure). FIG. 30A, and FIG. 30B may be employed to indicate a type of RAR. A field for indicating an RAR type may be in a subheader (such as a MAC subheader) and/or in an RAR. An RAR may comprise different types of fields that may correspond with an indicator in a subheader and/or in an RAR. A wireless device may determine the boundary of one or more RARs in a MAC PDU, for example, based on one or more indicators.

Wireless communications between a base station and one or more wireless devices may use various frequencies/frequency bands. Wireless communication between a base station and one or more wireless devices may be enhanced, for example, by using one or more expanded frequency bands, such as high frequency bands over 6 GHz (or any other frequency) and/or unlicensed bands. Devices performing wireless communication via high frequency bands may experience more communication problems which may be due to characteristics of the high frequencies. One or more unlicensed bands may be occupied by other wireless communication devices, and resource allocations and/or resource managements for the unlicensed bands may be more challenging. A wireless device may need to acquire timing synchronization with other communication devices, such as a base station or other wireless devices, more frequently, for example, if the wireless device experiences one or more communication problems (e.g., in high frequency bands and/or the unlicensed bands).

A wireless device may perform one or more access procedures (e.g., random access procedures) to acquire timing synchronization with a base station. A wireless device may send a plurality of random access preambles via a plurality of channels (e.g., BWPs, beams, SULs, NULs, and/or sub-bands of a BWP). A plurality of PRACH occasions may be allocated across different channels (e.g., BWPs, beams, SULs, NULs, different sub-bands of a BWP, etc.). Wireless devices may gain more opportunities to perform random access preamble transmissions via a plurality of channels; however, such configurations may increase the complexity of the access procedure management for a network (e.g., comprising one or more base stations). A base station may be expected to receive more random access preamble transmissions (and/or other access transmissions) from a plurality of wireless devices via a plurality of channels (e.g., associated with random access). Each wireless device may send/transmit, to the base station, one or more reports indicating the number/quantity of preamble transmissions performed before successfully receiving a random access response from the base station and/or indicating whether one or more congestion issues have occurred in a random access procedure (e.g., in a contention-based random access procedure, and/or a contention-free random access procedure). However, such reports may not provide, to the base station, sufficient information to determine/identify random access statistics, associated with one or more wireless devices, for each channel, for example, if a plurality of channels are allowed for one or more wireless devices for one or more random access procedures.

A wireless device may operate one or more counters associated with a particular channel to generate channel-specific random access statistics for each channel. A wireless device may have a preamble transmission counter to count the number/quantity of preamble transmissions via a particular channel A wireless device may send/transmit, to a base station, one or more random access reports comprising the channel-specific random access statistics for at least one channel (e.g., the number/quantity of preamble transmissions via a particular channel). The base station may better manage and/or allocate random access resources for a plurality of wireless devices, for example, based on the channel-specific random access statistics. The base station may optimize random access procedure channel-by-channel basis, for example, by analyzing the channel-specific random access statistics and the overall random access statistics for a plurality of channels.

One or more LBT procedures may be performed for one or more random access procedures (e.g., using one or more unlicensed bands). A wireless device may not send/transmit a random access preamble, for example, based on the result of one or more LBT procedures. A random access procedure may be delayed, for example, if the wireless device does not send/transmit a preamble via a random access resource based on the result of the one or more LBT procedures. However, a base station may not be aware of one or more delays caused by the dropped (canceled, delayed, skipped, and/or aborted) preamble transmissions due to the one or more LBT procedures.

A wireless device may operate one or more counters associated with one or more LBT procedures. A wireless device may have a preamble transmission attempt counter to count the number/quantity of LBT performed for one or more random access procedure. A wireless device may send/transmit, to a base station, one or more random access reports comprising the LBT performance statistics (e.g., the number/quantity of LBT performed for one or more random access procedure). The one or more counters associated with one or more LBT procedures may be channel-specific. A wireless device may have a channel-specific preamble transmission attempt counter to count the number/quantity of LBT performed on a particular channel for one or more random access procedure. A wireless device may send/transmit, to a base station, one or more random access reports comprising the channel-specific LBT performance statistics (e.g., the number/quantity of LBT performed on a particular channel for one or more random access procedures).

A base station and/or a wireless device may experience more signaling overhead burden, for example, if more types of random access statistics are communicated between each other. To reduce/avoid one or more possible signaling overhead problems, a base station may trigger different types of random access reporting. A base station may send, to one or more wireless devices, one or more request for random access reports comprising an indication of one or more types of random access statistics (e.g., random access statistics associated with a first sub-band of a particular BWP, LBT performance statistics associated with a second sub-band of a particular BWP, etc.). One or more reporting-type indicators may indicate a per-cell based reporting, a per-channel based reporting, or both. A base station may flexibly determine which types of statistics are needed and may request different types of random access reports from one or more wireless devices. These configurations may increase the flexibility of random access reporting and reduce signaling overhead.

A base station may instruct one or more wireless device (e.g., one or more wireless devices or sensors connected to a power source, such as a power outlet) to periodically report one or more random access reports. The periodic reporting may be configured semi-statically by sending/transmitting one or more messages (e.g., an RRC message). One or more control messages (e.g., a DCI or a MAC CE) indicating an activation or deactivation of the random access reporting may be sent, from the base station to one or more wireless devices, to activate or deactivate the periodic random access reporting.

An enhanced congestion resolution for random access procedures of a plurality of wireless devices may be provided, for example, based on one or more enhanced random access reporting procedures. The random access statistics and/or the LBT performance statistics may be generated by one or more wireless devices at a per-cell level and/or a per-channel level. A random access contention resolution problem may be reported at a per-channel level. A network may better optimize one or more random access procedures for a plurality of wireless devices. A base station may control and optimize one or more random access parameters (e.g., back-off parameters) channel-by-channel basis, for example, based on one or more types of channel-specific random access statistics provided by a plurality of wireless devices.

A wireless device may perform an access procedure (e.g., a random access procedure) with a base station. The access procedure (e.g., random access procedure) may comprise one or more retransmissions. A wireless device may perform/send one or more (re)transmissions of one or more preambles during a random access procedure. The wireless device may determine the one or more retransmissions of one or more preambles based on one or more conditions. The wireless device may determine the one or more retransmissions of one or more preambles, for example, if the wireless device determines that a random access response reception is not successful. The wireless device may determine that a random access response reception is not successful, for example, if at least one random access response, comprising one or more random access preamble identifiers that matches the transmitted PREAMBLE_INDEX, has not been received at least until an RAR window (e.g., ra-ResponseWindow configured in RACH-ConfigCommon) expires. The wireless device may determine that a random access response reception is not successful, for example, if a PDCCH addressed to the C-RNTI has not been received via the serving cell via which the preamble was sent/transmitted at least until an RAR window for beam failure recovery (e.g., ra-ResponseWindow configured in BeamFailureRecoveryConfig) expires.

A wireless device may determine the one or more retransmissions of one or more preambles, for example, if the wireless device determines that a contention resolution is not successful. The wireless device (e.g., a MAC entity of the wireless device) may start a contention resolution timer (e.g., ra-ContentionResolutionTimer) and/or may restart the contention resolution timer (e.g., ra-ContentionResolutionTimer) at each HARQ retransmission in the first symbol after the end of a Msg3 transmission. The MAC entity of the wireless device may start or restart the contention resolution timer, for example, after the wireless device sends/transmits, to a base station, the Msg3. The wireless device may monitor a PDCCH, for example, at a time that the contention resolution timer (e.g., ra-ContentionResolutionTimer) is running (e.g., regardless of the possible occurrence of a measurement gap). A wireless device may stop the contention resolution timer and determine that a contention resolution is successful, for example, if a notification of a reception of a PDCCH transmission of a cell (e.g., an SpCell) is received from one or more lower layers, and/or if the wireless device determines/identifies that the PDCCH transmission is an indication of a contention resolution corresponding to a Msg3 transmission (or MsgB transmission) performed by the wireless device.

A wireless device may determine one or more retransmission of one or more preambles, for example, if the wireless device determines that a contention resolution is not successful. A wireless device may determine that a contention resolution is not successful, for example, if the wireless device does not receive an indication of a contention resolution at a time that a contention resolution timer (e.g., ra-ContentionResolutionTimer) is running. The wireless device may determine that a contention resolution is not successful, for example, if the contention resolution timer (e.g., ra-ContentionResolutionTimer) expires. The wireless device may discard a temporary C-RNTI (e.g., TEMPORARY_C-RNTI) that may be indicated by an RAR, for example, after or in response to an expiry of the contention resolution timer (and/or the contention resolution being unsuccessful).

A wireless device may determine one or more retransmissions of one or more preambles, for example, for a two-step RA procedure, if the wireless device does not receive a MsgB corresponding to a MsgA during a window configured to monitor MsgB in one or more DL control channels. A wireless device performing a two-step RA procedure may receive a response (e.g., MsgB) indicating a fallback to a four-step RA procedure. The wireless device may start a timer (e.g., ra-ContentionResolutionTimer), for example, after or in response to transmitting one or more TBs (e.g., Msg3) to a base station. The wireless device may determine one or more retransmissions of one or more preambles, for example, if the timer (e.g., ra-ContentionResolutionTimer) expires.

A wireless device be determine a quantity/number of transmissions (e.g., preamble transmissions) during an access procedure (e.g., a random access procedure). A wireless device may adjust/increment a counter for counting a quantity/number of preamble transmissions (e.g., PREAMBLE_TRANSMISSION_COUNTER) by 1 (or another value), for example, based on or in response to a random access response reception being unsuccessful and/or a contention resolution being unsuccessful. The wireless device may determine that a random access procedure is unsuccessfully completed and/or a MAC entity of the wireless device may indicate a random access problem to upper layer(s), for example, if the quantity/number of preamble transmissions satisfy (e.g., reach) a threshold (e.g., if PREAMBLE_TRANSMISSION_COUNTER= preambleTransMax+1). The wireless device may determine that a random access procedure (and/or one or more retransmissions of one or more preambles) is not completed, for example, if the number/quantity of preamble transmissions does not satisfy (e.g., reach) a threshold, (e.g., if PREAMBLE_TRANSMISSION_COUNTER< preambleTransMax+1).

A wireless device may delay a retransmission of a preamble for a particular period of time (e.g., a backoff time) associated with a retransmission of one or more preamble. The wireless device may set the backoff time to 0 ms (or any other time duration), for example, if a random access procedure is initiated. The wireless device may set (or update) the backoff time, for example, based on a preamble backoff (e.g., PREAMBLE_BACKOFF) that may be determined by a value in a BI field of the MAC subPDU (e.g., BI field in FIG. 27B). The wireless device may set the preamble backoff (e.g., PREAMBLE_BACKOFF) to a value of the BI field of the MAC subPDU using a predefined table. The predefined table may comprise backoff parameter value(s). BI may indicate one of the backoff parameter values. The wireless device may set the preamble backoff (e.g., PREAMBLE_BACKOFF) to 30 ms (or any other time duration), for example, if the wireless device receives BI indicating index 3 (or 0010 in a bit string) and the index 3 is associated with 30 ms (or any other time duration) in the table. The wireless device may set the preamble backoff (e.g., PREAMBLE_BACKOFF) to a value of the BI field of the MAC subPDU multiplied by a scaling factor (e.g., SCALING_FACTOR_BI), for example, if a base station configures the wireless device with a scaling factor (e.g., scalingFactorBI) by one or more RRC messages. SCALING_FACTOR_BI and scalingFactorBI may have the same value, scalingFactorBI may be configured by a base station for the wireless device. The wireless device may receive a message indicating scalingFactorBI and may store the value of scalingFactorBI as the value of SCALING_FACTOR_BI. The value of SCALING_FACTOR_BI may be maintained and may be used by the wireless device, for example, for multiplying the scaling factor (e.g., SCALING_FACTOR_BI) with the value of the BI field. The wireless device may set (or update) the preamble backoff (e.g., PREMABLE_BACKOFF) based on a BI field, for example, if a downlink assignment has been received via the PDCCH for the RA-RNTI and the received TB is successfully decoded, and/or if the random access response comprises a MAC subPDU with a backoff indicator (e.g., BI in FIG. 27B). The wireless device may set the preamble backoff (e.g., PREAMBLE_BACKOFF) to 0 ms, for example, if a downlink assignment has not been received via the PDCCH for the RA-RNTI and/or the received TB is not successfully decoded, and/or if the random access response does not comprise a MAC subPDU with a backoff indicator (e.g., BI in FIG. 27B).

A wireless device may determine a backoff time, for example, based on the preamble backoff (e.g., PREAMBLE_BACKOFF). The wireless device may determine the backoff time, for example, if the wireless device determines that a random access response is not successfully received and/or a contention resolution is not successful. The wireless device may use a particular determination/selection mechanism to determine/select the backoff time. The wireless device may determine/select the backoff time, for example, based on a uniform distribution between 0 and the preamble backoff (e.g., PREAMBLE_BACKOFF). The wireless device may use other types of distribution to determine/select the backoff time based on the preamble backoff (e.g., PREAMBLE_BACKOFF).

The wireless device may ignore the preamble backoff (e.g., PREAMBLE_BACKOFF, a value in BI field in FIG. 27B, etc.) and/or may not have a backoff time. The wireless device may determine whether to apply the backoff time to a retransmission of at least one preamble, for example, based on an event type initiating the random access procedure (e.g., a beam failure recovery request, handover, etc.) and/or a type of the random access procedure (e.g., four-step or two-step RA and/or contention-based RA (CBRA) or contention-free RA (CFRA)). The wireless device may apply the backoff time to the retransmission, for example, if the random access procedure is CBRA (e.g., in which a preamble may be selected by the wireless device or a MAC entity of the wireless device) and/or if the wireless device determines that a random access procedure is not completed based on a random access response reception being unsuccessful. The wireless device may apply the backoff time to the retransmission, for example, if the wireless device determines that a random access procedure is not completed based on a contention resolution being unsuccessful.

A wireless device may perform a random access resource selection procedure (e.g., select at least one SSB or CSI-RS and/or select PRACH corresponding to at least one SSB or CSI-RS selected by the wireless device), for example, if the random access procedure is not completed. The wireless device may delay the subsequent random access preamble transmission (or delay a random access resource selection procedure) for the backoff time.

A wireless device may change/switch a channel (e.g., a BWP and/or a subband) to send/transmit at least one preamble for a retransmission. The change/switch may increase the quantity/number of preamble transmission opportunities. A base station may send/transmit, to a wireless device, one or more messages (e.g., broadcast messages and/or RRC messages) indicating a configuration of the one or more channels (e.g., BWPs, transmission/reception beams, SSBs, and/or subbands) for which one or more PRACHs may be configured. A wireless device may determine/select one of the one or more channels (e.g., BWPs and/or subbands) as a channel (e.g., a BWP, a transmission/reception beam, an SSB, and/or a subband) to send/transmit a first preamble. The wireless device may determine/select the channel (e.g., BWP and/or subband) based on an LBT procedure result. The wireless device may perform one or more LBT procedures on one or more channels. The wireless device may determine/select the channel among the channel(s) being determined (e.g., sensed) as idle. The wireless device may determine/select one of the channels being determined as idle, for example, based on a random selection.

The channel may be determined/defined based on a BWP configuration, a subband configuration, and/or another wireless resource configuration. A base station may configure a wireless device with one or more initial DL BWPs and/or UL BWPs. A configuration of each of the one or more initial DL BWPs and/or UL BWPs may comprise a dedicated DL BWP (e.g., BWP-DownlinkDedicated) (e.g., for an initial DL BWP) and/or a dedicated UL BWP (e.g., BWP-UplinkDedicated) (e.g., for an initial UL BWP) configurations. The dedicated DL BWP configurations and/or the dedicated UL BWP configurations may indicate at least one of the following: a subcarrier spacing, a cyclic prefix, a location and a bandwidth of each of the one or more initial DL and/or UL BWPs, a DL control channel configuration, a DL shared channel configuration, a rach-configuration (e.g., rach-ConfigCommon and/or rach-ConfigDedicated), a UL control configuration, and/or a UL shared channel configuration.

One of (e.g., initial) UL BWP(s) may be associated with at least one of (e.g., initial) DL BWP(s). The association may be indicated by configuration parameter(s) in the one or more messages transmitted by the base station and/or may be predefined. The association may be determined/set, for example, by a (e.g., initial) UL BWP configuration (or an (e.g., initial) DL BWP configuration) that may comprise a DL BWP index of one of one or more DL BWPs and/or a UL BWP index of one of one or more UL BWPs. The association may be determined/set by a predefined rule and/or a table. A (e.g., initial) UL BWP may have an association with a (e.g., initial) DL BWP that may have the same BWP index (e.g., UL BWP #0 with DL BWP #0, UL BWP #1 with DL BWP #1, and so on). A wireless device may monitor, for a random access response, a control channel, for example, based on the association. A wireless device may monitor, for a random access response, a control channel of a (e.g., initial) DL BWP associated with a (e.g., initial) UL BWP via which the wireless device sends/transmits at least one preamble. A wireless device may monitor, for a contention resolution, a control channel of a (e.g., initial) DL BWP associated with a (e.g., initial) UL BWP via which the wireless device transmits Msg3.

A wireless device may receive, from a base station, an RRC message indicating the association between one of (e.g., initial) UL BWP(s) and least one of (e.g., initial) DL BWP(s). A serving cell configuration (e.g., ServingCellConfigCommon or ServingCellConfigCommonSIB) in the RRC message may indicate a BWP configuration (e.g., DownlinkConfigCommon or DownlinkConfigCommonSIB for the initial DL BWP and/or UplinkConfigCommonSIB for the initial uplink BWP) for a random access procedure. One or more DL/UL BWP pairs may be configured. Each DL/UL BWP pair may comprise at least one (e.g., initial) DL BWP configuration and one or more (e.g., initial) UL BWP configuration. One (e.g., initial) DL BWP configuration and one or more (e.g., initial) UL BWP configuration may be paired. The RRC message (and/or the one (e.g., initial) DL BWP configuration and/or the serving cell configuration) may comprise parameters indicating one or more transmissions of one or more SSBs (or CSI-RSs). The one or more SSBs may be configured per a BWP (e.g., via the one (e.g., initial) DL BWP configuration) and/or per a cell (e.g., via the serving cell configuration). One or more PRACH resources configured in the one or more (e.g., initial) UL BWP configurations may be associated with the one or more SSBs. A wireless device may switch/change/select a UL BWP for a preamble retransmission among the one or more UL BWPs associated with the one (e.g., initial) DL BWP configuration, for example, if the wireless device determines/selects one of the one or more SSBs. A wireless device may determine/select PRACH resource(s) configured in one or more (e.g., initial) UL BWPs associated with one or more (e.g., initial) DL BWPs. The wireless device may determine/select PRACH resource(s) configured in one or more (e.g., initial) UL BWPs associated with one or more (e.g., initial) DL BWPs, for example, if a wireless device determines/selects one or more SSBs from the one or more (e.g., initial) DL BWPs.

A wireless device and/or a base station may perform an LBT procedure, for example, before sending/transmitting each message (e.g., Msg1, Msg2, Msg3, Msg4, MsgA, and/or MsgB) via an unlicensed band. Each message transmission attempt may experience an LBT failure that may cause a random access delay/latency. A large delay/latency during a random access procedure may not satisfy a control plane requirement. Increasing transmission opportunities configured over a frequency domain (e.g., over one or more channels, BWPs and/or subbands) may enhance the robustness of the random access procedure (e.g., improve the random access delay/latency caused by an LBT failure in an unlicensed band).

A base station may configure a wireless device with a plurality of channels (e.g., a plurality of DL and/or UL BWPs and/or subbands). For a Msg1 (e.g., MsgA) transmission, the wireless device may attempt to perform an LBT procedure in one or more UL BWPs configured with RACH resource(s). The wireless device may perform a Msg1 (e.g., MsgA) transmission via RACH resource(s) in a UL BWP, for example, if at least one LBT procedure is successful on the UL BWP. The probability of LBT success may increase, for example, if each channel status of the one or more UL BWPs is independent of each other.

For Msg2/Msg4 (or MsgB) enhancement, a base station may attempt to perform at least one LBT on a plurality of DL BWPs. The base station may perform a Msg2/Msg4 (MsgB) transmission, for example, if an LBT procedure is successful. A wireless device may monitor a PDCCH in one or more DL BWPs of the plurality of DL BWPs. The one or more DL BWPs may be associated with one or more UL BWPs via which the wireless device may send/transmit at least one of Msg1, Msg3 and/or MsgB. The one or more DL BWPs may be predefined and/or semi-statically configured by an RRC message transmitted by the base station.

For Msg3 enhancement, a base station may send/transmit at least one RAR comprising a plurality of UL grants corresponding to a plurality of BWPs. Each of the UL grants may comprise one or more fields indicating a BWP identifier and/or a time/frequency domain resource in a BWP corresponding to the BWP identifier. The wireless device may perform at least one LBT procedure on one or more of indicated BWPs (e.g., the plurality of BWPs). The wireless device may perform a Msg3 transmission, for example, if an LBT procedure is successful.

A wireless device may send (e.g., transmit) Msg1 and Msg3 via different channels (e.g., UL BWPs and/or subbands). A wireless device may receive Msg2 and Msg4 via different channels (e.g., DL BWPs and/or subbands). A wireless device may send/transmit Msg1 for a preamble retransmission via a channel (e.g., a UL BWP and/or a subband). The channel may be different from a channel via which the wireless device transmitted Msg1 in a previous preamble (re)transmission.

A base station may configure multiple preamble transmission opportunities over a frequency domain (e.g., in a frequency band of a radio access technology, such as LTE LAA, NR unlicensed, and/or any other access technology). A wireless device may select a different UL BWP (e.g., a different subband) during one or more retransmissions (e.g., comprising an initial transmission) of at least one preamble. A wireless device may send/transmit a first preamble via a first PRACH in a first BWP (or a first subband) for a first (re)transmission during an RA procedure. The wireless device may send/transmit a second preamble via a second PRACH in a second BWP (or a second subband) for a second (re)transmission during the RA procedure. The first BWP (or subband) may be different from the second BWP (or subband), for example, depending on one or more LBT procedure results on the first and second BWPs (or subbands). The first BWP (or subband) and the second BWP (or subband) may be the same, for example, depending on one or more LBT procedure results on the first and second BWPs (or subbands).

Figure 31:
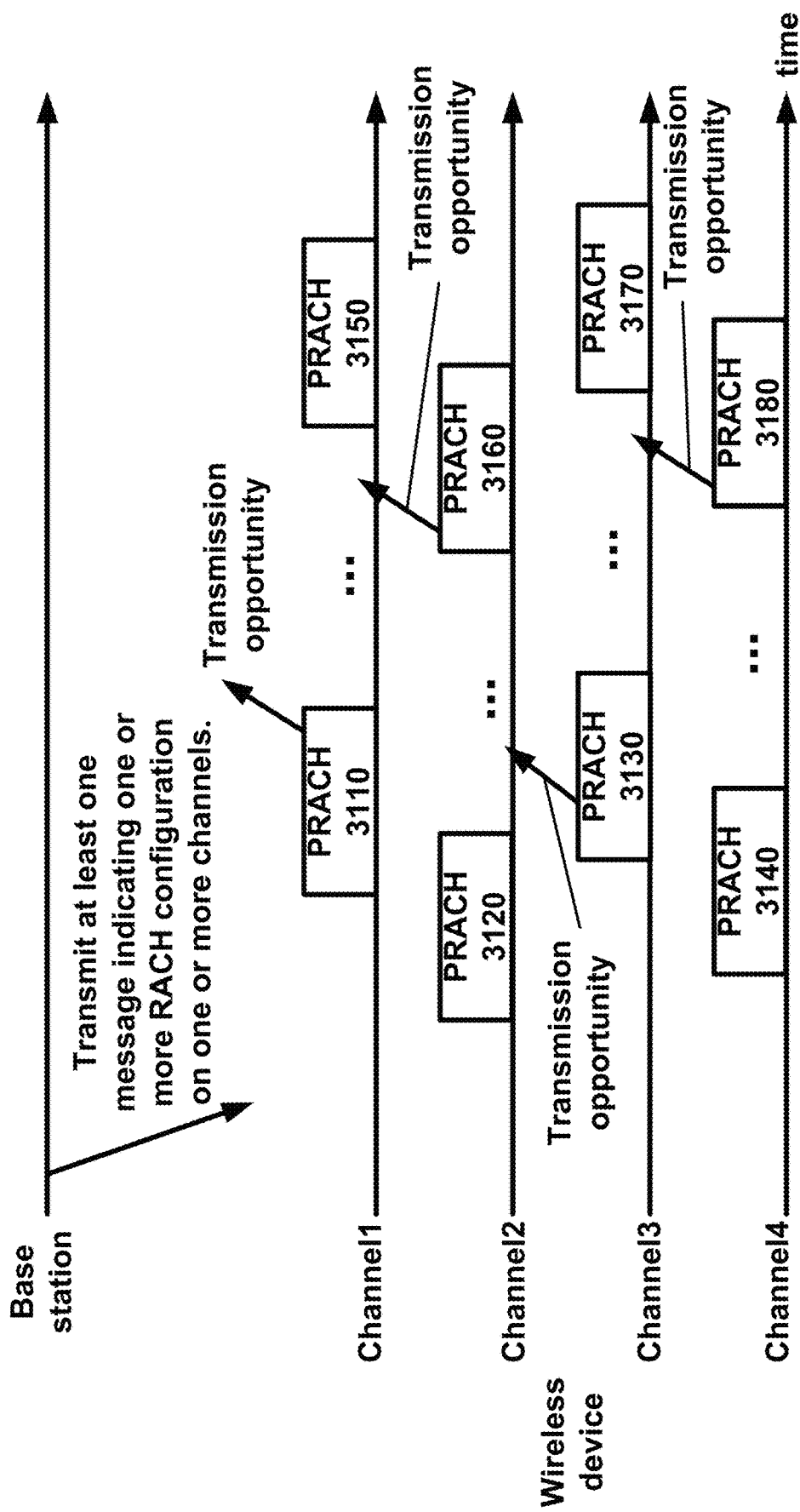
FIG. 31 shows an example of one or more preamble transmission opportunities.

FIG. 31 shows an example of one or more preamble transmission opportunities. The one or more preamble transmission opportunities may be configured via one or more channels (e.g., BWPs, subbands, unlicensed bands, and/or other channels). A base station may send (e.g., transmit) one or more RRC messages indicating one or more PRACH resources for one or more preamble transmission opportunities on one or more channels (e.g., BWPs, subbands, etc.). The wireless device may determine/select at least one PRACH (and/or at least one BWP or subband) for at least one preamble transmission. The wireless device may determine/select a different PRACH (and/or different BWP or subband), for example, if the wireless device performs a preamble retransmission. An LBT procedure result may be used for a selection of PRACH. A wireless device may perform one or more LBT procedures before determining/selecting one or more PRACHs (e.g., PRACH 3110, PRACH 3120, PRACH 3130, and PRACH 3140). The wireless device may send/transmit at least one preamble via at least one PRACH (e.g., on BWP and/or subband) in which a corresponding LBT procedure is successful. The wireless device may determine a plurality of preamble transmission opportunities over one or more PRACHs (e.g., PRACH 3110, PRACH 3130). The wireless device may determine/select one of the one or more PRACHs, for example, based on a random selection. The wireless device may determine a retransmission of at least one preamble, for example, if the wireless device determines that a reception of an RAR is not successful and/or a contention resolution is not successful. The wireless device may determine one or more preamble transmission opportunities over one or more PRACHs (e.g., PRACH 3160, PRACH 3180) that may be configured in different channel(s) (e.g., BWP(s) or subband(s)).

A wireless device may delay a retransmission of a preamble based on a backoff time. A BI (e.g., the BI in FIG. 27B) may be set for a UL BWP (e.g., an initial UL BWP) configured for a random access procedure (e.g., configured in a SIB1 IE), for example, in a legacy system. The quantity/number of the UL BWP(s) (e.g., the initial UL BWP(s)) may be at most one (e.g., in at least some legacy or other systems). A base station may configure multiple preamble transmission opportunities over a frequency domain (e.g., in a frequency band of a radio access technology, such as LTE LAA, NR unlicensed, or any other access technology). A wireless device may determine/select a different UL BWP (or a different subband), for example, for each time of one or more retransmissions (e.g., comprising an initial transmission) of at least one preamble. One or more backoff times for one or more (e.g., initial) UL BWPs (or subbands) on which one or more PRACHs are configured may be set and managed.

A wireless device may send/transmit one or more preambles during an RA procedure. The wireless device may determine to transmit the one or more preambles, for example, based on or in response to determining a preamble retransmission. The wireless device may determine the preamble retransmission, for example, based on or in response to an RAR reception being completed unsuccessfully and/or a contention resolution being completed unsuccessfully. The wireless device may determine to send/transmit the one or more preambles to increase the quantity/number of transmission opportunities (e.g., to increase a success probability of a preamble transmission). The wireless device may send/transmit the one or more preambles for a particular type of RA procedure (e.g., CBRA and/or CFRA), and/or for a particular type of event(s) initiating the RA procedure (e.g., an SCell addition, a handover, a beam failure recovery, etc.). The wireless device may determine to send/transmit the one or more preambles in a particular frequency. The wireless device may send/transmit the one or more preambles via an unlicensed band. A base station may send/transmit, to a wireless device, a message (e.g., a SIB, an RRC message, and/or a control signal) indicating one or more PRACHs configured in time and/or frequency domain. The wireless device may send/transmit the one or more preambles via at least one of the one or more PRACHs. The wireless device may perform one or more LBT procedures, for example, before sending/transmitting at least one of the one or more preambles via the at least one of the one or more PRACHs in an unlicensed band.

A wireless device may manage one or more counters indicating a quantity/number of preamble transmissions (e.g., PREAMBLE_TRANSMISSION_COUNTER) and/or a quantity/number of preamble transmission attempts (e.g., PREAMBLE_TRANSMISSION_ATTEMPT_COUNTER or PREAMBLE_ATTEMPT_COUNTER) for an RA procedure. PREAMBLE_TRANSMISSION_COUNTER may count the quantity/number of preamble transmissions performed during the RA procedure. A counter (e.g., PREAMBLE_ATTEMPT_COUNTER) may be used to count the quantity/number of preamble transmission attempts performed during the RA procedure. The wireless device may count the quantity/number of preamble transmission attempts via an unlicensed band. The wireless device may count the quantity/number of LBT procedures performed during the RA procedure as the quantity/number of preamble transmission attempts. The wireless device may increment a counter (e.g., PREAMBLE_ATTEMPT_COUNTER), based on or in response to performing the LBT procedure, regardless of whether or not a preamble transmission occurs.

In an RA procedure via an unlicensed band, a base station and/or a wireless device may determine value(s) of one or more counters (e.g., PREAMBLE_TRANSMISSION_COUNTER and/or PREAMBLE_ATTEMPT_COUNTER), for example, based on one or more LBT procedures. A wireless device may perform an LBT procedure for a preamble transmission via a PRACH. The wireless device may increment an attempt counter (e.g., PREAMBLE_ATTEMPT_COUNTER) by one (or another value), for example, if the wireless device performs the LBT procedure. The wireless device may increment a transmission counter (e.g., PREAMBLE_TRANSMISSION_COUNTER) by one (or another value), for example, if the wireless device sends/transmits a preamble via the PRACH and/or if a (e.g., actual or physical) transmission of the preamble occurs. The wireless device may send/transmit the preamble, for example, based on or in response to the PRACH being determined (e.g., sensed) as idle based on the LBT procedure. The wireless device may not increment the transmission counter (e.g., PREAMBLE_TRANSMISSION_COUNTER), for example, if a preamble transmission is dropped/canceled/delayed/skipped/aborted due to an LBT failure. The wireless device may increment the attempt counter (e.g., PREAMBLE_ATTEMPT_COUNTER), for example, regardless of whether a preamble transmission occurs and/or regardless of whether or not a preamble transmission is dropped/canceled/delayed/skipped/aborted due to an LBT failure.

A wireless device (e.g., a MAC layer of a wireless device) may determine at least one preamble transmission (e.g., determine a random access resource selection comprising determining a preamble index, PRACH occasion(s), etc.). The wireless device (e.g., MAC layer of the wireless device) may indicate (or instruct), to a PHY layer of the wireless device, to send/transmit at least one preamble via a PRACH determined/selected by the MAC layer. The wireless device (e.g., the PHY layer of the wireless device) may perform at least one LBT procedure on the PRACH. The wireless device (e.g., the PHY layer of the wireless device) may determine whether to send/transmit the at least one preamble, for example, based on an outcome of the at least one LBT procedure. The wireless device (e.g., the PHY layer of the wireless device) may drop/cancel/delay/skip/abort a transmission of the at least one preamble, for example, if the at least one LBT procedure has failed (e.g., the at least one LBT procedure indicates that the PRACH is not idle). The wireless device (e.g., the PHY layer of the wireless device) may perform a transmission of the at least one preamble, for example, if the at least one LBT procedure is successful (e.g., the at least one LBT indicates that the PRACH is idle). The wireless device (e.g., the PHY layer of the wireless device) may indicate, to a MAC layer (e.g., a MAC entity), whether the LBT procedure has failed or is successful, and/or whether or not the at least one preamble is transmitted. The wireless device (e.g., the MAC layer of the wireless device) may determine the quantity/number of preamble transmissions and/or the number of preamble transmission attempts (e.g., to determine whether to increment PREAMBLE_TRANSMISSION_COUNTER and/or PREAMBLE_ATTEMPT_COUNTER) based on the LBT failure/success indicator.

Figure 32:
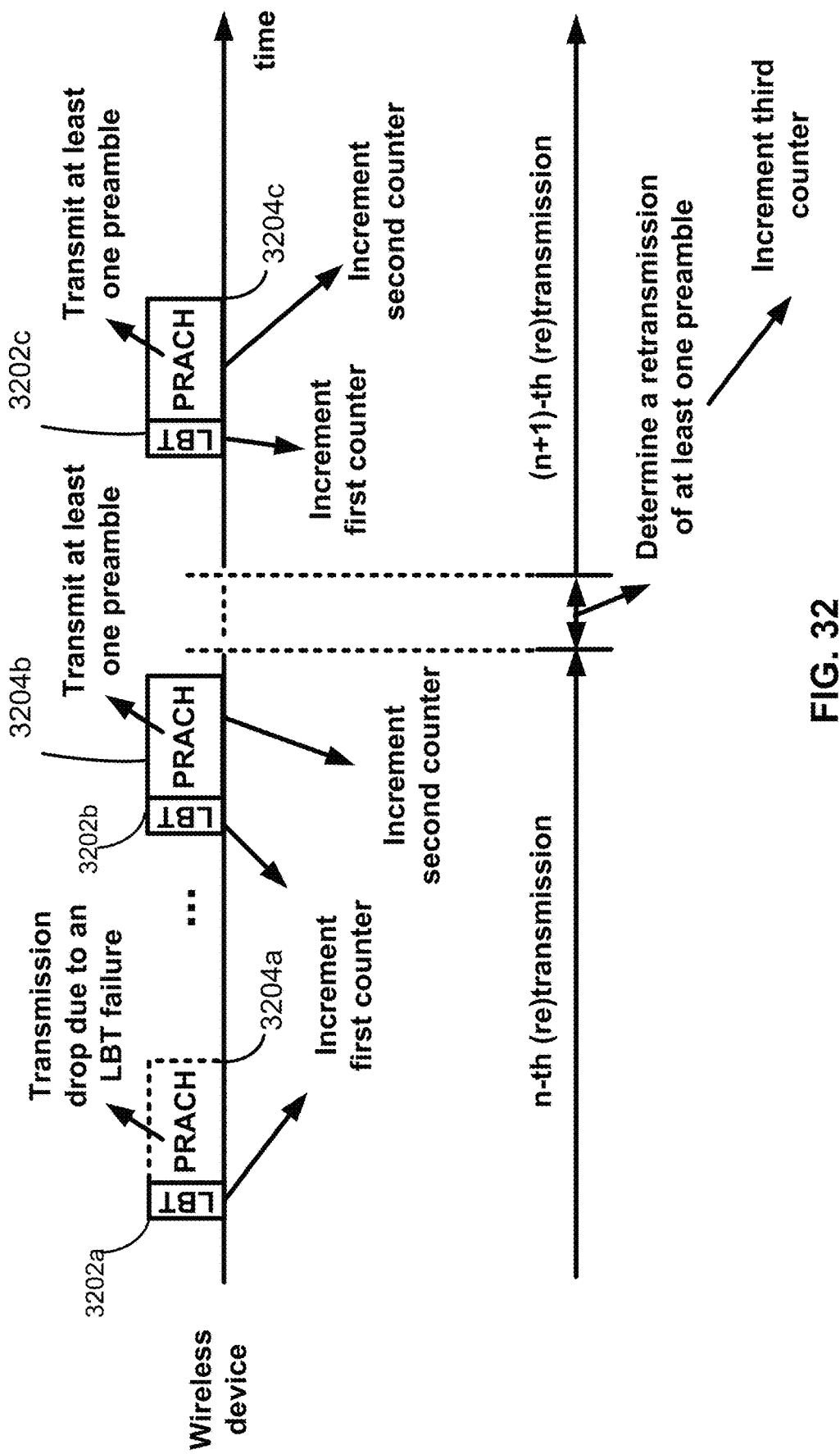
FIG. 32 shows an example of counter operations.

FIG. 32 shows an example of counter operations. A wireless device may attempt to send/transmit one or more preambles via one or more channels (BWPs and/or sub-bands). A first counter may be used to count the quantity/number of preamble transmission attempts (e.g., PREAMBLE_ATTEMPT_COUNTER). The wireless device may increment a value of the first counter, for example, based on or in response to performing an LBT procedure. A second counter may be used to count the quantity/number of preamble transmissions (e.g., PREAMBLE_TRANSMISSION_COUNTER). For example, the wireless device may increment a value of the second counter, for example, based on or in response to transmitting at least one preamble.

The quantity/number of preamble transmissions and the number of preamble transmission attempts may be counted in one or more ways. A wireless device may send (e.g., transmit) a plurality of preambles (e.g., before starting ra-ResponseWindow or before an expiry of ra-Response-Window started based on or in response to sending/transmitting at least one of the plurality of preambles. The wireless device may count/determine the quantity/number of the plurality of sent/transmitted preambles. The wireless device may add the quantity/number of the plurality of sent/transmitted preambles to a transmission counter (e.g., PREAMBLE_TRANSMISSION_COUNTER). The wireless device may determine/count a second quantity/number of a second plurality of sent/transmitted preambles. The wireless device may add the second number to a transmission counter (e.g., PREAMBLE_TRANSMISSION_COUNTER), for example, if the wireless device determines a preamble retransmission and sends/transmits the second plurality of preambles.

A wireless device may control/manage a third counter (e.g., PREAMBLE_RETRANSMISSION_COUNTER) for determining/counting the quantity/number of (re)transmission in an RA procedure. The wireless device may set the third counter (e.g., PREAMBLE_RETRANSMISSION_COUNTER) to a predefined (or initial) value (e.g., zero), for example, if the wireless device initiates the RA procedure. The wireless device may increment the third counter (e.g., PREAMBLE_RETRANSMISSION_COUNTER) by one (or any other value), for example, based on or in response to determining that the RA procedure is not complete (e.g., based on an RAR reception being unsuccessful and/or a contention resolution being unsuccessful). The wireless device may determine whether or not the RA procedure is unsuccessfully completed at least based on third counter (e.g., PREAMBLE_RETRANSMISSION_COUNTER). The wireless device may determine that the RA procedure is unsuccessfully completed, for example, if the third counter (e.g., PREAMBLE_RETRANSMISSION_COUNTER) is equal to or greater than a threshold (e.g., preambleReTrnasMax+1, where preambleReTrnasMax may be predefined or semi-statically configured by a base station). The wireless device may determine to perform a preamble retransmission, for example, if the third counter (e.g., PREAMBLE_RETRANSMISSION_COUNTER) is less than the threshold (e.g., a preamble retransmission threshold).

As shown in FIG. 32, a wireless device may have a plurality of PRACH (e.g., PRACH occasions) during the n-th (re)transmission opportunity for transmitting a preamble. The wireless may perform an LBT procedure 3202a, may determine that the PRACH 3204a is not idle, and/or may determine to drop/cancel/delay/skip/abort a preamble transmission on the PRACH 3204a. Based on the performance of the LBT procedure 3202a, the wireless device may increment the first counter by one (or another value). The wireless may perform an LBT procedure 3202b, may determine that the PRACH 3204b is idle, and/or may send/transmit a preamble (e.g., the n-th preamble transmission) via the PRACH 3204b. Based on the performance of the LBT procedure 3202b, the wireless device may further increment the first counter by one (or another value). Based on the transmission of the preamble via the PRACH 3204b, the wireless device may increment the second counter by one (or another value).

The wireless device may monitor an RAR during an RAR window, for example, based on or in response to sending/transmitting the preamble via the PRACH 3204b. The wireless device may determine that the wireless device has not received an RAR responsive to the preamble sent via the PRACH 3204b, for example, if the wireless device does not receive an RAR during the RAR window, fails to detect an RAR, and/or receives an RAR associated with another wireless device. The wireless device may determine whether to perform a retransmission of at least one preamble, for example, after determining that the wireless device has not received the RAR responsive to the preamble sent via the PRACH 3204b. The wireless device may increment the third counter by one, for example, after determining to perform a retransmission (e.g., n+1-th (re)transmission) of at least one preamble.

A wireless device may have a plurality of PRACHs (e.g., PRACH occasions) during the n+1-th (re)transmission opportunity for transmitting a preamble. The wireless may perform an LBT procedure 3202c, may determine that the PRACH 3204c is idle, and/or may send/transmit a preamble (e.g., the n+1-th preamble transmission) via the PRACH 3204c. Based on the performance of the LBT procedure 3202c, the wireless device may further increment the first counter by one (or another value). Based on the transmission of the preamble via the PRACH 3204c, the wireless device may further increment the second counter by one (or another value).

Figure 33:
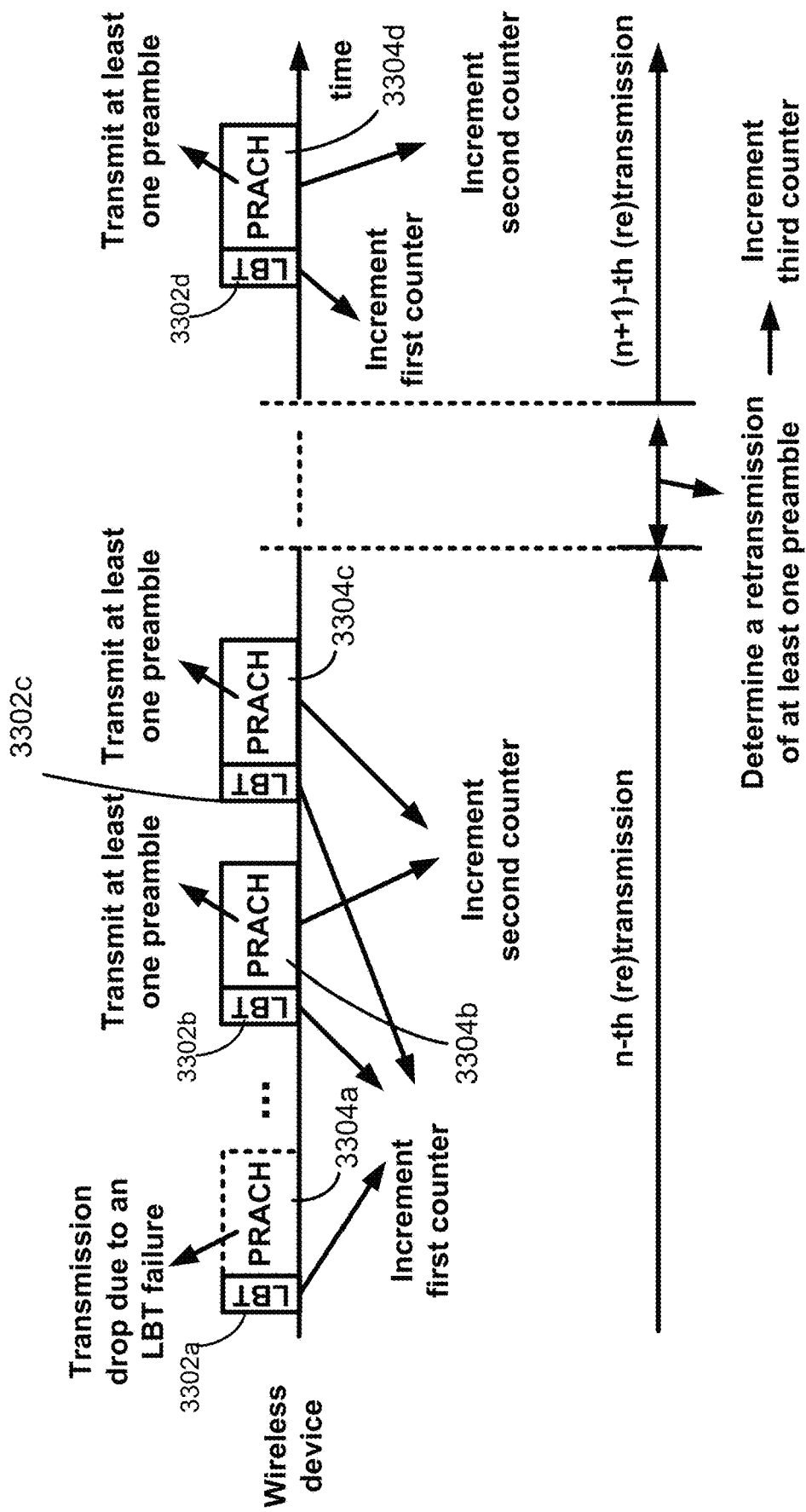
FIG. 33 shows an example of counter operations.

FIG. 33 shows an example of counter operations. A wireless device may attempt to send/transmit one or more preambles via one or more channels (e.g., BWP and/or subbands). A first counter may be used to count/determine the quantity/number of preamble transmission attempts (e.g., PREAMBLE_ATTEMPT_COUNTER). The wireless device may increment a value of the first counter, for example, based on or in response to performing an LBT procedure. A second counter may be used to count/determine the quantity/number of preamble transmissions (e.g., PREAMBLE_TRANSMISSION_COUNTER). The second counter may be used to count a total quantity/number of preamble transmissions. The wireless device may increment a value of the second counter, for example, based on or in response to sending/transmitting at least one preamble. A third counter may be used to count the quantity/number of (re)transmissions (e.g., PREAMBLE_RETRANSMIS-SION_COUNTER) The wireless device may increment a value of the third counter, for example, based on or in response to determining a retransmission of at least one preamble (e.g., determining (n+1)-th (re)transmission shown in FIG. 33).

As shown in FIG. 33, a wireless device may have a plurality of PRACHs (e.g., PRACH occasions) during the n-th (re)transmission opportunity for sending/transmitting a preamble. The wireless may perform an LBT procedure 3302a, may determine that the PRACH 3304a is not idle, and/or may determine to drop/cancel/delay/skip/abort a preamble transmission on the PRACH 3304a. Based on the performance of the LBT procedure 3302a, the wireless device may increment the first counter by one (or any other value). The wireless may perform an LBT procedure 3302b, may determine that the PRACH 3304b is idle, and/or may transmit a preamble via the PRACH 3304b. Based on the performance of the LBT procedure 3302b, the wireless device may further increment the first counter by one (or any other value). Based on the transmission of the preamble via the PRACH 3304b, the wireless device may increment the second counter by one (or any other value). The wireless may perform an LBT procedure 3302c, may determine that the PRACH 3304c is idle, and/or may send/transmit a preamble via the PRACH 3304c. Based on the performance of the LBT procedure 3302c, the wireless device may further increment the first counter by one (or any other quantity). Based on the transmission of the preamble via the PRACH 3304c, the wireless device may further increment the second counter by one.

The wireless device may monitor an RAR during an RAR window, for example, based on or in response to sending/transmitting the preamble via the PRACH 3204c. The wireless device may determine that the wireless device has not received an RAR responsive to at least one of the preambles (e.g., the preamble transmission via the PRACH 3304b, the preamble transmission via the PRACH 3304c, etc.) sent during the n-th (re)transmission window, for example, if the wireless device does not receive an RAR during the RAR window, fails to detect an RAR, and/or receives an RAR associated with another wireless device. The wireless device may determine whether to perform a retransmission of at least one preamble, for example, after determining that the wireless device has not received the RAR responsive to the preamble sent via the PRACH 3304b (e.g., during an RAR window associated with the PRACH 3304b). The wireless device may determine to perform the LBT procedure 3302c, for example, after or in response to determining that the wireless device has not received an RAR responsive to the preamble sent/transmitted via the PRACH 3304b. The wireless device may send/transmit the preamble via the PRACH 3304c, for example, after or in response to the LBT procedure 3302c. The wireless device may determine that the wireless device has not received the RAR responsive to the preamble sent via the PRACH 3304c (e.g., during an RAR window associated with the PRACH 3304c). The wireless device may increment a third counter by one (or any other value), for example, after determining to perform a retransmission (e.g., n+1-th (re)transmission) of at least one preamble.

A wireless device may have a plurality of PRACHs (e.g., PRACH occasions) during the n+1-th (re)transmission opportunity for transmitting a preamble. The wireless may perform an LBT procedure 3302d, may determine that the PRACH 3304d is idle, and/or may send/transmit a preamble via the PRACH 3304d. Based on the performance of the LBT procedure 3302d, the wireless device may further increment the first counter by one (or any other value). Based on the transmission of the preamble via the PRACH 3304d, the wireless device may further increment the second counter by one (or any other value).

A base station may configure a wireless device with one or more channels comprising one or more PRACHs for an RA procedure. The wireless device may attempt to send/transmit at least one preamble in different channels of the one or more channels. The wireless device may attempt to send/transmit at least one preamble in a same channel (e.g., a BWP or a subband). The wireless device may switch to a different channel, for example, based on or in response to determining a preamble retransmission. The channel switching may occur retransmission-by-retransmission (e.g., in response to determining a preamble retransmission due to an RAR reception and/or a contention resolution being unsuccessful).

Figure 34:
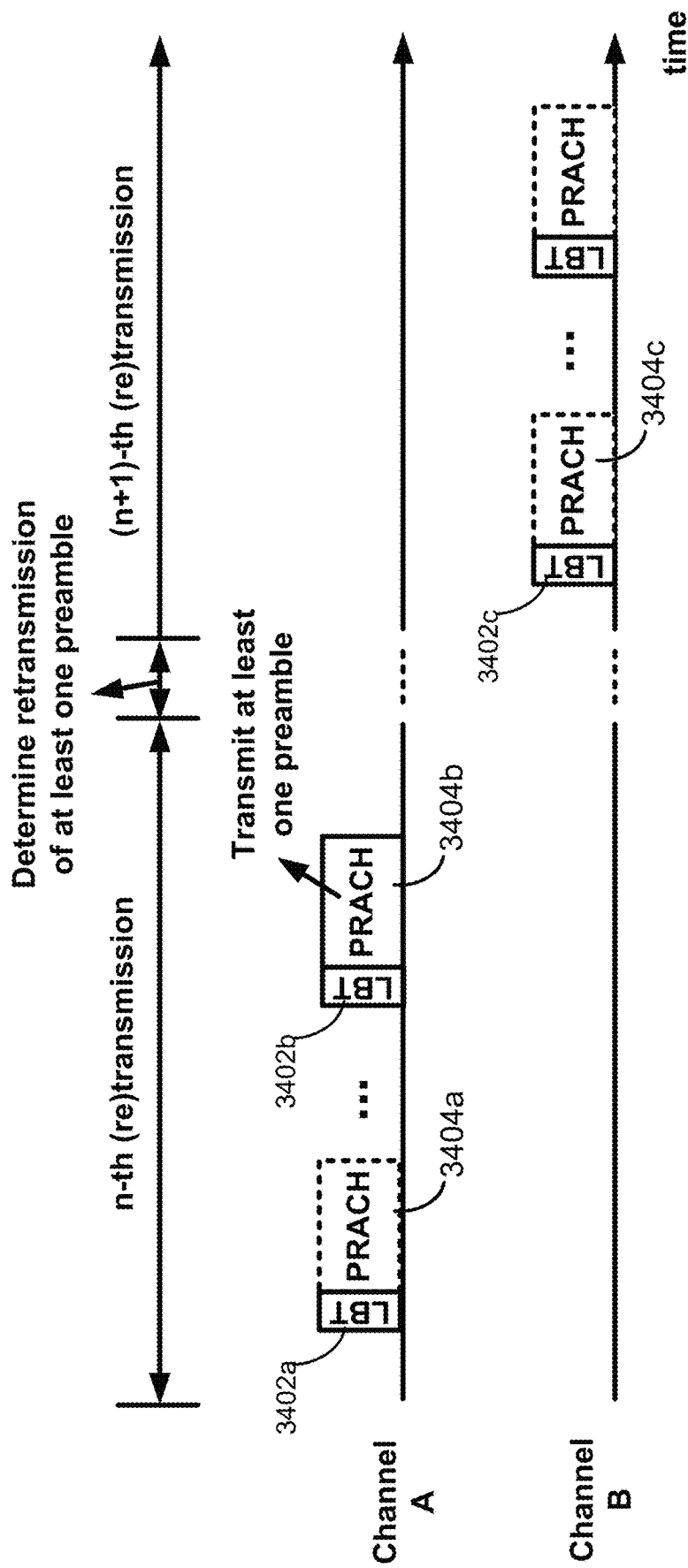
FIG. 34 shows an example of channel switching.

FIG. 34 shows an example of channel switching. A base station may send/transmit a message comprising configuration parameters indicating one or more PRACHs (e.g., for an RA procedure in an unlicensed band). A wireless device may attempt to send/transmit one or more first preambles in channel A. The wireless device may perform one or more first LBT procedures to determine whether to send/transmit the one or more first preambles via channel A. As shown in FIG. 34, during an n-th (re)transmission opportunity, a wireless device may perform an LBT procedure 3402a, may determine that the PRACH 3404a is not idle, and/or may determine to drop/cancel/delay/skip/abort a preamble transmission on the PRACH 3404a. During the n-th (re)transmission opportunity, the wireless device may perform an LBT procedure 3402b, may determine that the PRACH 3404b is idle, and/or may send/transmit a preamble via the PRACH 3404b. The wireless device may monitor an RAR during an RAR window, for example, based on or in response to sending/transmitting the preamble via the PRACH 3404b. The wireless device may determine that the wireless device has not received an RAR responsive to the preamble sent via the PRACH 3404b, for example, if the wireless device does not receive an RAR during the RAR window, fails to detect an RAR, and/or receives an RAR associated with another wireless device. The wireless device may determine whether to perform a retransmission of at least one preamble, for example, after determining that the wireless device has not received the RAR responsive to the preamble sent via the PRACH 3404b. The wireless device may determine a retransmission of at least one preamble, for example, during an n+1-th (re)transmission opportunity. The wireless device may switch to channel B. Channel B may be a channel to send/transmit one or more second preambles. Channel A and channel B may be different frequency bands, different BWPs, or different subbands in the same BWP. During an n+1-th (re)transmission opportunity, a wireless device may perform an LBT procedure 3402c, may determine that the PRACH 3404c is not idle, and/or may determine to drop/cancel/delay/skip/abort a preamble transmission on the PRACH 3304c.

Figure 35:
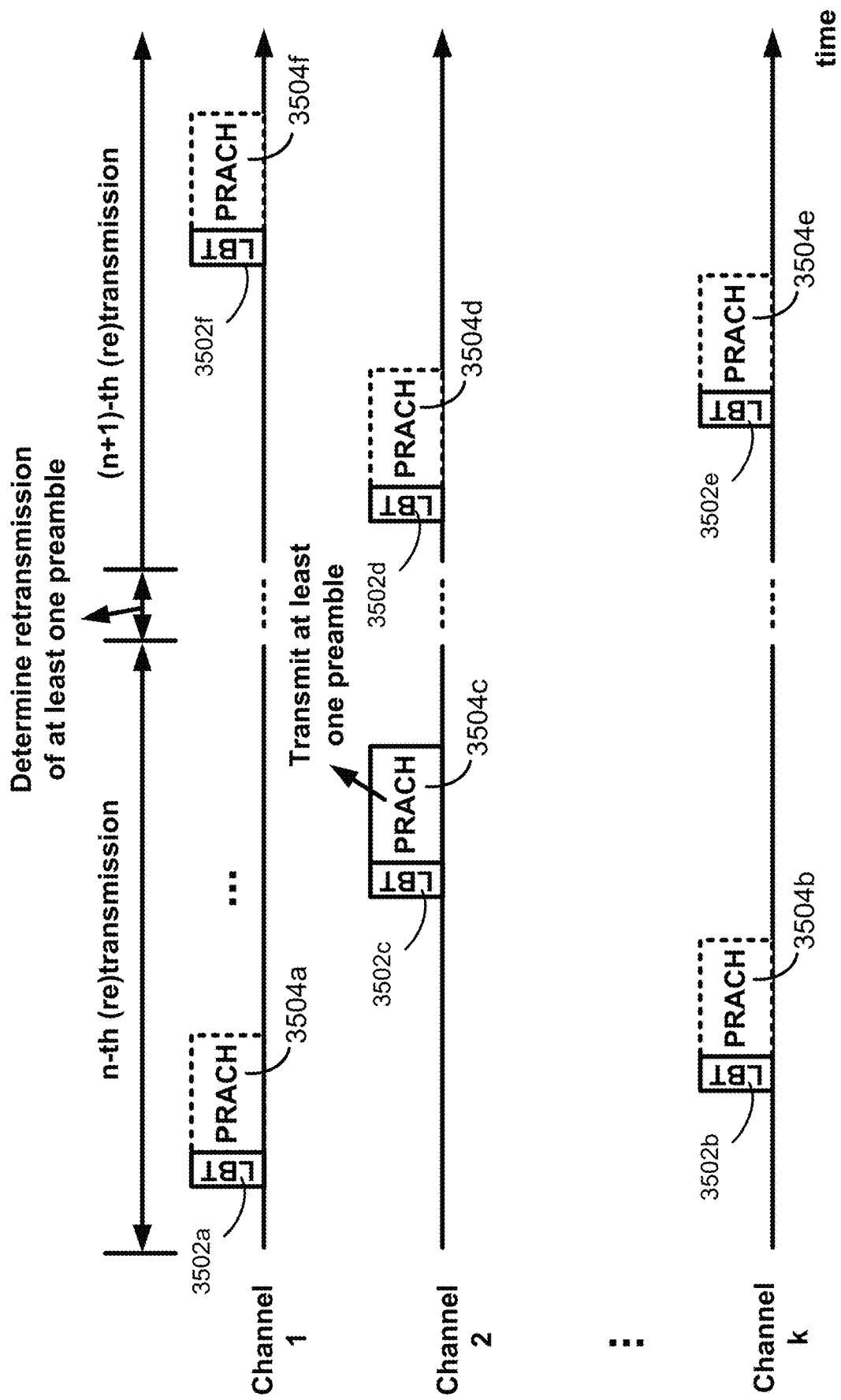
FIG. 35 shows an example of channel switching.

FIG. 35 shows an example of channel switching. A base station may send/transmit a message comprising configuration parameters indicating one or more PRACHs in one or more channels (e.g., BWPs, subbands, or other time/frequency resources) for an RA procedure in an unlicensed band. A wireless device may switch between channels, for a preamble transmission, one or more times, for example, between retransmission opportunities (e.g., between n-th (re)transmission opportunity and (n+1)-th (re)transmission opportunity), and/or within a (re)transmission opportunity (e.g., within the n-th (re)transmission opportunity) in FIG. 35. The wireless device may determine a channel switching based on one or more LBT procedures performed on one or more PRACHs of the one or more channels. The wireless device may perform the one or more LBT procedures on different PRACHs (and/or different channels), for example, simultaneously or with a time gap. The wireless device may send/transmit at least one preamble via at least one of the one or the one or more PRACHs, for example, if the at least one of the one or the one or more PRACHs are determined to be idle.

As shown in FIG. 35, during an n-th (re)transmission opportunity, a wireless device may perform an LBT procedure 3502a on channel 1, may determine that the PRACH 3504a is not idle, and/or may determine to drop/cancel/delay/skip/abort a preamble transmission on the PRACH 3504a. During the n-th (re)transmission opportunity, the wireless device may perform an LBT procedure 3502b on channel k, may determine that the PRACH 3504b is not idle, and/or may determine to drop/cancel/delay/skip/abort a preamble transmission on the PRACH 3504b. During the n-th (re)transmission opportunity, the wireless device may perform an LBT procedure 3502c on channel 2, may determine that the PRACH 3504c is idle, and/or may send/transmit a preamble via the PRACH 3504c. The wireless device may monitor an RAR during an RAR window, for example, based on or in response to transmitting the preamble via the PRACH 3504c. The wireless device may determine that the wireless device has not received an RAR responsive to the preamble sent via the PRACH 3504c, for example, if the wireless device does not receive an RAR during the RAR window, fails to detect an RAR, or receives an RAR associated with another wireless device. The wireless device may determine whether to perform a retransmission of at least one preamble, for example, after determining that the wireless device has not received the RAR responsive to the preamble sent via the PRACH 3504c. The wireless device may determine a retransmission of at least one preamble, for example, during an n+1-th (re)transmission opportunity. The wireless device may switch to channel 2 and may perform an LBT procedure 3502d. The wireless device may determine that the PRACH 3504d is not idle, and/or may determine to drop/cancel/delay/skip/abort a preamble transmission on the PRACH 3504d.

A wireless device may manage (be configured with, control, determine, and/or update) one or counters for one or more channels. At least one of the one or more channels may comprise at least one BWP and/or at least one subband. A wireless device may perform an LBT procedure before the wireless device sends/transmits data/a signal (e.g., a preamble) via one of the one or more channels.

A counter (e.g., PREAMBLE_TRANSMISSION_COUNTER, PREAMBLE_RETRANSMISSION_COUNTER, and/or PREAMBLE_ATTEMPT_COUNTER) may be updated (or set) per at least one channel (e.g., at least one BWP and/or at least one subband). The wireless device may update a transmission counter (e.g., PREAMBLE_TRANSMISSION_COUNTER) per channel (e.g., PREAMBLE_TRANSMISSION_COUNTER # K, where K may indicate an identifier of the channel corresponding to index K). The wireless device may update a retransmission counter (e.g., PREAMBLE_RETRANSMISSION_COUNTER) per channel (e.g., PREAMBLE_RETRANSMISSION_COUNTER # K, where K may indicate an identifier of the channel corresponding to index K). The wireless device may update an attempt counter (e.g., PREAMBLE_ATTEMPT_COUNTER) per channel (e.g., PREAMBLE_ATTEMPT_COUNTER # K, where K may indicate an identifier of the channel corresponding to index K).

The wireless device may manage per-channel counter(s), aggregated counter(s) and/or per-cell counter(s). A counter (e.g., PREAMBLE_TRANSMISSION_COUNTER, PREAMBLE_RETRANSMISSION_COUNTER, and/or PRE- AMBLE_ATTEMPT_COUNTER) may aggregate the counter values of per-channel counter(s). The counter (e.g., PREAMBLE_TRANSMISSION_COUNTER, PREAMBLE_RETRANSMISSION_COUNTER, and/or PREAMBLE_ATTEMPT_COUNTER) may be a per-cell counter. A per-channel counter may be at least one of PREAMBLE_TRANSMISSION_COUNTER updated per channel (e.g., PREAMBLE_TRANSMISSION_COUNTER # K), PREAMBLE_RETRANSMISSION_COUNTER updated per channel (e.g., PREAMBLE_RETRANSMISSION_COUNTER # K), and/or PREAMBLE_ATTEMPT_COUNTER updated per channel (e.g., PREAMBLE_ATTEMPT_COUNTER # K), where K may indicate an identifier of the channel corresponding to index K.

One or more counters configured for an RA procedure (e.g., PREAMBLE_TRANSMISSION_COUNTER, PREAMBLE_RETRANSMISSION_COUNTER and/or PREAMBLE_ATTEMPT_COUNTER) may be implemented in one or more ways. The one or more counters may start a counter operation from a predefined value (e.g., zero) and/or a wireless device may set the one or more counters to a predefined value (e.g., as an initialization). A counter direction of at least one of the one or more counters may be incremental. A counter direction of at least one of the one or more counters may be decremental. An incremental (or decremental) step (or unit) of at least one of the one or more counters may be predefined (e.g., by one or any other value).

A base station may send/transmit, to a wireless device, a message indicating a request (e.g., UEInfomationRequest) for a RACH information report associated with an RA procedure in a cell. The RACH information report may comprise one or more fields indicating at least one of the following: the quantity/number of preamble transmissions per cell, the number of preamble transmissions per channel (e.g., BWP, beam, SSB, SUL, NUL, or subband), the quantity/number of preamble transmission attempts per cell, the quantity/number of preamble transmission attempts per channel (e.g., BWP, beam, SSB, SUL, NUL, or subband), the quantity/number of preamble retransmissions per cell, the quantity/number of preamble retransmissions per channel (e.g., BWP, beam, SSB, SUL, NUL, or subband). The one or more fields may comprise at least one of the following: PREAMBLE_TRANSMISSION_COUNTER aggregated per cell, PREAMBLE_RETRANSMISSION_COUNTER aggregated per cell, PREAMBLE_ATTEMPT_COUNTER aggregated per cell, at least one PREAMBLE_TRANSMISSION_COUNTER updated per channel (e.g., PREAMBLE_TRANSMISSION_COUNTER # K), at least one PREAMBLE_RETRANSMISSION_COUNTER updated per channel (e.g., PREAMBLE_RETRANSMISSION_COUNTER # K), and/or at least one PREAMBLE_ATTEMPT_COUNTER updated per channel (e.g., PREAMBLE_ATTEMPT_COUNTER # K, where K may indicate an identifier of the channel corresponding to index K.

A first counter (e.g., PREAMBLE_ATTEMPT_COUNTER) (e.g., for a plurality of channels) may be incremented by six, for example, based on the six LBT procedures 3502a, 3502b, 3502c, 3502d, 3502e, and 3502f. A second counter (e.g., PREAMBLE_TRANSMISSION_COUNTER) (e.g., for the plurality of channels) may be incremented by one, for example, based on the preamble transmission via the PRACH 3504c. A third counter (e.g., PREAMBLE_RETRANSMISSION_COUNTER) (e.g., for the plurality of channels) may be incremented by k, for example, based on the determination to allow the n+1-th (re)transmission opportunities for channel 1, channel 2, . . . , and channel k. The first counter, the second counter, and/or the third counter may be incremented by any value.

PREAMBLE_ATTEMPT_COUNTER #1 may be incremented by two, for example, based on the two LBT procedures 3502a and 3502f on channel 1. PREAMBLE_ATTEMPT_COUNTER #2 may be incremented by two, for example, based on the two LBT procedures 3502c and 3502d on channel 2. PREAMBLE_ATTEMPT_COUNTER # k may be incremented by two, for example, based on the two LBT procedures 3502b and 3502e on channel k. PREAMBLE_ATTEMPT_COUNTER (e.g., for the plurality of channels) may be incremented by six, for example, based on an aggregation of the counter values of PREAMBLE_ATTEMPT_COUNTER #1, PREAMBLE_ATTEMPT_COUNTER #2, . . . , PREAMBLE_ATTEMPT_COUNTER # k (assuming k=3, or there are no LBT procedures on channels 3, 4, . . . , and k−1). PREAMBLE_TRANSMISSION_COUNTER #2 may be incremented by one, for example, based on the preamble transmission via the PRACH 3504c on channel 2. PREAMBLE_TRANSMISSION_COUNTER (e.g., for the plurality of channels) may be incremented by one, for example, based on an aggregation of the counter values of PREAMBLE_TRANSMISSION_COUNTER #1, PREAMBLE_TRANSMISSION_COUNTER #2, PREAMBLE_TRANSMISSION_COUNTER # k (assuming there are no other preamble transmissions on channels 1, 2, . . . , and k other than the preamble transmission via the PRACH 3504c). PREAMBLE_RETRANSMISSION_COUNTER (e.g., for the plurality of channels) between the n-th (re)transmission opportunity and the n+1-the (re)transmission opportunity may be incremented by k, for example, based on an aggregation of the counter values of PREAMBLE_RETRANSMISSION_COUNTER #1, PREAMBLE_RETRANSMISSION_COUNTER #2, PREAMBLE_RETRANSMISSION_COUNTER # k.

A base station may indicate, in a request for a RACH information report, an aggregation level of one or more counters for an RA procedure in a cell. The request may comprise one or more first fields indicating whether the wireless device report a cell-level counter and/or a channel-level counter. Values (e.g., predefined or configures values) of the one or more first fields may indicate whether the wireless device report a cell-level counter and/or a channel-level counter. A presence or absence of the one or more first fields may indicate whether the wireless device report a cell-level counter and/or a channel-level counter.

A base station may indicate, in a request for a RACH information report, at least one particular type of a counter to be reported for an RA procedure in a cell. The request may comprise one or more second fields indicating the at least one particular type. The at least one particular type may comprise at least one of the following: PREAMBLE_TRANSMISSION_COUNTER, PREAMBLE_RETRANSMISSION_COUNTER, PREAMBLE_ATTEMPT_COUNTER, PREAMBLE_TRANSMISSION_COUNTER # K, PREAMBLE_RETRANSMISSION_COUNTER # K, and/or PREAMBLE_ATTEMPT_COUNTER # K, where K may indicate an identifier of the channel corresponding to index K.

A base station may indicate, in a request for a RACH information report, at least one counter associated with a particular channel (e.g., a BWP and/or a subband) to be reported for an RA procedure in a cell. The request may comprise one or more third fields indicating the at least one particular channel. The counter associated with the at least one particular channel may comprise at least one of the following: PREAMBLE_TRANSMISSION_COUNTER # K, PREAMBLE_RETRANSMISSION_COUNTER # K, and/or PREAMBLE_ATTEMPT_COUNTER # K, where K may indicate an identifier of the channel corresponding to index K.

Depending on an implementation, there may be one or more fourth fields in the request. The one or more fourth fields may indicate a combination of RACH information (e.g., a type of counter, an aggregation level of a counter, and/or a counter associated with a channel). A wireless device may send (e.g., transmit), to a base station, a message (e.g., UEInformationResponse) comprising a response to a request for a RACH information report. The response may comprise at least one of the following: at least one per-cell counter that may be at least one of PREAMBLE_TRANSMISSION_COUNTER, PREAMBLE_RETRANSMISSION_COUNTER, and/or PREAMBLE_ATTEMPT_COUNTER aggregate per-cell, and/or at least one a per-channel counter that may be at least one of PREAMBLE_TRANSMISSION_COUNTER updated per channel (e.g., PREAMBLE_TRANSMISSION_COUNTER # K), PREAMBLE_RETRANSMISSION_COUNTER updated per channel (e.g., PREAMBLE_RETRANSMISSION_COUNTER # K), and/or PREAMBLE_ATTEMPT_COUNTER updated per channel (e.g., PREAMBLE_ATTEMPT_COUNTER # K), where K may indicate an identifier of the channel corresponding to index K.

Figure 36:
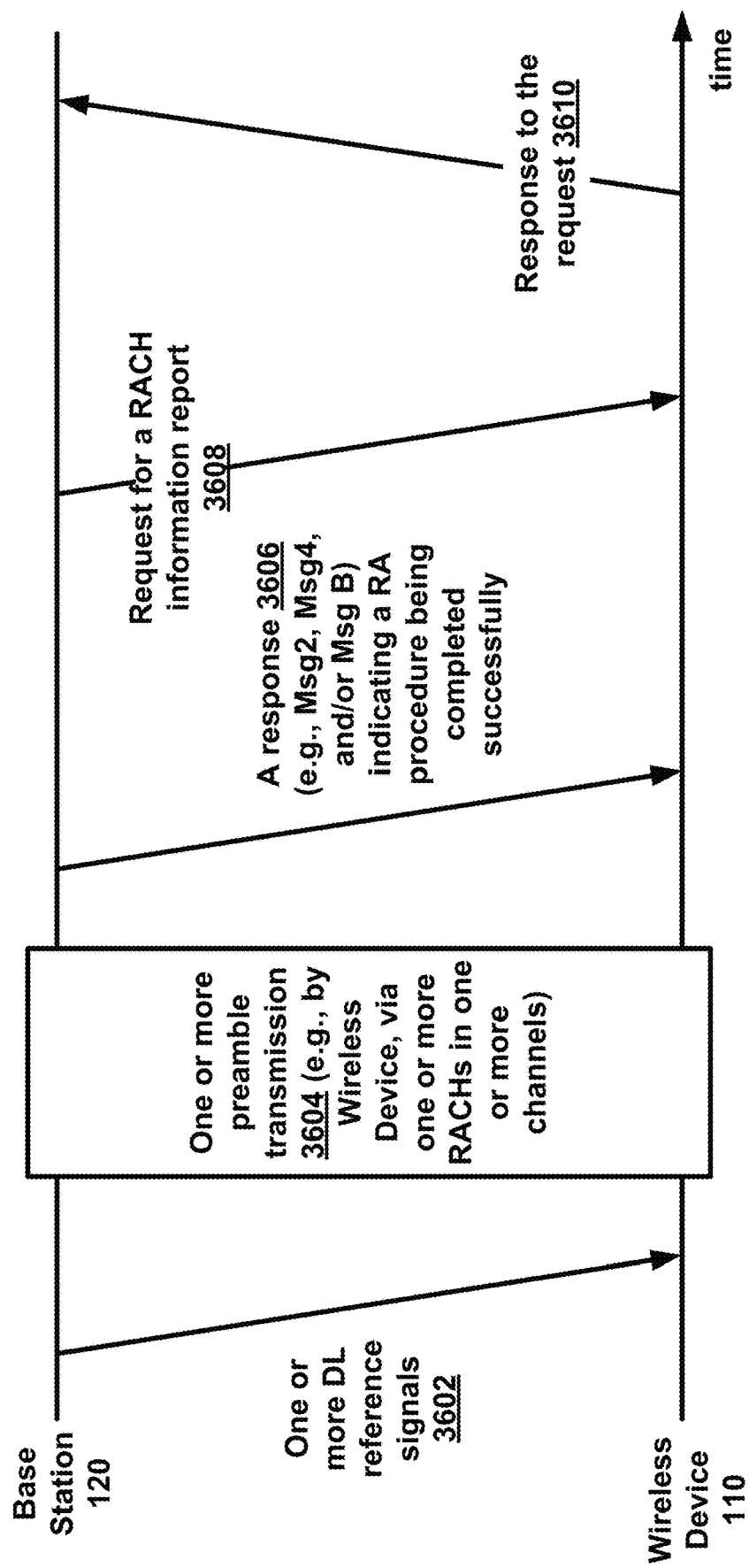
FIG. 36 shows an example of a random access channel (RACH) information report.

FIG. 36 shows an example of triggering a RACH information report. A wireless device 110 may receive one or more DL reference signals (e.g., SSBs or CSI-RSs) 3602 from a base station 120. The wireless device 110 may initiate an RA procedure. The wireless device 110 may attempt to send/transmit one or more preambles 3604 via one or more PRACHs in one or more channels (e.g., BWPs, beams, SSBs, SULs, NULs, and/or subbands). The wireless device 110 may receive a response 3606, based on which the wireless device 110 may determine that the RA procedure is completed successfully. The wireless device 110 may receive a message comprising a request for a RACH information report 3608. The request 3608 may indicate one or more aggregation levels of one or more counters, one or more types of the one or more counters, and/or one or more channels (e.g., BWPs, beam, SSBs, SULs, NULs, and/or subbands) associated with the one or more counters. The wireless device 110 may transmit a message comprising a response 3610 that comprises/indicates the RACH information report.

Figure 37:
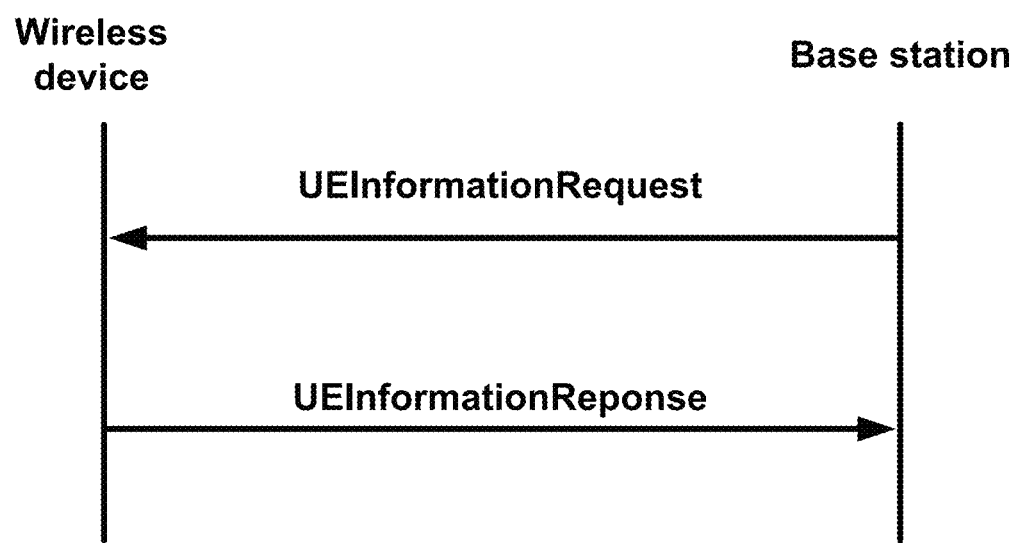
FIG. 37 shows an example of a RACH information report.

FIG. 37 show an example of communicating RACH information. A base station may send/transmit, to a wireless device, a message comprising a request (e.g., UEInformationRequest). The request (e.g., UEInformationRequest) may be a command used by the base station to retrieve information from the wireless device (e.g., signaling radio bearer: SRB1). An example format of request (e.g., UEInformation Request) may be as below:

| | |
|---|---|
| UEInformationRequest ::= | SEQUENCE { |
| rach-ReportReq | BOOLEAN, |
| rlf-ReportReq | BOOLEAN, |
| nonCriticalExtension | UEInformationRequest}. |

An indication (e.g., rach-ReportReq) may be used to indicate whether the wireless device reports RACH information. A request (e.g., UEInformationRequest) may comprise one or more aggregation levels of one or more counters, one or more types of the one or more counters, and/or one or more channels (e.g., BWPs, beams, SSBs, SULs, NULs, and/or subbands) associated with the one or more counters.

Based on or in response to receiving the request (e.g., UEInformationRequest) message, the wireless device may perform one or more of the following: if rach-ReportReq is set to true, setting the contents of the rach-Report in the UEInformationResponse message as follows: (1) setting the numberOfPreamblesSent to indicate the number of preambles sent by a MAC layer for the last successfully completed random access procedure; and/or (2) a) if contention resolution was not successful for at least one of the transmitted preambles for the last successfully completed random access procedure: setting the contentionDetected to true; or b) else: setting the contentionDetected to false. The wireless device may send/transmit, to the base station, a response (e.g., UEInformationResponse) message comprising a quantity of preambles sent (e.g., numberOfPreamblesSent) and/or an indication of contention detection (e.g., contentionDetected). The parameter for a quantity of preambles sent (e.g., numberOfPreamblesSent) may comprise at least one of: the quantity/number of preamble transmissions per channel (e.g., BWP, SSB, SUL, NUL, beam, and/or subband), the quantity/number of preamble transmissions in the cell, the quantity/number of preamble transmission attempts per channel (e.g., BWP, SSB, SUL, NUL, beam, and/or subband), the quantity/number of preamble transmission attempts in the cell, the quantity/number of preamble retransmissions per channel (e.g., BWP, SSB, SUL, NUL, beam, and/or subband), and/or the quantity/number of preamble retransmissions in the cell.

A base station may determine one or more BI values of one or more channels (e.g., BWPs, SSBs, SULs, NULs, beams, or subbands), for example, based on the response (e.g., UEInformationResponse). One or more per-channel (e.g., per-BWP, per-beam, per-SSB, per-uplink, and/or per-subband) counters may indicate a level of congestion in the respective channel(s) (e.g., BWP(s), SSB(s), SUL(s), NUL(s), beam(s), and/or subband(s)). A base station may determine a first BI value associated with a first channel (e.g., a first BWP, a first SSB, a first SUL, a first NUL, a first beam, and/or a first subband), for example, based on a first counter associated with the first channel (e.g., the first BWP, the first SSB, the first SUL, the first NUL, the first beam, and/or the first subband). The first counter may be any of per-channel counter (e.g., PREAMBLE_TRANSMISSION_COUNTER # K, PREAMBLE_RETRANSMISSION_COUNTER # K, PREAMBLE_ATTEMPT_COUNTER # K, where K may indicate (or may be associated with) the first channel corresponding to index K).

Figure 38:
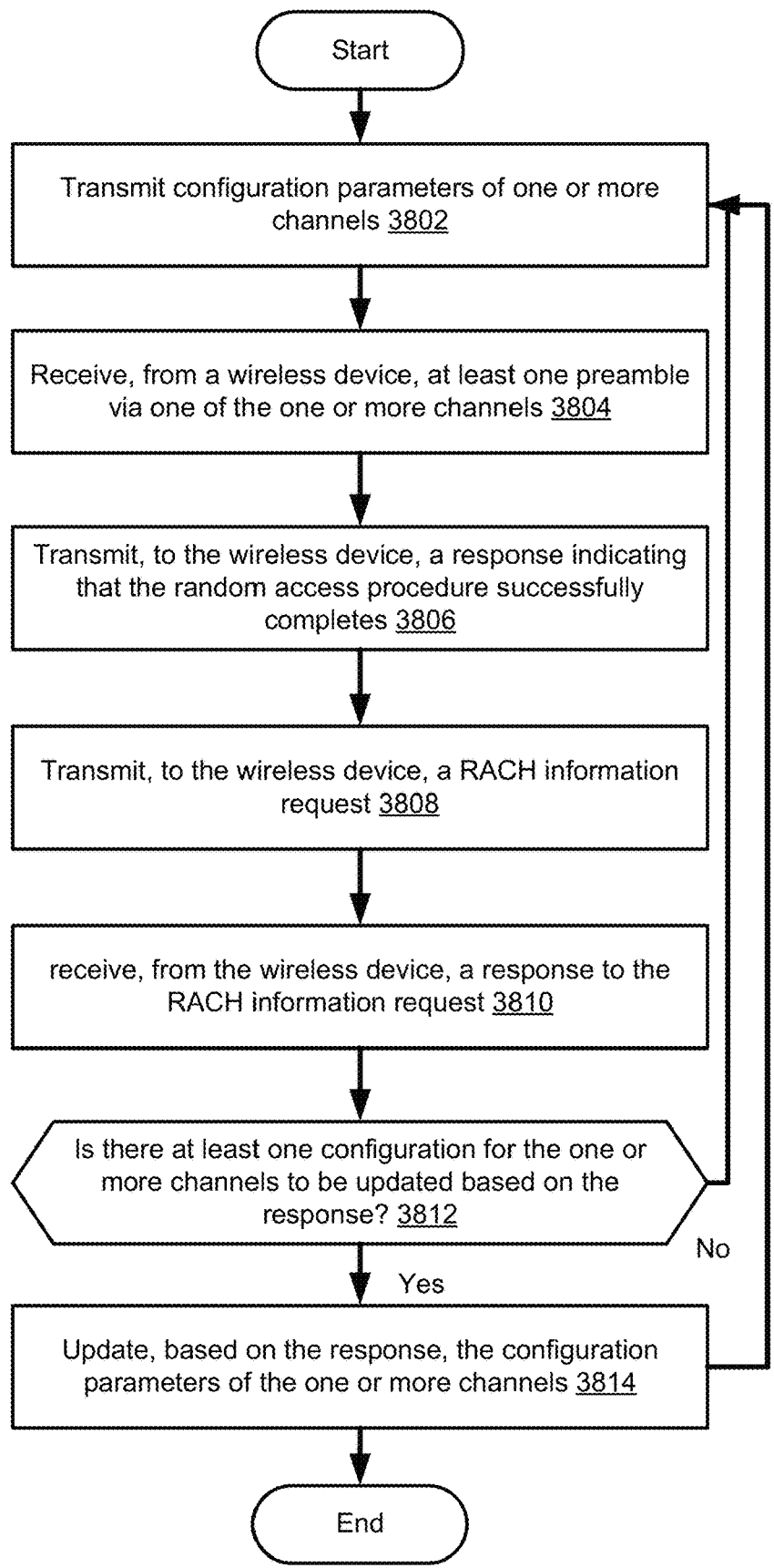
FIG. 38 shows an example method of a random access operation.

FIG. 38 shows an example method of a random access operation. At step 3802, a base station may send (e.g., transmit) one or more configuration parameters of one or more channels (e.g., BWPs, SSBs, SULs, NULs, beams, and/or subbands). The one or more configuration parameters may indicate one or more time/frequency resources of one or more channels for a random access preamble transmission, one or more random access configuration parameters associated with the one or more channels, etc. At step 3804, the base station may receive, from a wireless device, at least one preamble via one of the one or more channels. At step 3806, the base station may send/transmit, to the wireless device and based on the at least one preamble, a response indicating that the random access procedure is successful. At step 3808, the base station may send/transmit, to the wireless device, a RACH information request. The response indicating that the random access procedure is successful may comprise the RACH information request. At step 3810, the base station may receive, from the wireless device, a response to the RACH information request. The response to the RACH information request may comprise one or more timers associated with random access. The one or more timers may comprise one or more per-cell timers, one or more per-channel timers, one or more per-BWP timers, one or more per-beam timers, one or more per-SSB timers, per-uplink timers, and/or one or more per-subband timers. At step 3812, the base station may determine whether at least one of the one or more channels need to be updated based on the response to the RACH information request. The base station may return to step 3802, for example, if the base station determines that configuration(s) for the one or more channels do not need to be updated. At step 3814, the base station may update, based on the response to the RACH information request, the one or more configuration parameters of the one or more channels, for example, if the base station determines that at least one configuration for the one or more channels needs to be updated.

Figure 39:
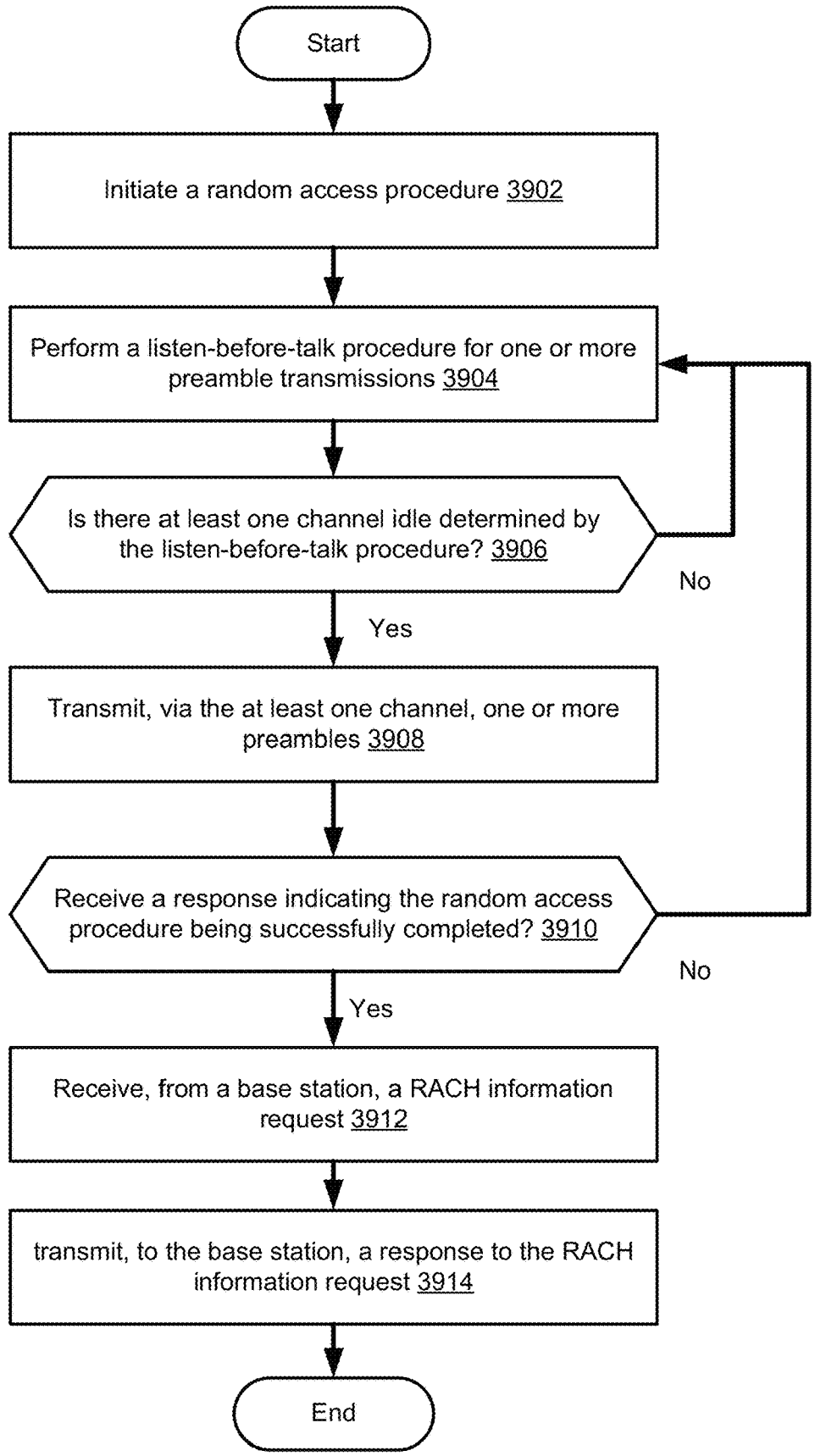
FIG. 39 shows an example method of a random access operation.

FIG. 39 shows an example method of a random access operation. At step 3902, a wireless device may determine to initiate a random access procedure. The wireless device may determine one or more channels to perform the random access procedure. At step 3904, the wireless device may perform an LBT procedure for one or more preamble transmissions via at least one of the one or more channels. The LBT procedure may be omitted for one or more preamble transmissions via one or more first channels (e.g., licensed bands). The LBT procedure may be performed for one or more preamble transmissions via one or more second channels (e.g., unlicensed bands). At step 3906, the wireless device may determine whether at least one channel (e.g., at least one of the one or more second channels) is idle, for example, based on the LBT procedure. The wireless device may return to step 3904, for example, if it is determined that there is no idle channel for a preamble transmission. At step 3908, the wireless device may send/transmit, via the at least one channel that is determined to be idle, one or more preambles, for example, if it is determined that there is at least one idle channel for a preamble transmission. At step 3910, the wireless device may determine whether a response indicating that the random access procedure is successfully completed is received. The wireless device may return to step 3904, for example, if the wireless device determines that the response indicating that the random access procedure is successfully completed has not been received. At step 3912, the wireless device may receive, from a base station, a RACH information request, for example, after the random access procedure being successfully completed. At step 3914, the wireless device may send/transmit, to the base station, a response to the RACH information request.

A wireless device may receive, from a base station, a first message comprising a request to report random access information of a cell. The wireless device may send/transmit, to the base station, a second message comprising a response indicating the random access information. The cell may comprise one or more UL BWPs. The one or more UL BWPs may comprise at least one PRACH. A UL BWP may comprise a plurality of subbands. The response may comprise at least one of the following: the number of preamble transmissions performed via the cell; the number of preamble transmission attempts (or LBT) performed on the cell. The response may comprise at least one of the following: a second counter value indicating the number/quantity of times that the wireless device determines a retransmission of at least one preamble, for example, after or in response to an RAR reception being unsuccessful and/or a contention resolution being unsuccessful; and/or a second counter value indicating the number/quantity of times that the wireless device determines an RAR reception being unsuccessful and/or a contention resolution being unsuccessful. The cell may comprise one or more UL BWPs. The response may comprise at least one of the following: the number/quantity of preamble transmissions performed via at least one of the one or more BWPs; and/or the number/quantity of preamble transmission attempts (e.g., LBT) associated with at least one of the one or more BWPs. The response may comprise at least one of the following: a second counter value indicating the number of times that the wireless device determines a retransmission of at least one preamble, for example, after or in response to an RAR reception being unsuccessful and/or a contention resolution being unsuccessful; and/or a second counter value indicating the number of times that the wireless device determines an RAR reception being unsuccessful and/or a contention resolution being unsuccessful. The request may comprise an indicator to report random access information per BWP. A presence of a first field may be the indicator. The wireless device may transmit, to the base station, one or more preambles for the random access procedure. The wireless device may determine that the random access procedure is successfully completed. The wireless device may count at least one of the following: the number/quantity of preamble transmissions performed via the cell; the number/quantity of preamble transmission attempts (e.g., LBT) associated with the cell; the number/quantity of preamble transmissions performed on at least one of the one or more BWPs; the number/quantity of preamble transmission attempts (e.g., LBT) associated with at least one of the one or more BWPs; the number of preamble transmission attempts (e.g., LBT) associated with at least one of the one or more BWPs; a second counter value indicating the number of times that the wireless device determines a retransmission of at least one preamble, for example, after or in response to an RAR reception being unsuccessful and/or a contention resolution being unsuccessful; and/or a second counter value indicating the number of times that the wireless device determines an RAR reception being unsuccessful and/or a contention resolution being unsuccessful.

A wireless device may transmit, to a base station, one or more preambles for a random access procedure. The wireless device may determine that the random access procedure is successfully completed. The wireless device may receive a first message comprising a random access report request for a plurality of subbands in a cell. The wireless device may transmit, to the base station, a second message comprising a random access report indicating a first number/quantity of the one or more preambles transmitted via the at least one of the plurality of subbands, for example, after or in response to receiving the first message. The wireless device may receive a random access response comprising an uplink grant. The random access response may identify one of the one or more preambles. The wireless device may transmit, via one or more resources indicated by the uplink grant, a transport block. The wireless device may determine that the random access procedure is unsuccessfully completed, for example, based on not receiving a contention resolution message. The wireless device may increment a random access contention count. The random access report may indicate a second number/quantity of random access contentions detected on the at least one of a plurality of subbands. The second number/quantity of random access contentions determined based on the random access contention count. The random access report may indicate a third number/quantity of channel access procedures performed via the at least one of a plurality of subbands.

A wireless device may receive, from a base station, a first message comprising a random access report request for a plurality of subbands in a cell. The wireless device may transmit, to the base station, a second message, for example, after or in response to receiving the first message. The second message may comprise a response comprising at least one of the following: the number/quantity of one or more preambles transmitted by the wireless device for the cell; the number/quantity of random access contentions detected by the wireless device for the cell; the number/quantity of one or more channel access procedures performed by the wireless device for the cell; the number/quantity of one or more preamble transmissions via at least one of a plurality of subbands. The number/quantity of the one or more preambles may be counted during the last successfully completed random access procedure. The number/quantity of the one or more preambles may be determined based on a preamble transmission counter. The wireless device may increment (e.g., by one a counter counting the number/quantity of random access contentions, for example, if contention resolution was not successful for the last successfully completed random access procedure.

A base station may transmit, to one or more first wireless device, one or more first messages comprising at least one request to report random access information of a cell (e.g., of one or more BWPs in a cell). The base station may receive, from at least one of the first wireless device, a second message comprising a response comprising the random access information, for example, after or in response to the at least one request. The base station may transmit, to one or more second wireless device, at least one RAR comprising a plurality of backoff indicators. Each of the plurality of backoff indicators may indicate a backoff time of one of one or more BWPs in the cell. The base station may determine the plurality of backoff indicators at least based on the random access information. The random access information may indicate at least one of the following: the number/quantity of preamble transmissions performed via the cell; the number/quantity of preamble transmission attempts (e.g., LBT) associated with the cell; the number/quantity of preamble transmissions performed via at least one of the one or more BWPs; the number/quantity of preamble transmission attempts (e.g., LBT) associated with at least one of the one or more BWPs; the number/quantity of preamble transmission attempts (e.g., LBT) associated with at least one of the one or more BWPs; a second counter value indicating the number/quantity of times that the wireless device determines a retransmission of at least one preamble, for example, after or in response to an RAR reception being unsuccessful and/or a contention resolution being unsuccessful; and/or a second counter value indicating the number/quantity of times that the wireless device determines an RAR reception being unsuccessful and/or a contention resolution being unsuccessful.

A base station may transmit, to one or more first wireless device, one or more first messages comprising at least one request to report random access information of an uplink carrier. The uplink carrier may comprise a plurality of BWPs comprising a first BWP and a second BWP. The base station may receive, from at least one of the one or more first wireless device, a second message comprising a response comprising the random access information, for example, after or in response to the at least one request. The random access information may comprise: first random access information of the first BWP; and/or second random access information of the second BWP. The base station may transmit, to one or more second wireless device: at least one first RAR via the first BWP; and/or at least one second RAR via the second BWP. The at least one first RAR may comprise a first backoff indicator determined based on the first random access information. The at least one second RAR may comprise a second backoff indicator determined based on the second random access information.

A base station may receive, from a wireless device, at least one preamble associated with random access (e.g., based on one or more preamble transmission attempts in a cell). The cell may be an unlicensed cell. The cell may comprise an unlicensed band and/or an unlicensed sub-band. The cell may comprise a plurality of sub-bands (e.g., a plurality of sub-bands of a BWP). The base station may send/transmit, to the wireless device, a report request associated with the random access. The base station may receive, from the wireless device and based on the report request, a response to the report request. The response may comprise at least one of: a first indication (e.g., a first indicator) associated with a quantity/number of preamble transmissions via a first sub-band of a plurality of sub-bands of the cell; and/or a second indication associated with a quantity/number of preamble transmission attempts associated with the first sub-band. The second indication may indicate at least one of: the quantity of the preamble transmission attempts associated with the first sub-band; and/or a quantity of preamble transmission failures associated with the first sub-band. A preamble transmission failure may comprise at least one of: dropping, canceling, delaying, skipping, or aborting a preamble transmission. The wireless device may determine, based on an identifier associated with the first sub-band, the response comprising the first indication and the second indication. The wireless device may determine, based on the identifier, a transmission of the response comprising the first indication and the second indication. The report request may comprise the identifier. The response may comprise a third indication associated with a quantity/number of preamble transmissions via a second sub-band of the plurality of sub-bands of the cell. The response may comprise a fourth indication associated with a quantity/number of preamble transmission attempts associated with the second sub-band. The report request may comprise a second identifier associated with the second sub-band. The wireless device may determine, based on the second identifier, the response comprising the third indication and the fourth indication. The wireless device may determine, based on the second identifier, a transmission of the response comprising the third indication and the fourth indication. The report request may comprise the second identifier. The first sub-band and/or the second sub-band may be in an unlicensed band. The response may indicate a first total quantity/number of preamble transmissions via the plurality of sub-bands of the cell. The response may indicate a second total quantity/number of preamble transmission attempts associated with the plurality of sub-bands in the cell. The report request may comprise an indication for requesting the first total quantity/number and/or the second total quantity/number. The wireless device may determine, based on the indication for requesting the first total quantity/number and/or the second total quantity/number, a transmission of the response indicating the first total quantity/number and/or the second total quantity/number. The first total quantity/number may be an aggregated quantity/number of one or more preamble transmissions via the cell (e.g., via the plurality of sub-bands of the cell). The first total quantity/ number may be determined based on one or more preamble transmission counter values (e.g., a preamble transmission counter value of the cell). The wireless device may increment the one or more preamble transmission counter values, for example, based on one or more preamble transmissions during a random access procedure. The second total quantity/number may be an aggregated quantity/number of one or more preamble transmission attempts associated with the cell (e.g., the plurality of channels of the cell). The second total quantity/number may be determined, for example, based on one or more preamble transmission attempt counter values (e.g., a preamble transmission attempt counter value of the cell). The wireless device may determine, based on an occupancy status associated with a random access occasion of the first sub-band. The wireless device may increment, after determining the occupancy status, a preamble transmission attempt counter value associated with the first sub-band. The wireless device may determine the occupancy status, for example, based on an LBT procedure. The quantity/number of preamble transmissions via the first sub-band may be determined, for example, based on a first preamble transmission counter value associated with the first sub-band. The first preamble transmission counter value may be incremented, for example, after or in response to transmitting a preamble via the first sub-band. The quantity/number of preamble transmission attempts associated with the first sub-band may be determined, for example, based on a first preamble transmission attempt counter value associated with the first sub-band. The first preamble transmission attempt counter value may be incremented, for example, after or in response to an LBT procedure associated with the first sub-band (e.g., an LBT procedure performed, for a preamble transmission, indicating a status of the first sub-band). The wireless device may determine, based on a first occupancy status associated with a first random access occasion of the first sub-band, a first preamble transmission failure associated with the first random access occasion. The wireless device may determine, based on a second occupancy status associated with a second random access occasion of a second sub-band of the plurality of sub-bands, a second preamble transmission failure associated with the second random access occasion. The wireless device may increment, based on determining the first occupancy status and the second occupancy status, at least one preamble transmission attempt counter value (e.g., the preamble transmission attempt counter value of the cell, the first preamble transmission attempt counter value associated with the first sub-band, a second preamble transmission attempt counter value associated with the second sub-band, etc.). The preamble transmission attempt counter value of the cell may be an aggregated preamble transmission attempt counter value associated with the plurality of sub-bands. The base station may send/transmit, to the wireless device, a control message indicating at least one changed configuration parameter associated with at least one of the plurality of sub-bands. The control message may be sent/transmitted, for example, after transmitting the response. The wireless device may change, based on the at least one changed configuration parameter, at least one preamble transmission timing associated with the at least one of the plurality of sub-bands. The at least one changed configuration parameter may comprise at least one random access configuration parameters. The at least one changed configuration parameter may comprise one or more PRACH occasions, one or more backoff indicators (BIs), random access types (e.g., a contention-based random access or a contention-free random access), etc.

A base station may send/transmit, to a wireless device, a report request associated with random access (e.g., associated with a cell). The wireless device may determine, based on the report request, an identifier associated with a first channel of a plurality of channels of a cell. The base station may receive, from the wireless device and based on the report request and the identifier, a response. The response may comprise at least one of: a first indication associated with a quantity of preamble transmissions via the first channel; and a second indication associated with a quantity of preamble transmission attempts associated with the first channel. The first channel may comprise a first sub-band of a plurality of sub-bands of the cell. The base station may receive, from the wireless device, at least one preamble associated with the random access. The wireless device may determine, based on the identifier, the response comprising the first indication and the second indication. The base station may receive, after completing the random access, the report request. The response may indicate at least one of: a first total quantity of preamble transmissions via the plurality of channels of the cell; and/or a second total quantity of preamble transmission attempts associated with the plurality of channels of the cell. The wireless device may determine, based on a first occupancy status associated with a first random access occasion of the first channel, a first preamble transmission failure associated with the first random access occasion. The wireless device may determine, based on a second occupancy status associated with a second random access occasion of a second channel of the plurality of channels, a second preamble transmission failure associated with the second random access occasion. The wireless device may increment, based on determining the first occupancy status and the second occupancy status, at least one preamble transmission attempt counter value.

A base station may receive, from a wireless device, at least one preamble for random access (e.g., associated with a cell). The base station may send/transmit, to the wireless device, a report request associated with the random access. The base station may receive, based on the report request, a response. The response may comprise at least one of: a first indication associated with a quantity of preamble transmissions via a first sub-band of a plurality of sub-bands of the cell; and/or a second indication associated with a quantity of preamble transmissions via a second sub-band of the plurality of sub-bands of the cell. The response may comprise a third indication associated with a quantity of preamble transmission attempts associated with the first sub-band. The response may comprise a fourth indication associated with a quantity of preamble transmission attempts associated with the second sub-band. The response may indicate a first total quantity of preamble transmissions via the plurality of sub-bands of the cell. The response may indicate a second total quantity of preamble transmission attempts associated with the plurality of channels of the cell. The wireless device may determine, based on at least one identifier associated with the first sub-band and/or with the second sub-band, the response comprising the first indication and/or the second indication. The report request may comprise the at least one identifier. The wireless device determine, based on a first occupancy status associated with a first random access occasion of the first sub-band, a first preamble transmission failure associated with the first random access occasion. The wireless device may determine, based on a second occupancy status associated with a second random access occasion of the second sub-band, a second preamble transmission failure associated with the second random access occasion. The wireless device may increment, based on determining the first occupancy status and the second occupancy status, at least one preamble transmission attempt counter value.

Figure 40:
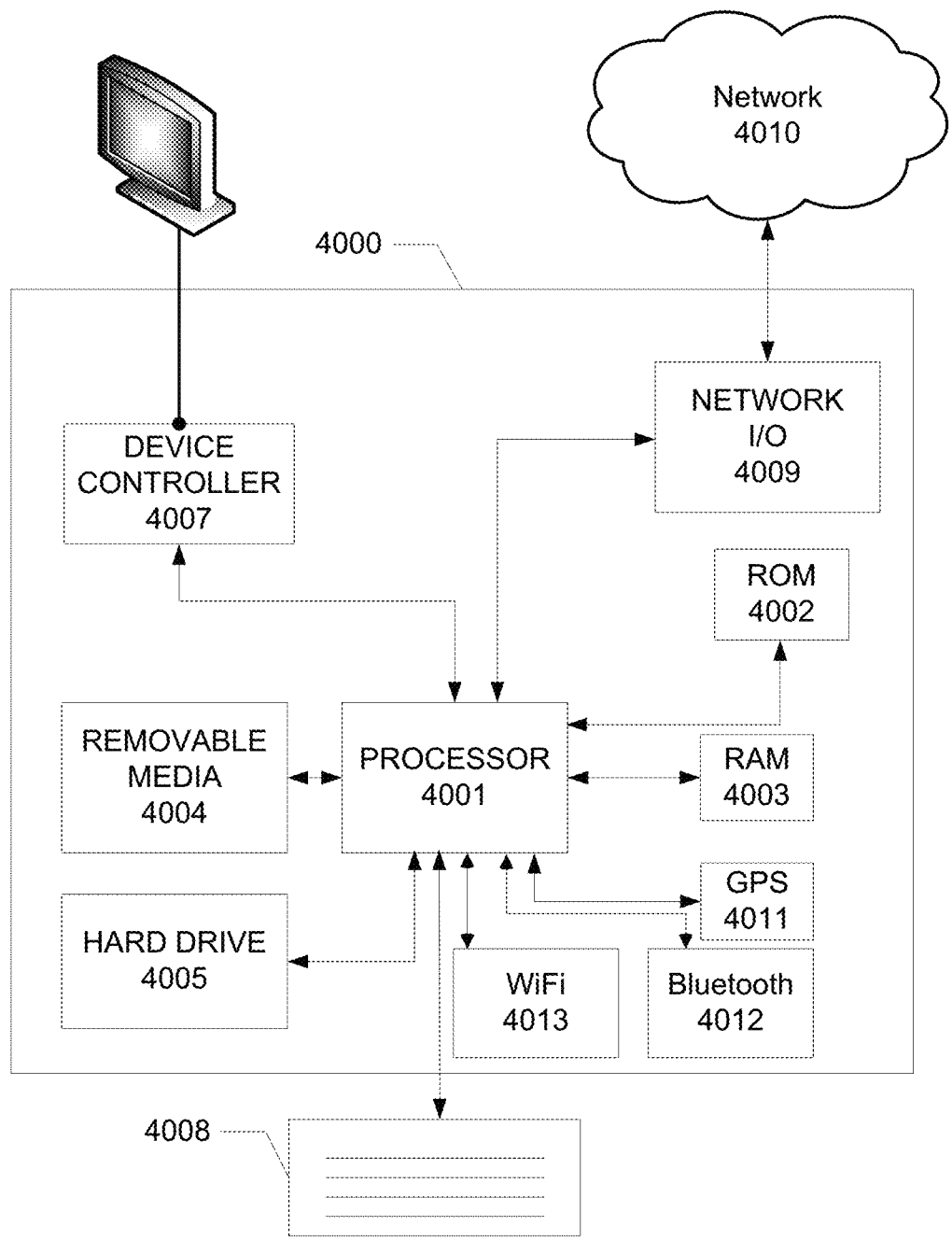
FIG. 40 shows example elements of a computing device that may be used to implement any of the various devices described herein.

FIG. 40 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 4000 may include one or more processors 4001, which may execute instructions stored in the random-access memory (RAM) 4103, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a WiFi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The example in FIG. 40 may be a hardware configuration, although the components shown may be implemented as software as well. Modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 40. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete and/or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   transmitting, by a wireless device to a base station, at least one preamble associated with random access;
   receiving a report request associated with the random access; and
   transmitting, based on the report request, a response comprising:
      a first indication associated with a quantity of preamble transmissions via a first sub-band of a plurality of sub-bands of an uplink carrier of a cell; and
      a second indication associated with a quantity of preamble transmission attempts associated with the first sub-band.

2. The method of claim 1, wherein the second indication indicates at least one of:
   the quantity of the preamble transmission attempts associated with the first sub-band; or
   a quantity of preamble transmission failures associated with the first sub-band,
   wherein a preamble transmission failure comprises at least one of: dropping, canceling, delaying, skipping, or aborting a preamble transmission.

3. The method of claim 1, further comprising determining, based on an identifier associated with the first sub-band, the response comprising the first indication and the second indication,
   wherein the report request comprises the identifier.

4. The method of claim 1, wherein the response further comprises:
   a third indication associated with a quantity of preamble transmissions via a second sub-band of the plurality of sub-bands of the uplink carrier of the cell; and
   a fourth indication associated with a quantity of preamble transmission attempts associated with the second sub-band.

5. The method of claim 1, wherein the response further indicates:
   a first total quantity of preamble transmissions via the plurality of sub-bands of the uplink carrier of the cell; and
   a second total quantity of preamble transmission attempts associated with the plurality of sub-bands of the uplink carrier of the cell.

6. The method of claim 5, wherein the second total quantity of preamble transmission attempts is determined based on at least one preamble transmission attempt counter value.

7. The method of claim 1, further comprising:
   determining an occupancy status associated with a random access occasion of the first sub-band; and
   incrementing, after determining the occupancy status, a preamble transmission attempt counter value associated with the first sub-band.

8. The method of claim 1, further comprising:
   determining, based on a first occupancy status associated with a first random access occasion of the first sub-band, a first preamble transmission failure associated with the first random access occasion;
   determining, based on a second occupancy status associated with a second random access occasion of a second sub-band of the plurality of sub-bands of the uplink carrier of the cell, a second preamble transmission failure associated with the second random access occasion; and
   incrementing, based on determining the first occupancy status and the second occupancy status, at least one preamble transmission attempt counter value.

9. The method of claim 8, wherein the at least one preamble transmission attempt counter value comprises at least one of:
   a first preamble transmission attempt counter value associated with the first sub-band;
   a second preamble transmission attempt counter value associated with the second sub-band; or
   an aggregated preamble transmission attempt counter value associated with the plurality of sub-bands of the uplink carrier of the cell.

10. The method of claim 1, wherein the uplink carrier comprises a plurality of bandwidth parts (BWPs), and wherein a bandwidth part (BWP) of the plurality of BWPs comprises at least one sub-band of the plurality of sub-bands of the uplink carrier of the cell.

11. The method of claim 1, wherein the first sub-band is within an initial bandwidth part (BWP) of a plurality of bandwidth parts (BWPs) of the uplink carrier of the cell, and wherein the initial BWP is configured for initial access to the cell.

12. A method comprising:
transmitting, by a wireless device to a base station, at least one preamble associated with random access;
receiving a report request associated with the random access; and
transmitting, based on the report request, a response comprising:
a first indication associated with a quantity of preamble transmissions via a first sub-band of a plurality of sub-bands of an uplink carrier of a cell; and
a second indication associated with a quantity of preamble transmissions via a second sub-band of the plurality of sub-bands of the uplink carrier of the cell.

13. The method of claim 12, wherein the response further comprises:
a third indication associated with a quantity of preamble transmission attempts associated with the first sub-band; and
a fourth indication associated with a quantity of preamble transmission attempts associated with the second sub-band.

14. The method of claim 12, wherein the response further indicates:
a first total quantity of preamble transmissions via the plurality of sub-bands of the uplink carrier of the cell; and
a second total quantity of preamble transmission attempts associated with the plurality of sub-bands of the uplink carrier of the cell.

15. The method of claim 12, further comprising determining, based on at least one identifier associated with the first sub-band and with the second sub-band, the response comprising the first indication and the second indication,
wherein the report request comprises the at least one identifier.

16. The method of claim 12, further comprising:
determining, based on a first occupancy status associated with a first random access occasion of the first sub-band, a first preamble transmission failure associated with the first random access occasion;
determining, based on a second occupancy status associated with a second random access occasion of the second sub-band, a second preamble transmission failure associated with the second random access occasion; and
incrementing, based on determining the first occupancy status and the second occupancy status, at least one preamble transmission attempt counter value.

17. The method of claim 12, wherein the first sub-band is within a first bandwidth part (BWP) of a plurality of bandwidth parts (BWPs) of the uplink carrier of the cell, and wherein the second sub-band is within a second BWP of the plurality of BWPs.

18. The method of claim 12, wherein the first sub-band and the second sub-band are within an initial bandwidth part (BWP) of a plurality of bandwidth parts (BWPs) of the uplink carrier of the cell, and wherein the initial BWP is configured for initial access to the cell.

19. The method of claim 12, wherein the uplink carrier comprises a plurality of bandwidth parts (BWPs), and wherein a bandwidth part (BWP) of the plurality of BWPs comprises at least one sub-band of the plurality of sub-bands of the uplink carrier of the cell.

* * * * *